Sept. 6, 1966 R. B. BLACKMAN 3,271,565
SYSTEM FOR DETERMINING THE ORBITAL PARAMETERS
OF A TERRESTRIAL SATELLITE
Filed Jan. 16, 1962 15 Sheets-Sheet 1

RESOLUTION OF SLANT RANGE

ROTATION OF AXES
IN EQUATORIAL PLANE

TRANSLATION OF ORIGIN
IN MERIDIAN PLANE

ROTATION OF AXES
IN MERIDIAN PLANE

INVENTOR
R. B. BLACKMAN
BY
Jules P. Kirsch
ATTORNEY

Sept. 6, 1966 R. B. BLACKMAN 3,271,565
SYSTEM FOR DETERMINING THE ORBITAL PARAMETERS
OF A TERRESTRIAL SATELLITE
Filed Jan. 16, 1962 15 Sheets-Sheet 2

INVENTOR
R.B. BLACKMAN
BY
Jules P. Kirsch
ATTORNEY

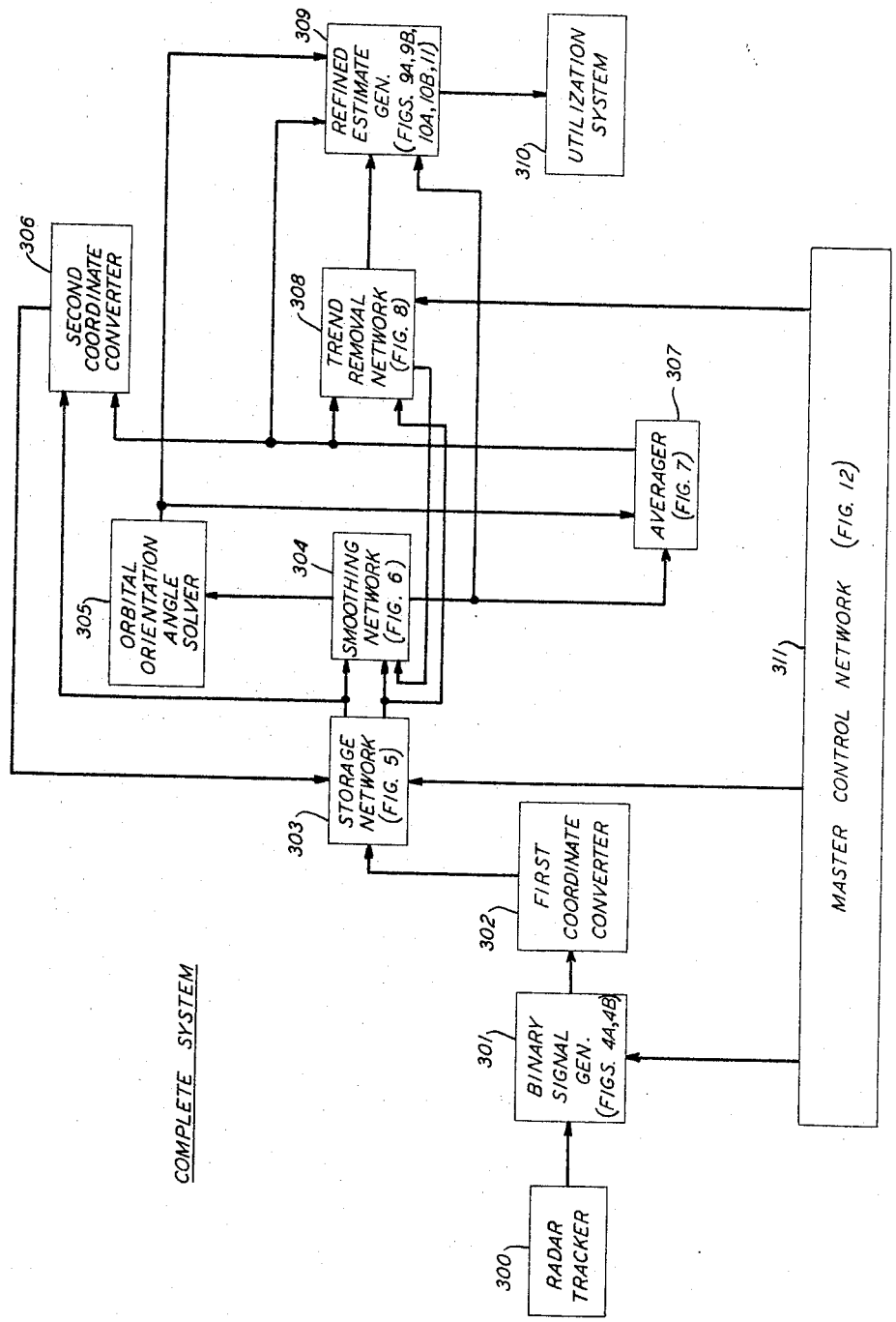

INVENTOR
R.B. BLACKMAN
BY Jules P. Kirsch
ATTORNEY

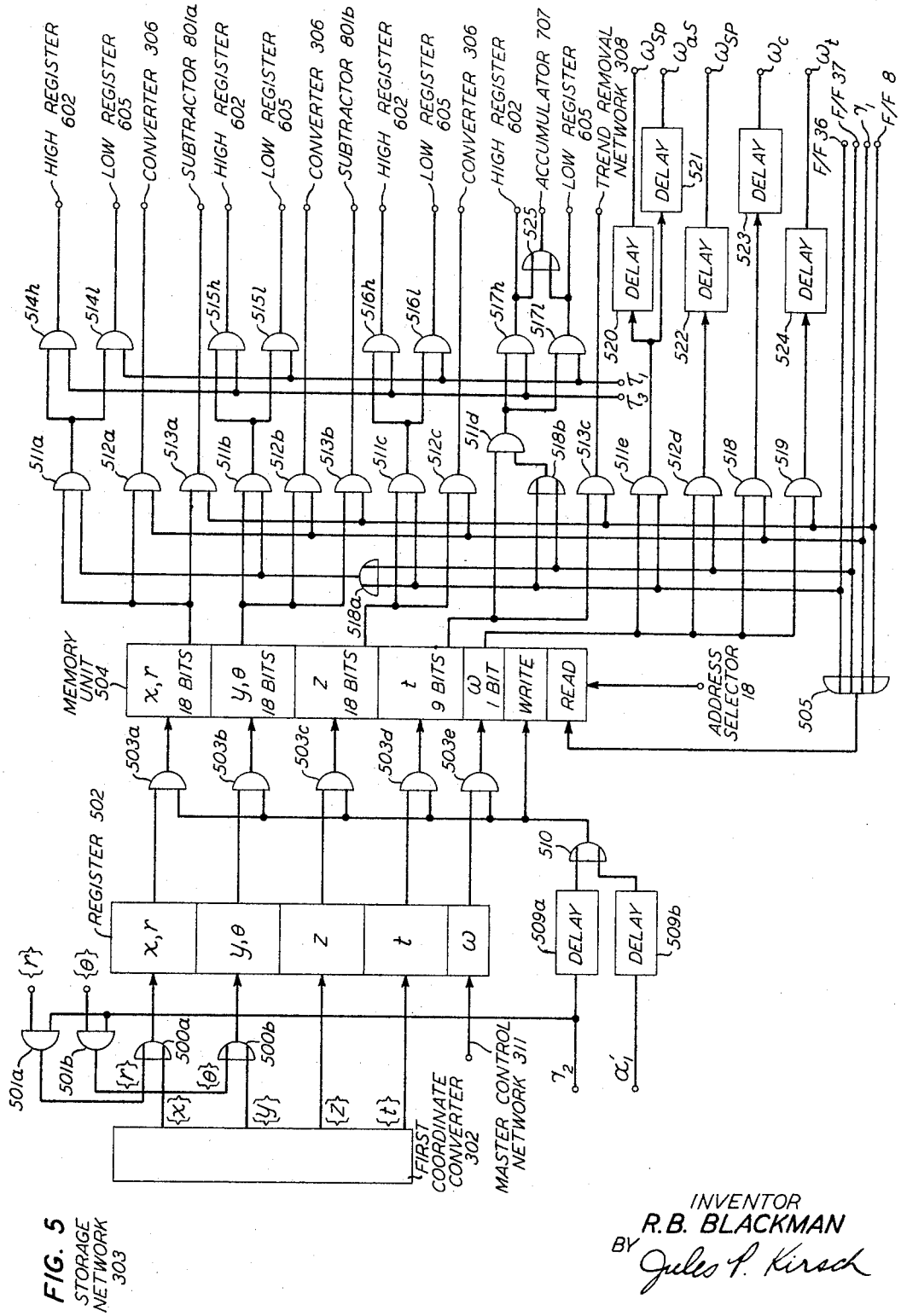

TREND REMOVAL NETWORK 308

INVENTOR
R.B. BLACKMAN
BY Jules P. Kirsch
ATTORNEY

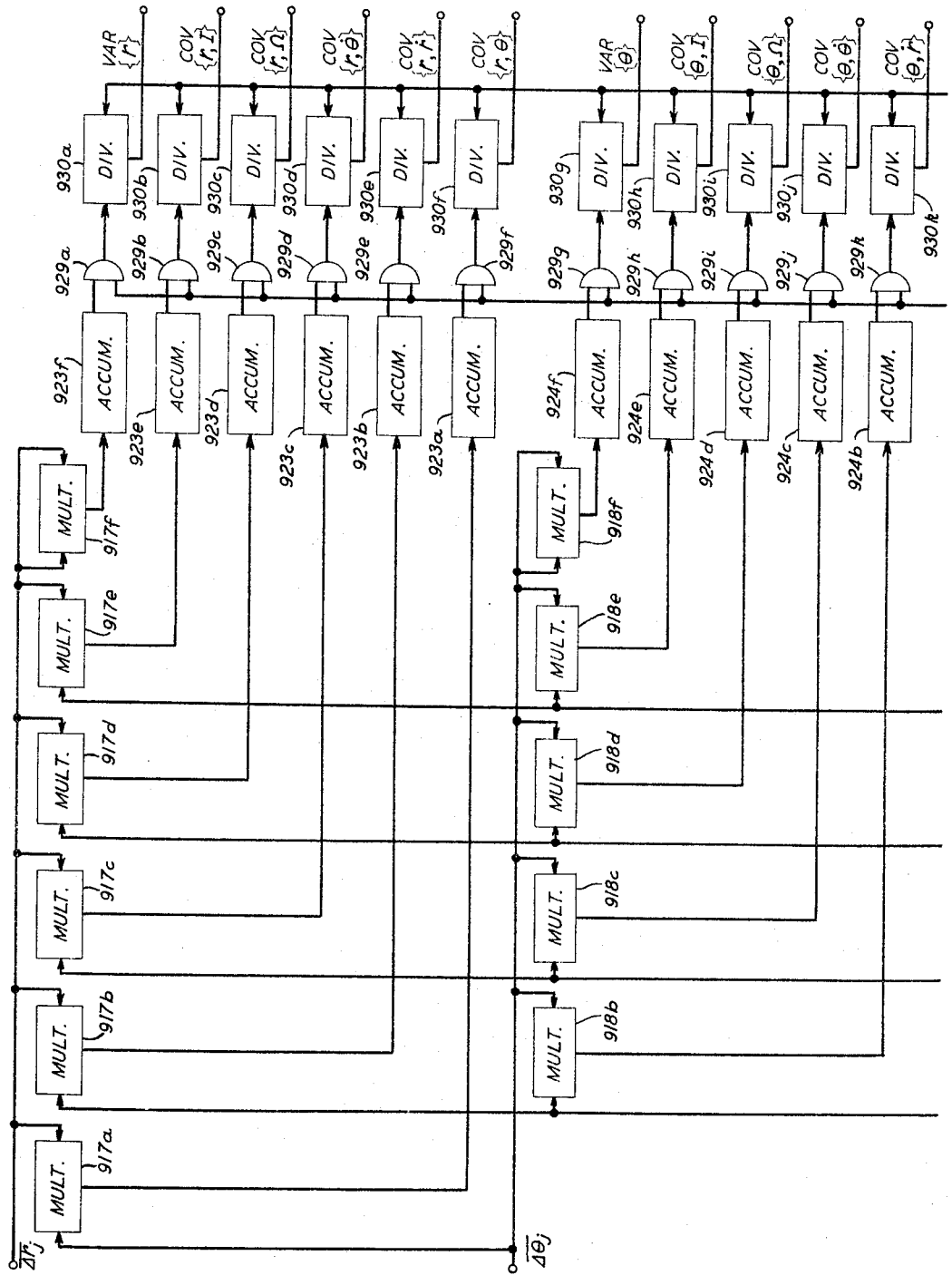

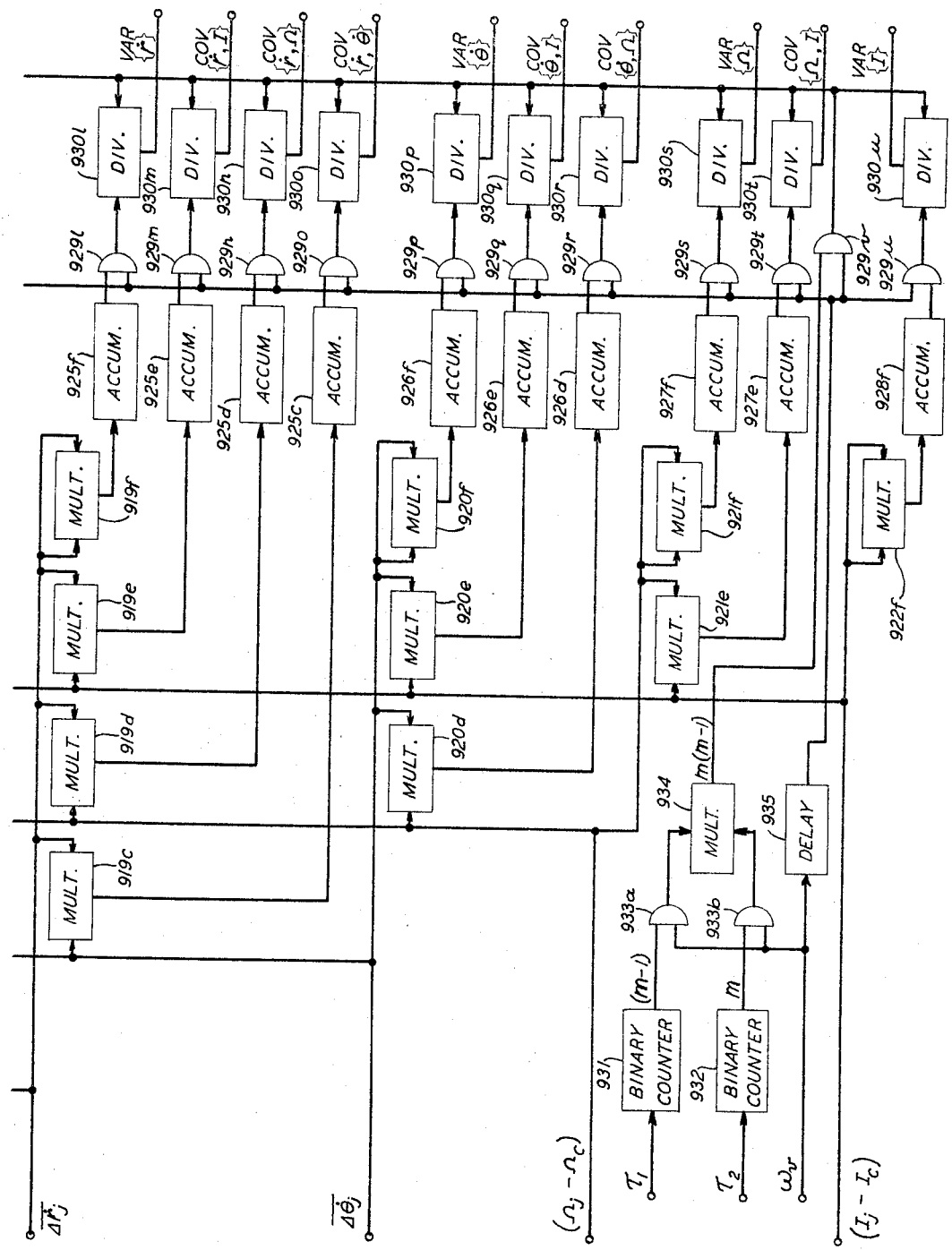

Sept. 6, 1966 R. B. BLACKMAN 3,271,565
SYSTEM FOR DETERMINING THE ORBITAL PARAMETERS
OF A TERRESTRIAL SATELLITE
Filed Jan. 16, 1962 15 Sheets-Sheet 14

INVENTOR
R. B. BLACKMAN
BY Jules P. Kirsch
ATTORNEY

INVENTOR
R.B. BLACKMAN
BY Jules P. Kirsch
ATTORNEY

United States Patent Office 3,271,565
Patented Sept. 6, 1966

3,271,565
SYSTEM FOR DETERMINING THE ORBITAL PARAMETERS OF A TERRESTRIAL SATELLITE
Ralph B. Blackman, Cranford, N.J., assignor to Bell Telephone Laboratories, Inc., New York, N.Y., a corporation of New York
Filed Jan. 16, 1962, Ser. No. 166,612
13 Claims. (Cl. 235—152)

This invention relates to tracking systems for following the motion of a terrestrial satellite, and in particular to a system for determining rapidly and accurately the orbital parameters of a satellite during its motion about the earth.

A number of world-wide communications systems employing earth satellites in random orbits have been proposed, in which the satellites serve as relay stations for transferring information between widely separated transmitter and receiver stations located on the earth's surface. In such systems, a satellite serves to relay information between a pair of earth-based stations during those portions of its orbit when it is mutually visible to the communications antennas at the two stations. Since a satellite in a random orbit appears to follow a different path with respect to a fixed point on the earth's surface during each of its revolutions about the earth, the future positions of a satellite in its orbit about the earth must be continuously predicted in order to control the orientation of earth-based communications antennas to point at a satellite during each period of mutual visibility. For a description of a system for generating antenna orientation orders from predictions of future satellite positions, see the article by R. Klahn, J. A. Norton, and J. A. Githens, "Antenna Steering System," volume 40, Bell System Technical Journal, page 1207 (1961). In addition, the small size of a satellite and the large earth-to-satellite distances make it necessary to predict future positions with an extremely high degree of accuracy in order to maintain continuous, reliable communications. Further, the relatively rapid motion of a satellite in its orbit about the earth requires that predictions of future satellite positions be made rapidly as well as accurately.

A number of different sets of equations of motion for predicting future positions of a satellite are well known; for example, see the equations given by R. A. Struble in "A Geometrical Derivation of the Satellite Equations," volume 1, Nos. 3 and 4, Journal of Mathematical Analysis and Applications, page 300 (1960), and "The Geometry of the Orbits of Artificial Satellites," volume 7, No. 2, Archive for Rational Mechanics and Analysis, page 87 (1961). In order to utilize these equations, however, it is first necessary to determine the unknown quantities appearing in the equations. These unknown quantities are the so-called "orbital parameters" that define the satellite's orbit, and the speed and accuracy with which predictions of the future positions of a satellite are made depend directly upon the speed and accuracy with which the orbital parameters are determined.

It is a specific object of this invention to determine the orbital parameters of a satellite with speed and accuracy, thereby enabling predictions of future satellite positions to be made with speed and accuracy.

For a satellite in a Keplerian orbit about the earth, there are six orbital parameters to be determined, and in the absence of observational errors, only six independent measurements of a satellite's position during its orbit about the earth would be needed to determine the six orbital parameters with perfect accuracy and relatively high speed. Observational errors, however, make it necessary to obtain a large number of measurements in order to derive sufficiently accurate estimates of the orbital parameters. At the same time, a large amount of observational data presents a severe problem in obtaining estimates rapidly as well as accurately.

It is another object of this invention to derive estimates of the orbital parameters of a satellite with speed and accuracy from a large amount of observational data.

The observed data from which the present invention derives estimates of the orbital parameters with speed and accuracy comprise a series of measurements of three quantities describing the position of a satellite relative to an observation sation on the earth's surface: slant range, elevation angle, and azimuth angle. These three quantities are measured at various instants of time during each "pass" or period during which the satellite is visible to the observation station, and from the observed data for each pass the present invention derives a set of so-called "best estimates" of the six orbital parameters at a specific "reference time" during each pass.

In order to derive a set of best estimates of the orbital parameters, the observed data for a single pass are subjected to a first coordinate conversion that refers each of the satellite's observed positions during a pass to an inertial, rectangular coordinate system $(x,y,z)$ whose origin is located at the center of the earth, and whose horizontal $x$ and $y$ axes lie in the earth's equatorial plane. By a system referred to as "smoothing," best estimates of those two of the six orbital parameters which define the orientation of a satellite's orbital plane in space are derived from the series of converted satellite position data: the angle of inclination, which is the angle between the orbital plane of the satellite and the equatorial plane of the earth; and the longitude of the ascending node, which is the angle between the $x$ axis and the line of nodes or lines of intersection between the orbital and equatorial planes.

The best estimates of the two orbital orientation angles are employed to perform a second coordinate conversion upon the observed data, from the three-dimensional rectangular coordinate system $(x, y, z)$ to a two-dimensional polar coordinate system $(r, \theta)$, whose origin is also at the center of the earth and whose coordinates $r$, $\theta$, lie in the orbital plane of the satellite. Smoothing, followed by so-called "averaging," is applied to the observed data after the second coordinate conversion to derive so-called "first" estimates of the four remaining orbital parameters: the radius of the satellite from the center of the earth; the central angle of the satellite, measured from the line of nodes to the radius of the satellite; and the first derivatives of the radius and the central angle. To obtain best estimates from the first estimates, the first estimates are processed by a system referred to as "trend removal," which is an iterative system for generating a series of increasingly accurate sets of estimates of the four remaining orbital parameters. The differences between successive sets of estimates are automatically compared against a preassigned standard of precision, and when the differences attain this degree of precision, the last set of estimates is defined to be the set of best estimates of the four remaining orbital parameters. These four best estimates, together with the two previously obtained best estimates of the orbital orientation angles, constitute the set of best estimates drived by this invention from the observed data for a single satellite pass.

Although highly accurate predictions may be made directly from the best estimates of the orbital parameters derived from the observed data for a single pass, the present invention provides a system for further improving the accuracy of the orbital parameter estimates. In this system, the sets of best estimates from two different passes are combined in a specific weighted average to obtain a single set of so-called "refined" estimates which is more accurate than either of the two sets of best estimates. In order to combine two sets of estimates from different passes in this system, two things are necessary: variances and covariances of each set of best estimates must be obtained; and the two sets of estimates, and their variances and covariances, must be referred to the same reference time, preferably by adjusting the earlier of the two sets of estimates, variances and covariances to the reference time of the later set of estimates, variances and covariances. After obtaining the variances and covariances of each set of best estimates from quantities generated during the process of deriving best estimates, the earlier set of best estimates is adjusted to the reference time of the later set of best estimates by using appropriate equations of motion, and the earlier set of variances and covariances is adjusted to the later reference time by using a special Jacobian matrix equation.

The system for combining sets of best estimates to obtain a set of refined estimates is also very rapid, and increases by only a small amount the overall time required to obtain a set of estimates of the orbital parameters from observed data. More important, the set of refined estimates is sufficiently accurate to ensure reliable communications through the generation of highly accurate orientation orders for directing earth-based communications antennas to point at an orbiting satellite.

The invention will be fully understood from the following detailed description of illustrative embodiments thereof taken in connection with the appended drawings, in which:

FIGS. 1A, 1B, 1C 1D, and 1E are geometrical diagrams showing the relationships between an observational coordinate system and an inertial geocentric coordinate system;

FIGS. 2A, 2B, 2C, and 2D are geometrical diagrams showing the relationships between an inertial geocentric coordinate system and a polar coordinate system in the orbital plane of a satellite;

FIG. 3 is a schematic block diagram showing a complete system for obtaining refined estimate signals from radar tracking signals;

FIG. 5 is a schematic diagram showing apparatus for storing signals during the operation of this invention;

FIGS. 10A and 10B are schematic diagrams showing apparatus for deriving the variance and covariance signals associated with a set of best estimate signals;

The following outline will be of assistance in following the detailed description given below.

Part 1—Theoretical Principles—FIGS. 1A, 1B, 1C, 1D, 1E, 2A, 2B, 2C, 2D

I. Determination of a Set of Best Estimates of the Orbital Parameters from Observational Data for a Single Pass
  A. Introduction
  B. First Coordinate Conversion
  C. Smoothing and Averaging
  D. Determination of Orbital Orientation Angles
  E. Second Coordinate Conversion
  F. Trend Removal II. Combination of Best Estimates from Two Different Passes to Derive a Set of Refined Estimates
  A. Introduction
  B. Determination of Variances and Covariances
  C. Adjustment of Reference Time
  D. Minimizing of Variances to Derive Refined Estimates Part 2—Apparatus Embodying Theoretical Principles—FIGS. 3 through 13

PART 1—THEORETICAL PRINCIPLES

I. *Determination of a set of best estimates of the orbital parameters from observational data for a single pass*

A. INTRODUCTION

Figure 1A:
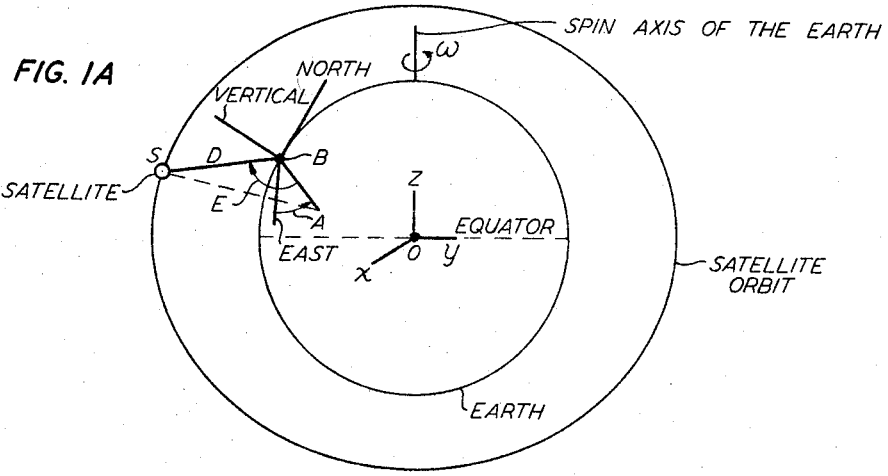

Referring to FIG. 1A, consider a terrestrial satellite S in its orbit about the earth. At an arbitrary point B located on the earth's surface, a suitable tracking apparatus, for example, a conventional radar system, measures the positions of the satellite at various times during the period that the satellite is visible to the tracking apparatus at the point B. In each of a satellite's revolutions about the earth, the period of time during which it is visible to a point B on the earth's surface is called a "pass," and the observed positions of a satellite during a pass are typically measured with respect to the point B at which the tracking apparatus is located. Each of the observed positions of the satellite during a pass may be expressed, for example, in terms of the following three quantities: slant range D, measured from B to the satellite; elevation angle E, measured from the horizontal plane, which is tangent to the earth at the point B, to the satellite; and azimuth angle A, measured from the east direction at the point B to the projection of slant range in the horizontal east-north plane. Each triplet of numbers $(D_j, E_j, A_j)$ measured during a pass defines the position of a satellite in space at a specific time $t_j$ with respect to the point B on the surface of the earth, and the chronological sequence of number triplets $$\{(D,E,A)\} = (D_1,E_1,A_1), (D_2,E_2,A_2), \ldots, (D_n,E_n,A_n)$$

generated by the tracking apparatus at specific times $t_1, t_2, \ldots, t_n$ during each pass constitutes the observed data from which the present invention derives best estimates of the orbital parameters of a satellite. It is to be understood, however, that the spacing in time between consecutive number triplets may not be uniform, due, for example, to the rejection of number triplets that are obviously erroneous when compared with adjacent number triplets.

It is well known that for a satellite in a Keplerian orbit, there are six parameters, often referred to as orbital elements, which define the orbit and establish future positions of the satellite. In the present invention, these six parameters comprise the nodal longitude and the inclination angle, which determine the orientation of a satellite's orbit in space, and each of the components of a two-dimensional position vector and a two-dimensional velocity vector, which determine the motion of a satellite in its orbit at any instant. If measurements of the observed positions of a satellite were entirely free of error, then six independent quantities measured during a single pass would suffice to determine the six orbital parameters; for example, either the three quantities D, E, and A measured at two different times, or the two quantities E and A measured at three different times would suffice. Because of observational errors, however, many measurements must be made in each of a number of different passes in order to determine the orbital parameters with a sufficiently high degrees of accuracy.

In the present invention, a set of so-called "best estimates" of the six orbital parameters is derived from the observed data for each of a number of individual passes, and the sets of best estimates from several passes are combined to form a single set of so-called "refined estimates" whose accuracy exceeds the accuracy of the individual one-pass sets of best estimates. By using the set of refined estimates in suitable equations of motion, a highly accurate prediction of the future course of the satellite is made.

Before deriving a set of best estimates of the orbital parameters from the observed data for a single pass, each of the elevation angle measurements obtained during the pass must be corrected for atmospheric refraction, in accordance with the well-known formula, $$E_j' = E_j - k_r \cot E_j \tag{1}$$

where $E_j$ is a measured elevation angle at a time $t_j$, $k_r$, is the constant of mean refraction, and $E_j'$ is the corresponding corrected elevation angle.

B. FIRST COORDINATE CONVERSION

After correcting each of the elevation angle measurements, it is desirable to convert each of the observed number triplets $(D_j, E_j', A_j)$ obtained at a time $t_j$ during a pass into a coordinate system that is more convenient for deriving best estimates of the orbital parameters. One such system is an inertial geocentric system, which, as shown in FIG. 1A, is a rectangular coordinate system $(x,y,z)$ having its origin at the center of the earth, O, its vertical or $z$ axis coincident with the spin axis of the earth, and its $x$ and $y$ axes lying in the equatorial plane of the earth but independent of the earth's rotation about its spin axis, where, for convenience, the orientation of the $x$ axis may be referred to the first point of Aries as of 1950.0.

Figure 1B:
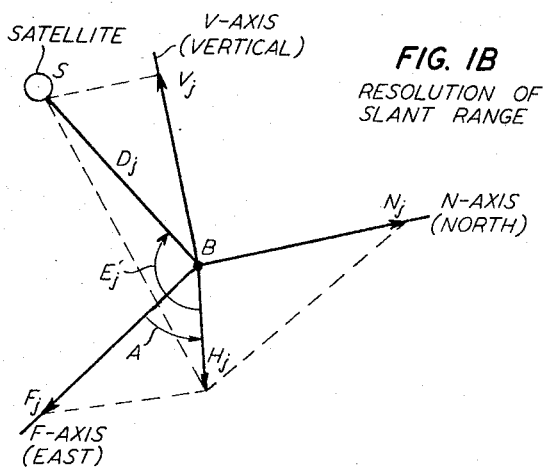

Conversion of each number triplets $(D_j, E_j', A_j)$ into an inertial geocentric coordinate system may proceed in accordance with the following equations:
Resolve the slant range $D_j$ into a vertical component $V_j$ and a horizontal component $H_j$, as shown in FIG. 1B, $$V_j = D_j \sin E_j' \tag{2a}$$
$$H_j = D_j \cos E_j' \tag{2b}$$

Resolve the horizontal slant range component, $H_j$, into its north component, $N_j$, and its east component, $F_j$.

$$N_j = H_j \sin A_j \tag{3a}$$
$$F_j = H_j \cos A_j \tag{3b}$$

Figure 1E:
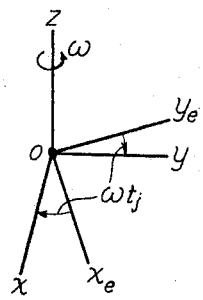
Figure 1D:
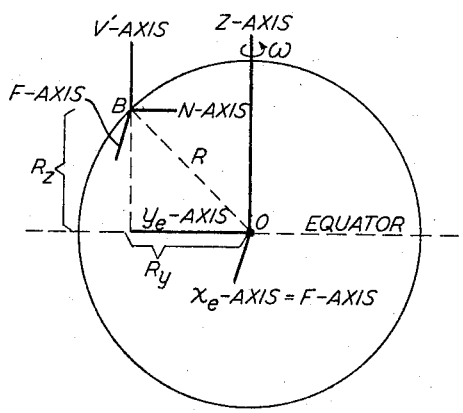
Figure 1C:
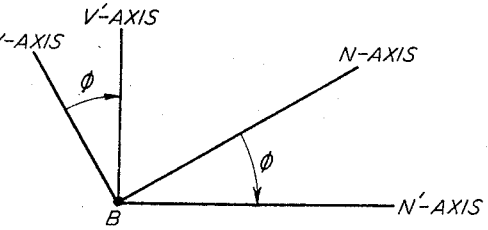

Rotate the vertical and north axes, V and N, through the angle $\Phi$ about the F axis into the new axes V' and N', as shown in FIG. 1C. $\Phi$ is the known angle between the equatorial plane of the earth and the angle between the tangent to the earth at the point B, and is determined by the latitude of the point B on the earth's surface. As a result of this rotation, the vertical and north components $V_j$ and $N_j$ are referred to the new axis to become $$V_j' = -N_j \sin \Phi + V_j \cos \Phi \tag{4a}$$
$$N_j' = N_j \cos \Phi + V_j \sin \Phi \tag{4b}$$

Translate the origin from B to the center of the earth, O, as shown in FIG. 1D, to convert the (F, N', V') coordinate system to an earth-fixed rectangular coordinate system $(x_e, y_e, z)$ whose $z$ axis is coincident with the spin axis of the earth. In the $(x_e, y_e, z)$ system the $F_j$, $N_j'$, $V_j'$ components become $$z_j = V_j' + R_z \tag{5a}$$
$$y_{ej} = N_j' + R_y \tag{5b}$$
$$x_{ej} = F_j \tag{5c}$$

As shown in FIG. 1D, the distance R between O and B is the radius of the earth at the point B and $$(R_z)^2 + (R_y)^2 = R^2$$

Compensate earth-fixed geocentric components $y_{ej}$ and $x_{ej}$ for the rotation of the earth about its spin axis at an angular rate $\omega = 7.29 \times 10^{-5}$ radians per second, as shown in FIG. 1E, $$y_j = y_{ej} \cos (\omega t_j + k_A) - x_{ej} \sin (\omega t_j + k_A) \tag{6a}$$
$$x_j = x_{ej} \cos (\omega f_j + k_A) + y_{ej} \sin (\omega t_j + k_A) \tag{6b}$$

where $f_j$ is the specific time at which each original number triplet $(D_j, E_j, A_j)$ was obtained, and may be measured from a suitable reference time, for example, from the beginning of a pass, $k_A$ is a constant to account for the first position of Aries or some other suitable reference point in the equatorial plane.

Figure 2A:
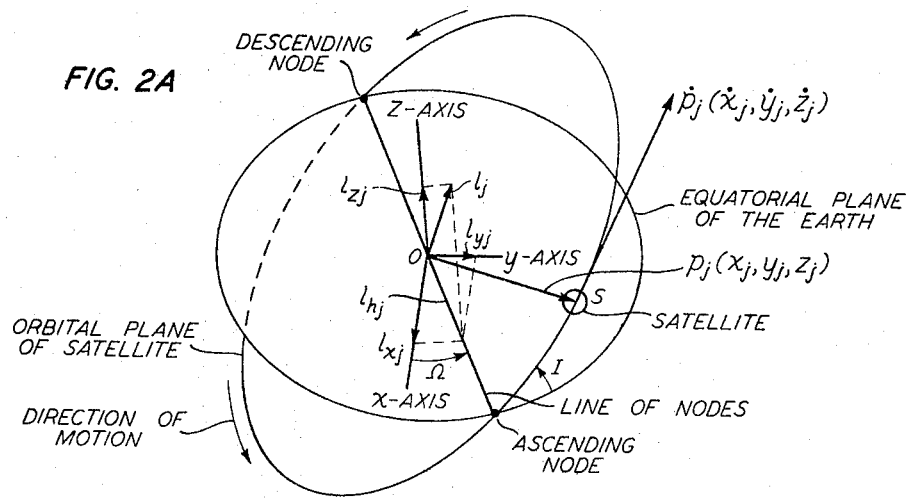

As a result of the above coordinate conversion, each of the positions of a satellite during a pass is defined by a number triplet $(x_j, y_j, z_j)$ referred to an inertial geocentric coordinate system $(x, y, z)$, instead of a number triplet $(D_j, E_j, A_j)$ referred to the earth-bound location of the tracking apparatus. Since each number triplet of inertial geocentric components $(x_j, y_j, z_j)$ may be considered to be the components of a three-dimensional position vector, $p_j$, as shown in FIG. 2A, the above coordinate conversion may also be considered as replacing the chronological sequence of observed number triplets $(D_1, E_1, A_1), (D_2, E_2, A_2), \ldots, (D_n, E_n, A_n)$ with a chronological sequence of inertial geocentric position vectors $\{p\} = \{p_1, p_2, \ldots, p_n\}$ with coordinates $(x_1', y_1' z_1), (x_2, y_2, z_2), \ldots, (x_n, y_n, z_n)$, respectively.

C. SMOOTHING AND AVERAGING

Before proceeding further to derive best estimates of the six orbital parameters, it is convenient at this point to define the so-called "smoothing" and "averaging" operations to be performed in this invention. First, let the components of the chronological sequence of position vectors $\{p\}$ for a single pass be denoted $\{x\}$, $\{y\}$, $\{z\}$, and let the corresponding times of observation of these position vectors be denoted $\{t_1, t_2, \ldots, t_n\}$, where it is understood that the spacing between consecutive times of observation is not necessarily uniform. Further, let the sequence $\{\xi\} = \{\xi_1, \xi_2, \ldots, \xi_n\}$ represent any one of the three sequence of components $\{x\}$, $\{y\}$, $\{z\}$, of the sequence of position vectors. Divide the sequence $\{\xi\}$ into two subsequences, each containing $m$ components $\{\xi_1, \xi_2, \ldots, \xi_m\}$, and $\{\xi_{m+1}, \xi_{m+2}, \ldots, \xi_{2m}\}$. If $n$ is even, then $n = 2m$, but if $n$ is odd, omit the middle component $$\frac{\xi_{m+1}}{2}$$

of the original sequence $\{\xi\}$ and start the second subsequence with the component $$\frac{\xi_{n+1}}{2} + 1 = \xi_{m+1}$$

From the two subsequences of components, this invention defines smoothing to be the forming of two new sequences $\{\alpha\} = \{\alpha_1, \alpha_2, \ldots, \alpha_m\}$, and $\{\beta\} = \{\beta_1, \beta_2, \ldots, \beta_m\}$, where $$\alpha_j = \frac{1}{2}(\xi_j + \xi_{m+j}), j = 1, 2, \ldots, m \tag{7a}$$

and $$\beta_j = \frac{\xi_{m+j} - \xi_j}{t_{m+j} - t_j}, j = 1, 2, \ldots, m \tag{7b}$$

In addition, from each of the two new sequences defined by Equations 7a and 7b this invention defines averaging to be the forming of two new quantities, $\alpha$ and $\beta$, in accordance with the following equation:

$$\gamma = \frac{1}{m} \sum_{j=1}^{m} \gamma_j \tag{8}$$

that is, $$\alpha = \frac{1}{m}\sum_{j=1}^{m}\alpha_j$$

and $$\beta = \frac{1}{m}\sum_{j=1}^{m}\beta_j$$

D. DETERMINATION OF ORBITAL ORIENTATION ANGLES

The first two orbital parameters to be derived from the sequence of position vectors are the two angles that define the orientation of the satellite's orbit with respect to the earth: the longitude of the ascending node, $\Omega$, and the inclination of the orbital plane, I. As illustrated in FIG. 2A, the orbital plane of the satellite and the equatorial plane of the earth intersect in a line, called the line of nodes. The end point of the line of nodes at which the satellite's orbit rises above the earth's equatorial plane is called the ascending node, and the longitude of the ascending node, $\Omega$, is defined as the angle between the $x$ inertial geocentric axis and the line of nodes, measured counterclockwise in the direction of the ascending node. The angle of inclination, I, is defined as the angle between the earth's equatorial plane and the satellite's orbital plane.

Let the components of the $j$th position vector $p_j$ be denoted $(x_j, y_j, z_j)$, and arrange each of the components of the sequence of position vectors $\{p\}$ into the three sequences, $$\{x\} = \{x_1, x_2, \ldots, x_n\}$$
$$\{y\} = \{y_1, y_2, \ldots, y_n\}$$

and $$\{z\} = \{z_1, z_2, \ldots, z_n\}$$

By applying that part of the smoothing operation defined by Equation 7a to each of the sequences of components $\{x\}$, $\{y\}$, $\{z\}$, there is obtained a sequence of $m$ so-called "smoothed" position vectors $\{\bar{p}\} = \{\bar{p}_1, \bar{p}_2, \ldots, \bar{p}_m\}$, where the components of the $j$th smoothed position vector $\bar{p}_j$ are $[\frac{1}{2}(x_j + x_{m+j}), \frac{1}{2}(y_j + y_{m+j}), \frac{1}{2}(z_j + z_{m+j})]$. Similarly, by applying that part of the smoothing operation defined by Equation 7b to each of the sequences of components, there is obtained a sequence of $m$ so-called "smoothed" velocity vectors $\{\bar{\dot{p}}\} = \{\bar{\dot{p}}_1, \bar{\dot{p}}_2, \ldots, \bar{\dot{p}}_m\}$, where the components of the $j$th smoothed velocity vector $\bar{\dot{p}}_j$ are $$\left[\frac{x_{m+j} - x_j}{t_{m+j} - t_j}, \frac{y_{m+j} - y_j}{t_{m+j} - t_j}, \frac{z_{m+j} - z_j}{t_{m+j} - t_j}\right]$$

The vectors in the sequence $\{\bar{\dot{p}}\}$ are called smoothed velocity vectors because they correspond to the true velocity vectors $\{\dot{p}\}$ derived by differentiating the position vectors $\{p\}$. For example, if $(x_j, y_j, z_j)$ are the components of $p_j$, then $(\dot{x}_j, \dot{y}_j, \dot{z}_j)$ are the components of the true velocity vector $\dot{p}_j$, where the components $\dot{x}_j, \dot{y}_j, \dot{z}_j$ are defined as the limits of the difference quotients $$\frac{\Delta x_j}{\Delta t_j}, \frac{\Delta y_j}{\Delta t_j}, \frac{\Delta z_j}{\Delta t_j}, \text{ as } \Delta t_j \to 0$$

Further, as illustrated in FIG. 2A, the true velocity vector $\dot{p}_j$ is perpendicular to the position vector $p_j$ from which it is derived, and both vectors $\dot{p}_j$ and $p_j$ lie in the orbital plane of the satellite. Similarly, each smoothed velocity vector $\bar{\dot{p}}_j$ in the sequence $\{\bar{\dot{p}}\}$ is perpendicular to the corresponding smoothed position vector $\bar{p}_j$ in the sequence $\{\bar{p}\}$, and both $\bar{\dot{p}}_j$ and $\bar{p}_j$ lie in the orbital plane of the satellite.

The angular momentum per unit mass of the satellite at a time $t_j$ is defined as the vector cross-product of the position and velocity vectors of the satellite at that time, $$l_j = p_j \times \dot{p}_j \quad (9a)$$

As shown in FIG. 2A, the angular momentum per unit mass defined in Equation 9a is a vector perpendicular to both $p_j$ and $\dot{p}_j$, and therefore $l_j$ is perpendicular to the orbital plane of the satellite. By applying Equation 9a to each corresponding pair of $m$ smoothed position and velocity vectors, a sequence of $m$ smoothed angular momentum vectors is obtained, $\{\bar{l}\} = \{\bar{l}_1, \bar{l}_2, \ldots, \bar{l}_m\}$ $$\bar{l}_j = \bar{p}_j \times \bar{\dot{p}}_j, \; j = 1, 2, \ldots, m \quad (9b)$$

By the well-known definition of a vector cross-product, the components $(\bar{l}_{xj}, \bar{l}_{yj}, \bar{l}_{zj})$ of $\bar{l}_j$ in Equation 9b are obtained from the components of $\bar{p}_j$ and $\bar{\dot{p}}_j$ by the following equations:

$$\bar{l}_{xj} = \bar{y}_j \bar{\dot{z}}_j - \bar{\dot{y}}_j \bar{z}_j \quad (9c)$$

$$\bar{l}_{yj} = \bar{z}_j \bar{\dot{x}}_j - \bar{\dot{z}}_j \bar{x}_j \quad (9d)$$

$$\bar{l}_{zj} = \bar{x}_j \bar{\dot{y}}_j - \bar{\dot{x}}_j \bar{y}_j \quad (9e)$$

Further, each of the components of $\bar{l}_j$ is referred to the same inertial geocentric coordinate system as are the components of $\bar{p}_j$ and $\bar{\dot{p}}_j$, that is, although the components of $\bar{l}_j$ define a vector perpendicular to the orbital plane of the satellite, the individual components of $\bar{l}_j$ are expressed in terms of the rectangular inertial geocentric coordinate system $(x, y, z)$. Thus the components $\bar{l}_{xj}$ and $\bar{l}_{yj}$ of the vector $\bar{l}_j$ lie in the equatorial plane of the earth, and as illustrated by the components $\bar{l}_{xj}$ and $\bar{l}_{yj}$ of $\bar{l}_j$ in FIG. 2A, the vector sum of $\bar{l}_{xj}$ and $\bar{l}_{yj}$ is a vector $\bar{l}_{hj}$ which lies along the line of nodes and which is the projection of $\bar{l}_j$ in both the equatorial plane of the earth and the orbital plane of the satellite, since the line of nodes lies in both the equatorial plane and the orbital plane. Hence the nodal longitude $\Omega$ may be determined in accordance with the equation $$\Omega_j = \sin^{-1}\frac{\bar{l}_{yj}}{\bar{l}_{hj}} \quad (10a)$$

where $$\bar{l}_{hj} = \pm(\bar{l}_{xj}^2 + \bar{l}_{yj}^2)^{1/2} \quad (10b)$$

Thus by using Equations 10a and 10b, a sequence of $m$ values of the nodal longitude $\{\Omega\} = \{\Omega_1, \Omega_2, \ldots, \Omega_m\}$ may be determined from the equatorial plane components of each of the angular momentum vectors in the sequence $\{\bar{l}\}$ defined by Equation 9b.

Figure 2B:
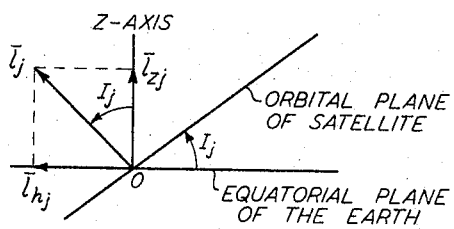

Referring now to FIG. 2B, it is seen that the angle between the angular momentum vector $\bar{l}_j$ and its component $\bar{l}_{zj}$ along the spin axis of the earth is equal to the angle of inclination $I_j$ of the orbital plane of the satellite with respect to the equatorial plane of the earth. Hence, the angle $I_j$ is given by the following equation, $$I_j = \tan^{-1}\frac{\bar{l}_{hj}}{\bar{l}_{zj}} \quad (11)$$

where $\bar{l}_{hj}$ is defined by Equation 10b above. By applying Equations 10b and 11 to the components of each of the angular momentum vectors in the sequence $\{\bar{l}\}$, a sequence of $m$ angles of inclination $$\{I\} = \{I_1, I_2, \ldots, I_m\}$$

may be derived.

From each of the sequences of $m$ orbital orientation angles $\{\Omega\}$ and $\{I\}$, a single angle, $\Omega_c$ and $I_c$, is derived by performing the averaging operation defined by Equation 8, $$\Omega_c = \frac{1}{m}\sum_{j=1}^{m}\Omega_j \quad (12a)$$

and $$I_c = \frac{1}{m}\sum_{j=1}^{m}I_j \quad (12b)$$

In this invention, the angles $\Omega_c$ and $I_c$ represent the so-called "best estimates" of the two orbital orientation angles of a satellite derived from the observed data for a single pass. Because of the averaging operation by which these two best estimates, and the remaining four best estimates are obtained, the entire set of best estimates is referred to a reference time $t_c$ during the pass, where $t_c$ is also defined by the averaging operation of Equation 8, that is, $$t_c = \frac{1}{n}\sum_{j=1}^{n} t_j \qquad (12c)$$

where $t_j$ is the time of observation of the $j$th position vector $p_j$ of the satellite during a given pass. It is noted, however, that Equation 12c is applicable only for $n$ even, that is, $n=2m$; in the event that $n$ is odd, that is, $n=2m+1$, it is recalled that the middle vector, $p_{m+1}$, is omitted and therefore the reference time is defined as $$t_c = \frac{1}{2m}\left(\sum_{j=1}^{m} t_j + \sum_{j=m+2}^{n} t_j\right) \qquad (12d)$$

E. SECOND COORDINATE CONVERSION

The four orbital parameters for which best estimates remain to be derived are the components of a best estimate position vector and the components of a best estimate velocity vector, which are also refered to the reference time $t_c$ during the pass. These two vectors completely determine the motion of the satellite in its orbit, and since this motion is confined primarily to the plane of the orbit, each of the best estimate position and velocity vectors requires only two components, thereby accounting for the number four mentioned above.

To obtain this pair of best estimate vectors, the components of each of the $n$ position vectors, $p_j$, are put through a second coordinate conversion, from a three dimensional, rectangular, inertial, geocentric coordinate system $(x, y, z)$ to a two-dimensional, polar coordinate system, $(r, \theta)$, lying in the orbital plane of the satellite. This second coordinate conversion is accomplished in two stages. First, as illustrated in FIG. 2C, rotate the $x$ and $y$ axes through the angle $\Omega_c$ about the $z$ axis into the $x_\Omega$ and $y_\Omega$ axes, where the $x_\Omega$ axis coincides with the line of nodes. In terms of the $x_\Omega$, $y_\Omega$ axes, the $x_j$ and $y_j$ components of $p_j$ become $$x_{\Omega j} = x_j \cos \Omega_c + y_j \sin \Omega_c \qquad (13a)$$

$$y_{\Omega j} = -x_j \sin \Omega_c + y_j \cos \Omega_c \qquad (13b)$$

Second, rotate the $y_\Omega$ axis through the angle $I_c$ into the $y_I$ axis, where the $y_I$ axis lies in the orbital plane of the satellite. In terms of the $y_I$ axis, the $y_{\Omega j}$ and $z_j$ components become $$y_{Ij} = y_{\Omega j} \cos I_c + z_j \sin I_c \qquad (14a)$$

It is unnecessary to rotate the $z$ axis through the angle $I_c$ and a $z_I$ axis perpendicular to the orbital plane, because the satellite's motion is confined to its orbital plane and therefore has no component perpendicular to the orbital plane; that is, $$z_{Ij} = -y_{\Omega j} \sin I_c + z_j \cos I_c = 0 \qquad (14b)$$

It is to be noted, however, that observational errors may give rise to a small, apparent component perpendicular to the orbital plane, which would cause Equation 14b to have a small nonzero value.

Figure 2D:
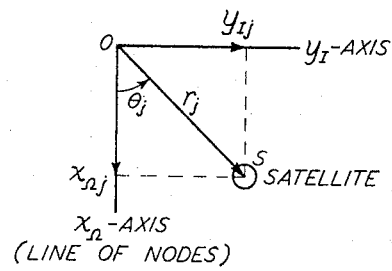
Figure 2C:
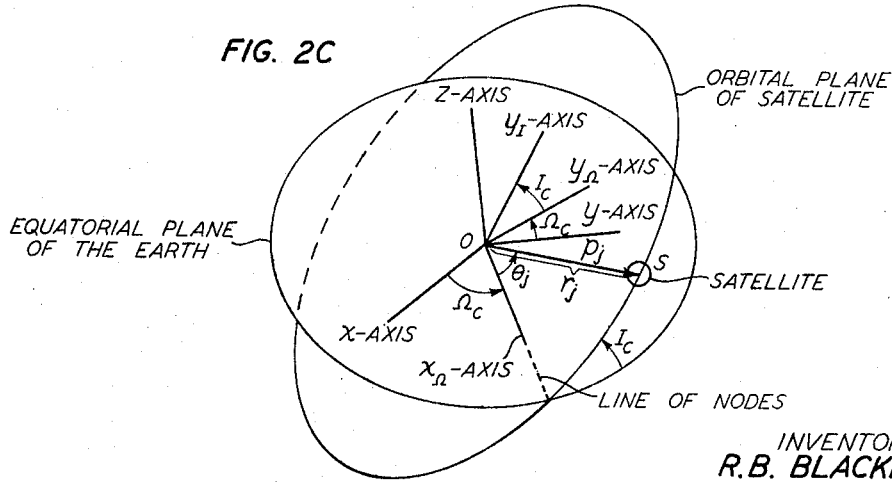

FIG. 2D graphically illustrates the relationships between the rectangular coordinates $x_{\Omega j}$ and $y_{Ij}$ in the orbital plane, and the corresponding polar coordinates $r_j$ and $\theta_j$ also in the orbital plane. These relationships are expressed by the following equations, $$r_j = \pm (x_{\Omega j}^2 + y_{Ij}^2)^{1/2} \qquad (15a)$$

and $$\theta_j = \tan^{-1}\left(\frac{y_{Ij}}{x_{\Omega j}}\right) \qquad (15b)$$

Thus through Equations 13a, 13b, 14a, 15a, and 15b, the sequence of $n$ three-dimensional, rectangular coordinate position vectors $\{p\}$, in which the $x_j$ and $y_j$ components of $p_j$ lie in the equatorial plane of the earth, may be converted to a new sequence of $n$ two-dimensional polar coordinate position vectors, to be denoted $\{P\} = \{P_1, P_2, \ldots, P_n\}$, in which the two components $r_j$, $\theta_j$ of $P_j$ lie in the orbital plane of the satellite.

F. TREND REMOVAL

From the sequence of $n$ position vectors $\{P\}$, the present invention derives, by an iterative process referred to as "trend removal," a pair of best estimate position and velocity vectors $P_c$ and $\dot{P}_c$, whose respective components $(r_c, \theta_c)$ and $(\dot{r}_c, \dot{\theta}_c)$ constitute best estimates of the remaining four orbital parameters at the reference time $t_c$ during a single pass.

To derive the pair of best estimate vectors $P_c$ and $\dot{P}_c$, first arrange the polar coordinate components of the chronological sequence of $n$ position vectors in the corresponding chronological sequences $$\{r\} = \{r_1, r_2, \ldots, r_n\}$$

and $$\{\theta\} = \{\theta_1, \theta_2, \ldots, \theta_n\}$$

Next, apply Equation 7a to the sequences $\{r\}$ and $\{\theta\}$ to form a sequence of $m$ smoothed position vectors $\{\overline{P}\}$, in which the $j$th smoothed position vector $\overline{P}_j$ has the components $$[\overline{r}_j, \overline{\theta}_j] = \left[\frac{1}{2}(r_j + r_{m+j}), \frac{1}{2}(\theta_j + \theta_{m+j})\right]$$

Also, apply Equation 7b to the sequences $\{r\}$ and $\{\theta\}$ to form a sequence of $m$ smoothed velocity vectors $\{\overline{\dot{P}}\}$, in which the $j$th smoothed velocity vector $\overline{\dot{P}}_j$ has the components $$[\overline{\dot{r}}_j, \overline{\dot{\theta}}_j] = \left[\frac{r_{m+j} - r_j}{t_{m+j} - t_j}, \frac{\theta_{m+j} - \theta_j}{t_{m+j} - t_j}\right]$$

Further, average the components of the smoothed position and velocity vectors in accordance with the operation defined by Equation 8 to obtain a single pair of position and velocity vectors $P_{c1}$, $\dot{P}_{c1}$ whose components are $(r_{c1}, \theta_{c1})$ and $(\dot{r}_{c1}, \dot{\theta}_{c1})$, respectivley, where $$r_{c1} = \frac{1}{m}\sum_{j=1}^{m} \overline{r}_j \qquad (16a)$$

$$\theta_{c1} = \frac{1}{m}\sum_{j=1}^{m} \overline{\theta}_j \qquad (16b)$$

$$\dot{r}_{c1} = \frac{1}{m}\sum_{j=1}^{m} \overline{\dot{r}}_j \qquad (16c)$$

and $$\dot{\theta}_{c1} = \frac{1}{m}\sum_{j=1}^{m} \overline{\dot{\theta}}_j \qquad (16d)$$

The vectors $P_{c1}$ and $\dot{P}_{c1}$ are referred to as first estimate position and velocity vectors, and they approximate the true position and velocity of a satellite at the reference time $t_c$ during a single pass.

Because of the smoothing and averaging operations by which the pair of first estimate vectors are derived, the random errors present in these first estimate vectors are significantly smaller, on the average, than the observational errors in the individual position vectors $\{P\}$. In general, however, the smoothing and averaging operations themselves introduce so-called "dynamic" errors which may be larger than the random errors remaining in the first estimate vectors. To reduce these dynamic errors and thereby obtain a pair of position and velocity vectors whose components are sufficiently error-free to serve as best estimates of the orbital parameters $r$, $\theta$, $\dot{r}$, $\dot{\theta}$, the trend removal system of the present invention systematically generates a succession of pairs of estimated position and velocity vectors which approximate with increasing accuracy the true position and velocity of the satellite at the reference time $t_c$ during a pass.

Starting with the first pair of estimated position and velocity vectors, $P_{c1}$, $\dot{P}_{c1}$, their components are used to construct a first sequence of $n$ regenerated position vectors $\{P\}^1$. This first sequence of $n$ regenerated position vectors is compared with the sequence of $n$ observed position vectors $\{P\}$, and the differences between the two sets of vectors, after smoothing and averaging, are used to correct the first pair of estimated position and velocity vectors and thereby obtain a second pair of estimated position and velocity vectors $P_{c2}$, $\dot{P}_{c2}$. The process is then repeated by using the components of the second pair of estimated vectors to construct a second sequence of $n$ regenerated position vectors $\{P\}^2$. The second sequence of $n$ regenerated position vectors is compared with the sequence of observed position vectors $\{P\}$, and the differences between the two sets of vectors, after smoothing and averaging, are used to correct the second pair of estimated vectors and thereby obtain a third pair of estimated position and velocity vectors $P_{c3}$, $\dot{P}_{c3}$. The process is continued until a point is reached at which the differences between the $k$th or last sequence of regenerated position vectors $\{P\}^k$ and the sequence of observed position vectors become negligible, at which point the components of the last pair of estimated vectors $P_{ck}$, $\dot{P}_{ck}$ constute the best estimates $r_c$, $\theta_c$, $\dot{r}_c$, $\dot{\theta}_c$ of the four orbital parameters $r$, $\theta$, $\dot{r}$, $\dot{\theta}$ at the reference time $t_c$ during the pass.

In mathematical terms, the first cycle of the trend removal process comprises the following operations. A sequence of $n$ regenerated position vectors $$\{P\}^1 = \{P_1^1, \ldots, P_n^1\}$$

is constructed from the components of the first pair of estimated vectors $P_{c1}$, $\dot{P}_{c1}$, by a suitable function, which may be a ratio of polynomials or a truncated Taylor series. If a truncated Taylor series is used, the components of the $j$th regenerated position vector $P_j^1$ of the sequence $\{P\}^1$ are given by $$r_j^1 = r_{c1} + \dot{r}_{c1}(t_j - t_c) + \frac{1}{2}\ddot{r}_{c1}(t_j - t_c)^2 + \frac{1}{6}\dddot{r}_{c1}(t_j - t_c)^3 \quad (17a)$$

$$\theta_j^1 = \theta_{c1} + \dot{\theta}_{c1}(t_j - t_c) + \frac{1}{2}\ddot{\theta}_{c1}(t_j - t_c)^2 + \frac{1}{6}\dddot{\theta}_{c1}(t_j - t_c)^3 \quad (17b)$$

where $t_j$ is the time at which the $j$th observation of the satellite was made during a pass, and the coefficients of the nonlinear terms in Equations 17a and 17b are higher order derivatives of $r_{c1}$ and $\theta_{c1}$. These higher order derivatives are related to the components of the position and velocity vectors of a satellite through the well-known equations of planetary motion which govern the motion of a satellite in the gravitational field of the earth; see, for example, D. R. Inglis, Dynamic Principles of Mechanics, page 85 (1949). A brief summary of these equations follows.

The general equations for the acceleration of a body specify that the acceleration has two components, one component being parallel to the position vector $P(r, \theta)$ of the body and having a magnitude $$\ddot{r} - r\dot{\theta}^2 \quad (18a)$$

where $\ddot{r}$ is the second derivative of $r$, and the other component being perpendicular to the position vector and having a magnitude $$2\dot{r}\dot{\theta} + r\ddot{\theta}, \quad (18b)$$

where $\ddot{\theta}$ is the second derivative of $\theta$. In the case of a satellite orbiting about the earth, the primary force acting upon the satellite is an inverse square force directed along the radius $r$ between the satellite and the center of the earth, hence the magnitude of the acceleration component parallel to the position vector is expressed by the equation $$\ddot{r} - r\dot{\theta}^2 = -\frac{k}{r^2} \quad (18c)$$

where $k$ is the product of the universal gravitational constant times the mass of the earth, and the magnitude of the acceleration component perpendicular to the position vector is equal to zero, that is, $$2\dot{r}\dot{\theta} + r\ddot{\theta} = 0 \quad (18d)$$

Equations 18c and 18d thus comprise the two differential equations of motion for a satellite orbiting about the earth. These two equations may be rewritten in terms of the second derivatives $\ddot{r}$ and $\ddot{\theta}$, $$\ddot{r} = r\dot{\theta}^2 - \frac{k}{r^2} \quad (19a)$$

$$\ddot{\theta} = \frac{-2\dot{r}\dot{\theta}}{r} \quad (19b)$$

and by differentiating 19a and 19b, the third derivatives $\dddot{r}$ and $\dddot{\theta}$ are also obtained, $$\dddot{r} = \dot{r}\left(-3\dot{\theta}^2 + \frac{2k}{r^3}\right) \quad (19c)$$

$$\dddot{\theta} = 2\dot{\theta}\left(-\dot{\theta}^2 + \frac{3\dot{r}^2}{r^2} + \frac{k}{r^3}\right) \quad (19d)$$

It is noted in Equations 19a through 19d that the second and third derivatives of $r$ and $\theta$ are functions of $r$, $\dot{r}$, and $\dot{\theta}$, hence the coefficients of the nonlinear terms in Equations 17a and 17b may be determined from the components $r_{c1}$, $\dot{r}_{c1}$, $\dot{\theta}_{c1}$ of the position and velocity vectors $P_{c1}$, $\dot{P}_{c1}$.

In the next operation in the first cycle of trend removal, compare the sequence of artificial position vectors $\{P\}^1$ with the sequence of observed position vectors $\{P\}$ by subtracting the components of corresponding vectors in each sequence, that is, form a first sequence of difference vectors $\{\Delta P\}^1$, where the components of $\Delta P_j^1$ are the differences, $\Delta r_j^1$, $\Delta \theta_j^1$, $$\Delta r_j^1 = r_j - r_j^1 \quad (20a)$$

$$\Delta \theta_j^1 = \theta_j - \theta_j^1 \quad (20b)$$

$$j = 1, 2, \ldots, n$$

Smooth the differences obtained through Equations 20a and 20b by applying Equations 7a and 7b. This produces four sequences of smoothed differences $\{\overline{\Delta r}\}^1$, $\{\overline{\Delta \theta}\}^1$, $\{\overline{\Delta \dot{r}}\}^1$, $\{\overline{\Delta \dot{\theta}}\}^1$, each containing $m$ terms, $\overline{\Delta r_j^1}$, $\overline{\Delta \theta_j^1}$, $\overline{\Delta \dot{r}_j^1}$, $\overline{\Delta \dot{\theta}_j^1}$, $j = 1, 2, \ldots, m$, where $$\overline{\Delta r_j}^1 = \frac{1}{2}(\Delta r_j^1 + \Delta r_{m+j}^1) \quad (20c)$$

$$\overline{\Delta \phi_j}^1 = \frac{1}{2}(\Delta \theta_j^1 + \Delta \theta_{m+j}^1), \quad (20d)$$

$$\overline{\Delta \dot{r}_j}^1 = \frac{\Delta r_{m+j}^1 - \Delta r_j^1}{t_{m+j} - t_j} \quad (20e)$$

and $$\overline{\Delta \dot{\theta}}_{j1} = \frac{\Delta \theta_{m+j}^1 - \theta_j^1}{t_{m+j} - t_j} \quad (20f)$$

Average each of the four sequences of smoothed differences in accordance with Equation 8 to obtain the four increments $\Delta r_{c1}$, $\Delta \theta_{c1}$, $\Delta \dot{r}_{c1}$, $\Delta \dot{\theta}_{c1}$, where $$\Delta r_c = \frac{1}{m} \sum_{j=1}^{m} \overline{\Delta r}_j^1 \quad (20g)$$

$$\Delta \theta_{c1} = \frac{1}{m} \sum_{j=1}^{m} \overline{\Delta \theta}_j^1 \quad (20h)$$

$$\Delta \dot{r}_{c1} = \frac{1}{m} \sum_{j=1}^{m} \overline{\Delta \dot{r}}_j^1 \quad (20i)$$

and $$\Delta \dot{\theta}_{c1} = \frac{1}{m} \sum_{j=1}^{m} \overline{\Delta \dot{r}}_j^1 \quad (20j)$$

If each of the four increments is not negligible, that is, if each increment $\Delta r_{c1}$, $\Delta \theta_{c1}$, $\Delta \dot{r}_{c1}$, $\Delta \dot{\theta}_{c1}$, is not less than some preassigned quantity $\epsilon_r$, $\epsilon_\theta$, $\epsilon_{\dot{r}}$, $\epsilon_{\dot{\theta}}$, respectively, add each increment to the corresponding component of the first pair of estimated vectors to correct these vectors and thereby obtain a second pair of estimated position and velocity vectors, $P_{c2}$, $\dot{P}_{c2}$. The components of $P_{c2}$, $\dot{P}_{c2}$ are $(r_{c2}, \theta_{c2})$ and $(\dot{r}_{c2}, \dot{\theta}_{c2})$, respectively, where $$r_{c2} = r_{c1} + \Delta r_{c1} \quad (20k)$$
$$\theta_{c2} = \theta_{c1} + \Delta \theta_{c1} \quad (20l)$$
$$\dot{r}_{c2} = \dot{r}_{c1} + \Delta \dot{r}_{c1} \quad (20m)$$
$$\dot{\theta}_{c2} = \dot{\theta}_{c1} + \Delta \dot{\theta}_{c1} \quad (20n)$$

The trend removal process is repeated by using the components of $P_{c2}$, $\dot{P}_{c2}$ instead of the components of $P_{c1}$, $\dot{P}_{c1}$ in Equations 17a and 17b, and in Equations 19a through 19d to construct a second sequence of $n$ regenerated position vectors $\{P\}^2 = \{P_1^2, P_2^2, \ldots, P_n^2\}$. The regenerated sequence $\{P\}^2$ is compared with the observed sequence $\{P\}$ as prescribed by Equations 20a and 20b, and the components of the second sequence of difference vectors $\{\Delta P\}^2$ obtained from this comparison are smoothed and averaged by the operations defined by Equations 7a, 7b, and 8, to form the increments $\Delta r_{c2}$, $\Delta \theta_{c2}$, $\Delta \dot{r}_{c2}$, $\Delta \dot{\theta}_{c2}$. If these increments are negligible as specified above, the components $r_{c2}$, $\theta_{c2}$, $\dot{r}_{c2}$, $\dot{\theta}_{c2}$ of $P_{c2}$, $\dot{P}_{c2}$ are the best estimates $r_c$, $\theta_c$, $\dot{r}_c$, $\dot{\theta}_c$ of the four remaining orbital parameters. If these increments are not negligible, they are added to the components of $P_{c2}$, $\dot{P}_{c2}$ to obtain a third pair of estimated vectors $P_{c3}$, $\dot{P}_{c3}$.

The trend removal process is repeated for as many cycles as necessary to achieve the desired degree of precision, as defined by the four preassigned quantities $\epsilon_r$, $\epsilon_\theta$, $\epsilon_{\dot{r}}$, $\epsilon_{\dot{\theta}}$. In general, when the four increments $\Delta r_{ck}$, $\Delta \theta_{ck}$, $\Delta \dot{r}_{ck}$, $\Delta \dot{\theta}_{ck}$, obtained at the end of the $k$th trend removal cycle become less than the four preassigned quantities, the components $r_{ck}$, $\theta_{ck}$, $\dot{r}_{ck}$, $\dot{\theta}_{ck}$ of the $k$th position and velocity vectors $P_{ck}$, $\dot{P}_{ck}$ comprise the best estimates $r_c$, $\theta_c$, $\dot{r}_c$, $\dot{\theta}_c$ of the four remaining orbital parameters. These four components, together with the best estimates of the two orbital orientation angles $\Omega_c$ and $I_c$, constitute the set of best estimates of the six orbital parameters obtained by this invention from the observed data for a single pass of a satellite.

II. Combination of best estimates from two different passes to derive a set of refined estimates

A. INTRODUCTION

Although the set of best estimates obtained by this invention from the observed data for a single pass may be used in suitable equations of motion to predict future satellite positions with a high degree of precision, it is possible to obtain an even greater degree of precision by using the observed data from more than one pass. In the present invention, a set of best estimates is derived from the observed data for each of two different passes, in accordance with the system described above, and the two sets of best estimates are combined, in accordance with the system described below, to derive a single set of so-called "refined" estimates which is more accurate than either of the individual sets of estimates from which it is obtained. Predictions of future satellite positions made from a set of refined estimates, and communications antenna orientation instructions generated from such predictions, are therefore more percise and reliable than predictions and orientation instructions derived from best estimates which are obtained from observed data for a single pass. The system for combining sets of best estimates is equally suitable for combining sets of estimates derived from different sources; for example, this system may be used to combine a set of refined estimates with a set of best estimates, to combine two sets of refined estimates, or to combine a set of estimates derived by this invention with a set of estimates derived by some other system for determining orbital parameters. Other applications of this invention will readily occur to those skilled in the art.

In order to combine two sets of one-pass estimates in this invention, it is necessary to have the variances and covariances of each set of estimates, in addition to the best estimates themselves. Further, since each set of estimates is referred to a specific reference time, for example, $t_2$ and $t_1$, where $t_2 > t_1$, it is necessary before combining estimates from two different passes to refer both sets of estimates and their associated variances and covariances to a common reference time. For convenience, the common reference time may be chosen to be the reference time of the later of the two sets of estimates, thereby limiting the adjustment to the earlier set of estimates only.

B. DETERMINATION OF VARIANCES AND COVARIANCES

In standard works on probability and statistics, the variance of a population of measurements of a given parameter is defined as the average square deviation of the measurements from the mean or true value of the parameter. Thus, for a population comprising the measurements $\{\xi\} = \{\xi_1, \xi_2, \ldots\}$ of a parameter with mean or true value $\mu$, the variance of the population is defined as $$\text{var } \{\xi\} = \text{ave } (\xi_i - \mu)^2, \quad i = 1, 2, \ldots \quad (21a)$$

where "var" stands for "variance," and "ave" stands for "average value." Since a population is theoretically defined to include all possible measurements, and since the mean or true value of the parameter is unknown, in practice both the population variance and the true value of the parameter must be estimated on the basis of a relatively small sample of the population. These estimates are derived as follows. Let $$\{\xi\}_j = \{\xi_{j1}, \xi_{j2}, \ldots, \xi_{jm}\}$$

represent a sample of $m$ measurements drawn from the original population of measurements $\{\xi\}$. An "unbiased" estimate of the population variance is the well-known sample variance, $$\text{var } \{\xi\}_j = \frac{1}{m-1} \sum_{i=1}^{m} (\xi_{ji} - \bar{\xi}_j)^2 \quad (21b)$$

where $\bar{\xi}_j$, which is the mean of the sample, is an unbiased estimate of the true value of the parameter and is given by $$\bar{\xi}_j = \frac{1}{m} \sum_{i=1}^{m} \xi_{ji} \quad (21c)$$

In the present invention, the derivation of variances is based in part upon Equation 21b, since the observed data for a single pass from which a set of best estimates is derived constitute a sample of the population of all possible observed data for that pass. To determine the proper quantities to be used in obtaining the deviations $(\xi_j - \bar{\xi}_j)$ appearing in Equation 21b, it is first observed that the averaging operation defined by Equation 8 corresponds to the definition of mean value given by Equation 21c. Thus, in a statistical sense, the best estimates obtained by applying the averaging operation of Equation 8 in Equations 12a, 12b, 16a through 16d, and 20g through 20j constitute unbiased estimates of the mean or true values of the orbital parameters for a single pass, thereby corresponding to the quantity $\bar{\xi}$ in the deviation $(\xi_j - \bar{\xi})$.

To obtain the measured quantities corresponding to $\xi_j$ in Equation 21b for each of the orbital parameters, it is next observed that for at least a single pass the two orbital orientation angles may be considered as constants, since for at least the duration of a single pass the orbital plane of a terrestrial satellite and the equatorial plane of the earth are fixed with respect to each other. This means that the true value of each of the orbital orientation angles is substantially the same for every pair of observed positions of a satellite during a given pass; therefore, the best estimates $\Omega_c$ and $I_c$ are unbiased estimates of the same true values of the orbital orientation angles for each pair of observed positions of a satellite to which the smoothing operation of this invention is applied. As a result, the deviations for the two orbital orientation angles may be formed from the quantities appearing in Equations 12a and 12b, substituting $\Omega_c$ and $I_c$ for the mean value $\bar{\xi}$, and substituting $\Omega_j$ and $I_j$ from the sequences $\{\Omega\}$ and $\{I\}$ for the measured quantity $\xi_{ji}$; hence the sample variances for the two orbital orientation angles are given by $$\text{var}\{\Omega\} = \frac{1}{m-1}\sum_{j=1}^{m}(\Omega_j - \Omega_c)^2$$

and $$\text{var}\{I\} = \frac{1}{m-1}\sum_{j=1}^{m}(I_j - I_c)^2$$

Unlike the two orbital orientation angles, the other four orbital parameters are functions of time, except in the special case of a perfectly circular orbit, in which case only the central angle $\theta$ is a function of time and the other three parameters have constant values. This means that in general, for each of these four parameters, each observed quantity $\xi_{ji}$ measured at a time of observation $t_i$ is a measurement of a different true value of a time-varying orbital parameter. Since the best estimates $r_c$, $\theta_c$, $\dot{r}_c$, $\dot{\theta}_c$ are referred to a single reference time $t_c$, it is necessary to adjust the best estimates to refer to the time of observation $t_i$ of each measured quantity $\xi_{ji}$ in order to obtain meaningful deviations corresponding to the deviations $(\xi_{ji} - \bar{\xi})$ appearing in Equation 21b. This adjustment has already been made in the present invention in the trend removal process, during which components of the position vectors at the various times of observation have been regenerated from the best estimates through Equations 17a and 17b. As shown by Equations 20a and 20b, the regenerated components are subtracted from the corresponding observed components, and the resulting differences are smoothed in accordance with Equations 20c through 20f to produce quantities equivalent to deviations $(\xi_{ji} - \bar{\xi})$ for each of the four time-varying orbital parameters. It is to be understood, however, that the smoothed differences to be employed in deriving variances are those obtained in the last or kth cycle of trend removal, since only this last set of smoothed differences is derived from the best estimates, the definition of best estimates being the kth set of estimates that make each of the averaged smoothed differences from Equations 20g through 20j smaller than some preassigned quantity. Thus, the sample variances of the four time-varying orbital parameters are given by $$\text{var}\{r\} = \frac{1}{m-1}\sum_{j=1}^{m}(\overline{\Delta r_j}^k)^2$$

$$\text{var}\{\theta\} = \frac{1}{m-1}\sum_{j=1}^{m}(\overline{\Delta \theta_j}^k)^2$$

$$\text{var}\{\dot{r}\} = \frac{1}{m-1}\sum_{j=1}^{m}(\overline{\Delta \dot{r}_j}^k)^2$$

and $$\text{var}\{\dot{\theta}\} = \frac{1}{m-1}\sum_{j=1}^{m}(\overline{\Delta \dot{\theta}_j}^k)^2$$

Whereas variance is defined in terms of one parameter, covariance is defined in terms of two parameters. Given two populations, each comprising measurements of a different parameter, the covariance of the two populations is defined as the average of the product of the deviation of each population of measurements from the true value of its respective parameter. Thus, for two populations comprising the measurements $\xi_1, \xi_2, \ldots$, and $\psi_1, \psi_2, \ldots$, of two different parameters with true values $\mu$ and $\rho$, respectively, the covariance of the two populations is $$\text{cov}\{\xi,\psi\} = \text{cov}\{\psi,\xi\} = \text{ave}(\xi_i - \mu)(\psi_i - \rho)$$
$$i = 1, 2, \ldots \qquad (22a)$$

where "cov" stands for "covariance."

As in the case of variance, in practice the population covariance and the true values of each of the parameters must be written on the basis of samples of each of the two populations. Let one sample comprise the $m$ measurements $\xi_{j1}, \xi_{j2}, \ldots, \xi_{jm}$ and let the second sample comprise the $m$ measurements $\psi_{j1}, \psi_{j2}, \ldots, \psi_{jm}$. Then an unbiased estimate of the population covariance is given by the well-known sample covariance, $$\text{cov}\{\psi, \xi\}_j = \text{cov}\{\xi, \psi\}_j = \frac{1}{m-1}\sum_{i=1}^{m}(\xi_{ji} - \bar{\xi}_j)(\psi_{ji} - \bar{\psi}_j)$$
$$(22b)$$

where $\bar{\xi}_j$ and $\bar{\psi}_j$ are mean values of each sample as defined by Equation 21c. In applying Equation 22b to derive covariances of the orbital parameters for a single pass, the same quantities that are used in obtaining sample variance are used in obtaining sample covariance; however, where the sample variance is obtained by averaging the square of the deviations from the best estimate of a single orbital parameter, the sample covariance is obtained by averaging the product of the deviations from the best estimates of two orbital parameters. In addition, it is noted that there are six sample variances for each set of best estimates for a single pass, one for each of the six orbital parameters, whereas there are fifteen sample covariances, one for each of the fifteen possible combinations of the six orbital parameters taken two at a time.

As will be shown in detail below, the adjustment of an earlier set of variances and covariances to a later reference time and the combining of two sets of best estimates require the so-called "sample-mean" variances and covariances of a population of best estimates rather than the sample variances and covariances defined by Equations 21b and 22b. The distinction between the two sets of variances and covariances is illustrated by the following example.

Let $(\{\xi\}_1, \{\xi\}_2, \ldots, \{\xi\}_M)$ represent M samples of equal size $m$ drawn from an original population $\{\xi\}$ with true value $\mu$ and variance var $\{\xi\}$, where the jth sample is defined as $$\{\xi\}_j = \{\xi_{j1}, \xi_{j2}, \ldots, \xi_{jm}\}, j = 1, 2, \ldots, M \qquad (23a)$$

This $j$th sample has a mean value $\bar{\xi}_j$, as defined by Equation 21c. Now for $M \to \infty$ the mean values of the M samples constitute a second population $$\{\bar{\xi}\} = \{\bar{\xi}_1, \bar{\xi}_2, \ldots, \bar{\xi}_M\}$$

and this population of mean values has its own mean value $\bar{\bar{\xi}}$, $$\bar{\bar{\xi}} = \lim_{M \to \infty} \frac{1}{M} \sum_{j=1}^{M} \bar{\xi}_j \qquad (23b)$$

and its own so-called "sample-mean" variance, var $\{\bar{\xi}\}$, $$\text{var}\{\bar{\xi}\} = \text{ave}\left(\bar{\xi}_j - \bar{\bar{\xi}}\right)^2, j=1, 2, \ldots, M \quad (23c)$$

It is a well-known result in statistical sampling theory that the mean value, $\bar{\bar{\xi}}$, of the population of mean values is an estimate of the true value, $\mu$, of the original population $\{\xi\}$; hence Equation 23c may be rewritten $$\text{var}\{\bar{\xi}\} = \text{ave}\left(\bar{\xi}_j - \mu\right)^2 \qquad (23d)$$

It is also well known that the sample-mean variance var $\{\bar{\xi}\}$ is an estimate of the original population variance divided by $m$, that is, $$\text{var}\{\bar{\xi}\} = \frac{1}{m} \text{var}\{\xi\} \qquad (23e)$$

Equation 23e in conjunction with Equation 21b provides a means for obtaining an estimate of the sample-mean variance when only a single sample, for example, the observed data for a single pass, is available. The sample variance defined by Equation 21b is an estimate of the original population variance; therefore, to obtain an estimate of the sample-mean variance, it is only necessary to divide the sample variance by a factor $m$, $$\text{var}\{\bar{\xi}\} = \frac{1}{m(m-1)} \sum_{i=1}^{m} (\xi_{ji} - \bar{\xi}_j)^2 \qquad (23f)$$

By analogy with the above results in the case of sample-mean variance, the sample-mean covariance is defined as $$\text{cov}\{\bar{\psi}, \bar{\xi}\} = \text{cov}\{\bar{\xi}, \bar{\psi}\} = \text{ave}\left(\bar{\xi}_j - \bar{\bar{\xi}}\right)\left(\bar{\psi}_j - \bar{\bar{\psi}}\right), j = 1, 2, \ldots, M \qquad (23g)$$

which may also be written in terms of the true values $\mu, \rho$, $$\text{cov}\{\bar{\psi}, \bar{\xi}\} = \text{cov}\{\bar{\xi}, \bar{\psi}\} = \text{ave}\left(\bar{\xi}_j - \mu\right)\left(\bar{\psi}_j - \rho\right) \qquad (23h)$$

Similarly, an estimate of the sample-mean covariance may be obtained from a single sample by using the sample covariance defined by Equation 22b and dividing by a factor $m$, $$\text{cov}\{\bar{\psi}, \bar{\xi}\} = \text{cov}\{\bar{\xi}, \bar{\psi}\} = \frac{1}{m(m-1)} \sum_{i=1}^{m} (\xi_{ji} - \bar{\xi}_j)(\psi_{ji} - \bar{\psi}_j) \qquad (23i)$$

In the case of a set of best estimates derived by the present invention in the fashion previously described, such a set may be considered as a single element in population of sets of best estimates, corresponding to the population of mean values, $\{\bar{\xi}\}$. In this invention, the "sample-mean" variances and covariances of this population of sets of best estimates are employed in adjusting to a later reference time and in combining sets of best estimates, and estimates of these sample-mean variances and covariances may be obtained from the observed data for a single pass by employing in Equations 23f and 23i the same deviations of the six parameters used in obtaining sample variances and sample covariances.

C. ADJUSTMENT OF REFERENCE TIME

After obtaining estimates of the sample-mean variances and sample-mean covariances for each of two sets of best estimates, the next operation before combining the two sets of estimates is to refer both sets of estimates, and their associated variances and covariances, to a common reference time. As mentioned previously, it is preferred to accomplish this by adjusting the earlier set of estimates and associated variances and covariances to the reference time of the later set.

Let the reference time of the earlier set of estimates be denoted $t_1$, and let the reference time of the later set of estimates be denoted $t_2$ where $t_2 > t_1$. Further, let the best estimates at $t_1$ be denoted $\bar{r}, \bar{\theta}, \bar{\dot{r}}, \bar{\dot{\theta}}, \bar{\Omega}, \bar{I}$. One way in which the earlier set of best estimates may be adjusted to the reference time of the later set of best estimates is by using any one of a number of sets of well-known prediction equations to predict a set of estimates at time $t_2$ from the set of best estimates at time $t_1$. If the "predicted" estimates obtained from the best estimates are denoted $$\hat{r}, \hat{\theta}, \hat{\dot{r}}, \hat{\dot{\theta}}, \hat{\Omega}, \hat{I},$$

then the predicted estimates may be written in general form as functions of the best estimates, that is, $$\hat{r} = F_r(\bar{r}, \bar{\theta}, \bar{\dot{r}}, \bar{\dot{\theta}}, \bar{\Omega}, \bar{I}, t_1, t_2) \qquad (24a)$$

$$\hat{\theta} = F_\theta( \quad \text{do} \quad ) \qquad (24b)$$

$$\hat{\dot{r}} = F_{\dot{r}}( \quad \text{do} \quad ) \qquad (24c)$$

$$\hat{\dot{\theta}} = F_{\dot{\theta}}( \quad \text{do} \quad ) \qquad (24d)$$

$$\hat{\Omega} = F_\Omega( \quad \text{do} \quad ) \qquad (24e)$$

and $$\hat{I} = F_I( \quad \text{do} \quad ) \qquad (24f)$$

For the purpose of adjusting the earlier set of variances and covariances, the general prediction equations represented by Equations 24a through 24f above may be replaced by the following set of specific prediction equations derived from the well-known differential equations of motion previously given by Equations 18c and 18d.

$$\hat{r} = \frac{A^2}{k(1 - \alpha \cos \varphi - \beta \sin \varphi)} \qquad (25a)$$

$$t_2 - t_1 = \frac{A^3}{k^2} \int_0^\varphi \frac{d\lambda}{(1 - \alpha \cos \lambda - \beta \sin \lambda)^2} \qquad (25b)$$

$$\hat{\dot{r}} = \frac{k}{A}(-\alpha \sin \varphi + \beta \cos \varphi) \qquad (25c)$$

$$\hat{\dot{\theta}} = \frac{A}{\hat{r}^2} \qquad (25d)$$

$$\hat{\Omega} = \bar{\Omega} \qquad (25e)$$

$$\hat{I} = \bar{I} \qquad (25f)$$

where $$A = \bar{r}^2 \bar{\dot{\theta}} \qquad (25g)$$

$$\alpha = 1 - \frac{A^2}{k \bar{r}} \qquad (25h)$$

$$\beta = \frac{A \bar{\dot{r}}}{k} \qquad (25j)$$

$$\varphi = \hat{\theta} - \bar{\theta} \qquad (25k)$$

and $k$ is the product of the universal gravitational constant times the mass of the earth. Equation 25b may be replaced by the following approximation, if it is desired to express the predicted angle $\hat{\theta}$ in terms of the best estimate $\bar{\theta}$, $$\hat{\theta} = \bar{\theta} + \frac{k^2}{A^3}(1 - \alpha^2 - \beta^2)^{3/2}(t_2 - t_1) \qquad (25l)$$

Equations 25a through 25f do not take into account perturbations of a satellite's orbit due to such sources as atmospheric drag, radiation pressure, and nonsphericity of the earth, since for the purpose of adjusting variances and covariances, these perturbations are small enough to be neglected. In addition, it is noted in Equations 25e and 25f that for the purpose of adjusting variances and covariances, the two orbital orientation angles may be considered constant. It is to be understood, however, that for obtaining predictions generally, and for adjusting best estimates specifically, perturbations and changes in the orbital orientation angles must be taken into account in order to obtain sufficiently precise results.

In addition to adjusting the earlier of two sets of best estimates to the later reference time by obtaining a set of predicted estimates from the earlier set of best estimates, the present invention adjusts the earlier set of variances and covariances to the later reference time by obtaining the variances and covariances of the predicted estimates from the variances and covariances of the earlier set of best estimates. As will be shown below, a specific expression relates the variances and covariances of the predicted estimates to the variances and covariances of the earlier set of best estimates.

Because of the large number of best estimates and associated variances and covariances, it is convenient at this point to introduce the following matrix notation which will be employed henceforth as an alternative to the notation for individual quantities previously given. Let the true values of the six orbital parameters at a reference time $t_1$ be arranged in a one-column matrix $[\mu]$, $$\mu = \begin{bmatrix} r_1 \\ \theta_1 \\ \dot{r}_1 \\ \dot{\theta}_1 \\ \Omega_1 \\ I_1 \end{bmatrix} \quad (26a)$$

and let the set of best estimates of the true values at reference time $t_1$ which are obtained by this invention be arranged in a one-column matrix $[\bar{q}]$, $$[\bar{q}] = \begin{bmatrix} \bar{r} \\ \bar{\theta} \\ \bar{\dot{r}} \\ \bar{\dot{\theta}} \\ \bar{\Omega} \\ \bar{I} \end{bmatrix} \quad (26b)$$

Now, as previously suggested, the set of best estimates $[\bar{q}]$ derived from the observed data for a single pass may be considered as one of M sets of best estimates, $([\bar{q}]_1, [\bar{q}]_2, \ldots, [\bar{q}]_M)$, derived from M samples of observed data of equal size $m$. From Equations 23d and 23h, the sample-mean variances and covariances of the population of sets of estimates may be arranged as the elements of a so-called sample-mean "variance-covariance" matrix $[C]$, which is defined as $$[C] = \text{ave } \{[\bar{q}_i - \mu] \cdot [\bar{q}_i - \mu]'\}, \, i = 1, 2, \ldots, M \quad (26c)$$

where the prime symbol (') denotes the transpose of the matrix to which it is affixed. The elements of $[C]$ are the six sample-mean variances and the fifteen sample-mean covariances, with the six variances arranged on the principal diagonal and the fifteen covariances disposed symmetrically about the principal diagonal.

In this invention, the elements of the sample-mean variance-covariance matrix defined by Equation 26c are estimated from the observed data from a single pass by utilizing in Equations 23f and 23i the same deviations employed in Equations 21b and 22b. These estimates of the sample-mean variances and covariances may be denoted, for example, $(\bar{r}, \bar{r})$ for the estimate of the sample-mean variance associated with best estimate $\bar{r}$, and $(\bar{r}, \bar{\theta})$, for the estimate of the sample-mean covariance associated with best estimates $r_c$ and $\theta_c$. These estimates define the elements of an estimated sample-mean variance-covariance matrix $[\bar{C}]$, whose elements are arranged in the following array:

$$[\bar{C}] = \begin{bmatrix} (\bar{r},\bar{r}) & (\bar{r},\bar{\theta}) & (\bar{r},\bar{\dot{r}}) & (\bar{r},\bar{\dot{\theta}}) & (\bar{r},\bar{\Omega}) & (\bar{r},\bar{I}) \\ (\bar{r},\bar{\theta}) & (\bar{\theta},\bar{\theta}) & (\bar{\theta},\dot{r}) & (\bar{\theta},\bar{\dot{\theta}}) & (\bar{\theta},\bar{\Omega}) & (\bar{\theta},\bar{I}) \\ (\bar{r},\bar{\dot{r}}) & (\bar{\theta},\bar{\dot{r}}) & (\bar{\dot{r}},\bar{\dot{r}}) & (\bar{\dot{r}},\bar{\dot{\theta}}) & (\bar{\dot{r}},\bar{\Omega}) & (\bar{\dot{r}},\bar{I}) \\ (\bar{r},\bar{\dot{\theta}}) & (\bar{\theta},\bar{\dot{\theta}}) & (\bar{\dot{r}},\bar{\dot{\theta}}) & (\bar{\dot{\theta}},\bar{\dot{\theta}}) & (\bar{\dot{\theta}},\bar{\Omega}) & (\bar{\dot{\theta}},\bar{I}) \\ (\bar{r},\bar{\Omega}) & (\bar{\theta},\bar{\Omega}) & (\bar{\dot{r}},\bar{\Omega}) & (\bar{\dot{\theta}},\bar{\Omega}) & (\bar{\Omega},\bar{\Omega}) & (\bar{\Omega},\bar{I}) \\ (\bar{r},\bar{I}) & (\bar{\theta},\bar{I}) & (\bar{\dot{r}},\bar{I}) & (\bar{\dot{\theta}},\bar{I}) & (\bar{\Omega},\bar{I}) & (\bar{I},\bar{I}) \end{bmatrix} \quad (26d)$$

Thus, just as the matrix of best estimates $[\bar{q}]$ is an estimate of the matrix of true values $[\mu]$, so the matrix of estimated sample-mean variances and covariances $[\bar{C}]$ is an estimate of the true sample-mean variance-covariance matrix $[C]$.

Turning now to the problem of adjusting an earlier set of variances and covariances to a later reference time, the following discussion will be in terms of the two orbital parameters $r$ and $\theta$; it is believed that the extension to all six parameters of the results obtained will be clear. Let $\bar{r}_i$, $\bar{\theta}_i$, $i = 1, 2, \ldots, n$ represent elements of populations of best estimates of each of the true values $r_1$, $\theta_1$ at the earlier reference time $t_1$, and let $\hat{r}_i$, $\hat{\theta}_i$ represent elements of corresponding populations of predicted estimates of each of the true values $r_2$, $\theta_2$ at the later reference time $t_2$, $t_2 > t_1$. Since in this invention both the predicted estimates and the best estimates of each parameter approximate the true values with a high degree of accuracy, the difference or error between each estimate and the corresponding true value is very small. These differences may be expressed by the following set of difference equations:

$$\Delta \bar{r}_i = \bar{r}_i - r_1 \quad (27a)$$

$$\Delta \hat{r}_i = \hat{r}_i - r_2 \quad (27b)$$

$$\Delta \bar{\theta}_i = \bar{\theta}_i - \theta_1 \quad (27c)$$

$$\Delta \hat{\theta}_i = \hat{\theta}_i - \theta_2 \quad (27d)$$

Since each predicted estimate is a function of the best estimates, as expressed in general form by Equations 24a through 24f, each difference equation of predicted estimates, (27b) and (27d), is related to the difference equations of best estimates, (27a) and (27c), through a well-known result in calculus. This result states that the increment $\Delta u$ of a function of several variables, $$u = f(x, y, \ldots)$$

is approximated by the linear differential $du$ of the function under certain conditions. Specifically, if the increment $\Delta u$ is defined as $$\Delta u = f(x + \Delta x, y + \Delta y, \ldots) - f(x, y, \ldots) \quad (28a)$$

and the linear differential is defined as $$du = \frac{\partial u}{\partial x} \Delta x + \frac{\partial u}{\partial y} \Delta y + \cdots \quad (28b)$$

then $du$ approximates $\Delta u$ provided that the increments $\Delta x$, $\Delta y$, $\ldots$, of the independent variables $x$, $y$, $\ldots$, are sufficiently small, that is, $$\Delta u = \frac{\partial u}{\partial x} \Delta x + \frac{\partial u}{\partial y} \Delta y + \cdots \quad (28c)$$

From a comparison of Equation 28a with difference Equations 27a through 27d, it is seen that the differences $\Delta \hat{r}_i$, $\Delta \hat{\theta}_i$ correspond to the increment, $\Delta u$, and the differences $\Delta \overline{r}_i$, $\Delta \overline{\theta}_i$ to the increments $\Delta x$, $\Delta y$, and that therefore the following relationships are valid approximations:

$$\Delta \hat{r}_i = \frac{\partial \hat{r}_i}{\partial \overline{r}_i}\Delta \overline{r}_i + \frac{\partial \hat{r}_i}{\partial \overline{\theta}_i}\Delta \overline{\theta}_i + \cdots \quad (29a)$$

$$\Delta \hat{\theta}_i = \frac{\partial \hat{r}_i}{\partial \overline{r}_i}\Delta \overline{r}_i + \frac{\partial \hat{r}_i}{\partial \overline{\theta}_i}\Delta \overline{\theta}_i + \cdots \quad (29b)$$

Equations 29a and 29b readily suggest specific expressions for the sample-mean variances and covariances of the predicted estimates. Thus, from Equations 23d and 29a the sample-mean variance of the population of predicted estimates $\{\hat{r}\}=\{\hat{r}_1, \hat{r}_2, \ldots\}$ of the orbital parameter $r$ may be written $$\text{var } \{\hat{r}\} = \text{ave } (\hat{r}_i - r_2)^2$$

$$= \text{ave}\left(\frac{\partial \hat{r}_i}{\partial \overline{r}_i}\Delta \overline{r}_i + \frac{\partial \hat{r}_i}{\partial \overline{\theta}_i}\Delta \overline{\theta}_i + \cdots\right)^2 \quad (30a)$$

Expanding and collecting terms in Equation 30a, and treating "ave" as an operator acting across the sum of terms, the expression for var $\{\hat{r}\}$ may be rewritten, $$\text{var } \{\hat{r}\} = \left(\frac{\partial \hat{r}_i}{\partial \overline{r}_i}\right)^2 \text{ave } (\Delta \overline{r}_i)^2 + \left(\frac{\partial \hat{r}_i}{\partial \overline{\theta}_i}\right)^2 \text{ave } (\Delta_i \overline{\theta})^2 + \cdots$$

$$+2\frac{\partial \hat{r}_i}{\partial \overline{r}_i}\frac{\partial \hat{r}_i}{\partial \overline{\theta}_i}\text{ave } (\Delta \overline{r}_i)(\Delta \overline{\theta}_i) + \cdots \quad (30b)$$

From Equations 23d, 23g, 27a, and 27c, $$\text{ave } (\Delta \overline{r}_i)^2 = \text{ave } (\overline{r}_i - r_1)^2 = \text{var } \{\overline{r}\}$$
$$\text{ave } (\Delta \overline{\theta}_i)^2 = \text{ave } (\overline{\theta}_i - \theta_1)^2 = \text{var } \{\overline{\theta}\}$$

and $$\text{ave } (\Delta \overline{r}_i)(\Delta \overline{\theta}_i) = \text{ave } (\overline{r}_i - r_1)(\overline{\theta} - \theta_1) = \text{cov } \{\overline{r}, \overline{\theta}\}$$

hence, Equation 30b may be expressed $$\text{var } \{\hat{r}\} = \left(\frac{\partial \hat{r}_i}{\partial \overline{r}_i}\right)^2 \text{var } \{\overline{r}\} + \left(\frac{\partial \hat{r}_i}{\partial \overline{\theta}_i}\right)^2 \text{var } \{\overline{\theta}\} + \cdots$$

$$+2\left(\frac{\partial \overline{r}_i}{\partial \overline{r}_i}\right)\left(\frac{\partial \hat{r}_i}{\partial \overline{\theta}_i}\right) \text{cov } \{\overline{r}, \overline{\theta}\} + \cdots \quad (30c)$$

Similarly, since the sample-mean covariance of the populations of predicted estimates of $r$ and $\theta$ may be written $$\text{cov } \{\hat{r}, \hat{\theta}\} = \text{ave } (\hat{r}_i - r_2)(\hat{\theta}_i - \theta_2) \quad (31a)$$

by substituting the differential approximations of Equations 29a and 29b, Equation 31a may be expressed as $$\text{cov } \{\hat{r}, \hat{\theta}\} = \text{ave } \left(\frac{\partial \hat{r}_i}{\partial \overline{r}_i}\Delta \overline{r}_i + \frac{\partial \hat{r}_i}{\partial \overline{\theta}_i}\Delta \overline{\theta}_i + \cdots\right)$$
$$\left(\frac{\partial \hat{\theta}_i}{\partial \overline{r}_i}\Delta \overline{r}_i + \frac{\partial \hat{\theta}_i}{\partial \overline{\theta}_i}\Delta \overline{\theta}_i + \cdots\right) \quad (31b)$$

$$= \frac{\partial \hat{r}_i}{\partial \overline{r}_i}\cdot\frac{\partial \hat{\theta}_i}{\partial \overline{r}_i}\text{ave } (\Delta \overline{r}_i)^2 + 2\frac{\partial \hat{r}_i}{\partial \overline{\theta}_i}\frac{\partial \hat{\theta}_i}{\partial \overline{r}_i}\text{ave } (\Delta \overline{\theta}_i)(\Delta \overline{r}_i) +$$

$$\frac{\partial \hat{r}_i}{\partial \overline{\theta}_i}\frac{\partial \hat{\theta}_i}{\partial \overline{\theta}_i}\text{ave } (\Delta \overline{\theta}_i)^2 + \cdots \quad (31c)$$

$$= \frac{\partial \hat{r}_i}{\partial \overline{r}_i}\frac{\partial \hat{\theta}_i}{\partial \overline{r}_i}\text{var } \{\overline{r}\} + 2\frac{\partial \hat{r}_i}{\partial \overline{\theta}_i}\frac{\partial \hat{\theta}_i}{\partial \overline{r}_i}\text{cov } \{\overline{r}, \overline{\theta}\} +$$

$$\frac{\partial \hat{r}_i}{\partial \overline{\theta}_i}\frac{\partial \hat{\theta}_i}{\partial \overline{\theta}_i}\text{var } \{\overline{\theta}\} + \cdots \quad (31d)$$

It is thus observed in Equations 30c and 31d that the sample-mean variances and covariances of the predicted estimates may be obtained in terms of the sample-mean variances and covariances of the best estimates from which the predicted estimates were derived, and in terms of the partial derivatives of the equations of prediction. Similar equations may be derived for all the sample-mean variances and covariances of the six predicted estimates, and the following matrix equation may be used to summarize the relationship between all of the sample-mean variances and covariances of the best estimates and all of the sample-mean variances and covariances of the predicted estimates.

Let the sample-mean variance-covariance matrix of the population of sets of best estimates at time $t_1$ to be denoted $[C]_1$, and let the variance-covariance matrix of the sets of predicted estimates at time $t_2$ be denoted $[C]_2$. Further, the well-known Jacobian matrix $[J]$, whose elements are partial derivatives, may be expressed in terms of the functional relationship between predicted and best estimates; thus $$[J] = \begin{bmatrix} \frac{\partial \hat{r}}{\partial \overline{r}} & \frac{\partial \hat{r}}{\partial \overline{\theta}} & \frac{\partial \hat{r}}{\partial \dot{\overline{r}}} & \frac{\partial \hat{r}}{\partial \dot{\overline{\theta}}} & \frac{\partial \hat{r}}{\partial \overline{\Omega}} & \frac{\partial \hat{r}}{\partial \overline{I}} \\ \frac{\partial \hat{\theta}}{\partial \overline{r}} & \frac{\partial \hat{\theta}}{\partial \overline{\theta}} & \frac{\partial \hat{\theta}}{\partial \dot{\overline{r}}} & \frac{\partial \hat{\theta}}{\partial \dot{\overline{\theta}}} & \frac{\partial \hat{\theta}}{\partial \overline{\Omega}} & \frac{\partial \hat{\theta}}{\partial \overline{I}} \\ \frac{\partial \dot{\hat{r}}}{\partial \overline{r}} & \frac{\partial \dot{\hat{r}}}{\partial \overline{\theta}} & \frac{\partial \dot{\hat{r}}}{\partial \dot{\overline{r}}} & \frac{\partial \dot{\hat{r}}}{\partial \dot{\overline{\theta}}} & \frac{\partial \dot{\hat{r}}}{\partial \overline{\Omega}} & \frac{\partial \dot{\hat{r}}}{\partial \overline{I}} \\ \frac{\partial \dot{\hat{\theta}}}{\partial \overline{r}} & \frac{\partial \dot{\hat{\theta}}}{\partial \overline{\theta}} & \frac{\partial \dot{\hat{\theta}}}{\partial \dot{\overline{r}}} & \frac{\partial \dot{\hat{\theta}}}{\partial \dot{\overline{\theta}}} & \frac{\partial \dot{\hat{\theta}}}{\partial \overline{\Omega}} & \frac{\partial \dot{\hat{\theta}}}{\partial \overline{I}} \\ \frac{\partial \hat{\Omega}}{\partial \overline{r}} & \frac{\partial \hat{\Omega}}{\partial \overline{\theta}} & \frac{\partial \hat{\Omega}}{\partial \dot{\overline{r}}} & \frac{\partial \hat{\Omega}}{\partial \dot{\overline{\theta}}} & \frac{\partial \hat{\Omega}}{\partial \overline{\Omega}} & \frac{\partial \hat{\Omega}}{\partial \overline{I}} \\ \frac{\partial \hat{I}}{\partial \overline{r}} & \frac{\partial \hat{I}}{\partial \overline{\theta}} & \frac{\partial \hat{I}}{\partial \dot{\overline{r}}} & \frac{\partial \hat{I}}{\partial \dot{\overline{\theta}}} & \frac{\partial \hat{I}}{\partial \overline{\Omega}} & \frac{\partial \hat{I}}{\partial \overline{I}} \end{bmatrix} \quad (32a)$$

Then from Equations 30c and 31d it is apparent that the variance-covariance matrix $[C]_2$ of the population of sets of predicted estimates at time $t_2$ is related to the variance-covariance matrix $[C]_1$ of the population of sets of best estimates at time $t_1$ through the matrix equation $$[C]_2 = [J] \cdot [C]_1 \cdot [J'] \quad (32b)$$

or, in inverse matrix form, $$[C]_2^{-1} = [J']^{-1} \cdot [C]_1^{-1} \cdot [J]^{-1} \quad (32c)$$

where $[J']$ denotes the transpose of $[J]$, and the superscript $^{-1}$ denotes the inverse of the matrix to which it is affixed. Although the relationships between variances and covariances represented by Equations 32b and 32c were derived in terms of the true sample-mean variances and covariances of populations of estimates, these results are equally valid for deriving estimates of the sample-mean variances and sample-mean covariances associated with a single set of predicted estimates from the corresponding estimates of the sample-mean variances and sample-mean covariances associated with a single set of best estimates.

The individual elements of the Jacobian matrix of Equation 32a may be evaluated by performing the appropriate differentiation of a specific set of prediction equations. For example, partial differentiation of the specific Equations 25a through 25f produces a Jacobian with the following elements:

$$\frac{\partial \hat{r}}{\partial \overline{r}} = \frac{\hat{r}}{\overline{r}}\left\{4 - \frac{k\hat{r}}{A^2}\left[3(1-\alpha)\cos\varphi - 2\beta\sin\varphi - \beta\overline{r}\frac{\partial \hat{\theta}}{\partial \overline{r}}\right]\right\}$$

(J-1)

$$\frac{\partial \hat{r}}{\partial \overline{\theta}} = 0 \quad (J-2)$$

$$\frac{\partial \hat{r}}{\partial \dot{\overline{r}}} = \frac{1}{\dot{\hat{\theta}}}\left[\sin\varphi + \hat{r}\frac{\partial \hat{\theta}}{\partial \dot{\overline{r}}}\right] \quad (J-3)$$

$$\frac{\partial \hat{r}}{\partial \dot{\overline{\theta}}} = \frac{\hat{r}}{\dot{\hat{\theta}}}\left\{2 - \frac{k\hat{r}}{A^2}\left[2(1-\alpha)\cos\varphi - \beta\sin\varphi\beta\overline{\theta}\frac{\partial \hat{\theta}}{\partial \dot{\overline{\theta}}}\right]\right\}$$

(J-4)

$$\frac{\partial \hat{r}}{\partial \overline{\Omega}} = 0 \quad (J-5)$$

$$\frac{\partial \hat{r}}{\partial \bar{I}}=0 \tag{J-6}$$

$$\frac{\partial \hat{\theta}}{\partial \bar{r}}=-\frac{1}{\bar{r}(1-\epsilon^2)}\left\{3(1-\alpha)(2-\alpha)(t_1-t_0)\hat{\theta}-\frac{1}{1-\alpha}[3N_\alpha-2\beta N_\beta]\right\} \tag{J-7}$$

where $$N_\alpha=\beta(\alpha-\hat{\alpha})[(1-\alpha)+(1-\hat{\alpha})]+(1-\alpha)^2(2-\hat{\alpha})\sin\varphi \tag{J-8}$$

$$N_\beta=(\alpha-\hat{\alpha})[(1-\alpha)+2(1-\hat{\alpha})]+(1-\alpha)(1-\cos\varphi) \tag{J-9}$$

and $$\hat{\alpha}=1-\frac{A^2}{k\hat{r}} \tag{J-10}$$

$$\hat{\beta}+\frac{A\hat{r}}{k} \tag{J-11}$$

$$\epsilon=\alpha^2+\beta^2=\hat{\alpha}^2+\hat{\beta}^2 \tag{J-12}$$

$$\frac{\partial \hat{\theta}}{\partial \bar{\theta}}=1 \tag{J-13}$$

$$\frac{\partial \hat{\theta}}{\partial \bar{\dot{r}}}=\frac{-A}{k(1-\epsilon^2)}\left\{3\beta(t_1-t_0)\hat{\theta}+\frac{N_\beta}{1-\alpha}\right\} \tag{J-14}$$

$$\frac{\partial \hat{\theta}}{\partial \bar{\dot{\theta}}}=-\frac{1}{\bar{\dot{\theta}}(1-\epsilon^2)}\left\{3(1-\alpha)^2(t_1-t_0)\bar{\dot{\theta}}-\frac{1}{1-\alpha}[2N_\alpha-\beta N_\beta]\right\} \tag{J-15}$$

$$\frac{\partial \hat{\theta}}{\partial \hat{\Omega}}=0 \tag{J-16}$$

$$\frac{\partial \hat{\theta}}{\partial \hat{I}}=0 \tag{J-17}$$

$$\frac{\partial \hat{\dot{r}}}{\partial \bar{r}}=-\frac{2\hat{\dot{r}}}{\bar{r}}+\frac{k}{A\bar{r}}\left\{\left[3(1-\alpha)-\beta\bar{r}\frac{\partial \hat{\theta}}{\partial \bar{r}}\right]\sin\varphi+\left[2\beta-\alpha\bar{r}\frac{\partial \bar{\theta}}{\partial \bar{r}}\right]\cos\varphi\right\} \tag{J-18}$$

$$\frac{\partial \hat{\dot{r}}}{\partial \bar{\theta}}=0 \tag{J-19}$$

$$\frac{\partial \hat{\dot{r}}}{\partial \bar{\dot{r}}}=\left(1-\frac{k\alpha}{A}\frac{\partial \hat{\theta}}{\partial \bar{\dot{r}}}\right)\cos\varphi-\frac{k\beta}{A}\frac{\partial \bar{\theta}}{\partial \bar{\dot{r}}}\sin\varphi \tag{J-20}$$

$$\frac{\partial \hat{\dot{r}}}{\partial \bar{\dot{\theta}}}=-\frac{\hat{\dot{r}}}{\bar{\dot{\theta}}}+\frac{k}{A\bar{\dot{\theta}}}\left\{\left[2(1-\alpha)-\beta\bar{\dot{\theta}}\frac{\partial \hat{\theta}}{\partial \bar{\dot{\theta}}}\right]\sin\varphi+\left[\beta-\alpha\bar{\dot{\theta}}\frac{\partial \bar{\theta}}{\partial \bar{\dot{\theta}}}\right]\cos\varphi\right\} \tag{J-21}$$

$$\frac{\partial \hat{\dot{r}}}{\partial \hat{\Omega}}=0 \tag{J-22}$$

$$\frac{\partial \hat{\dot{r}}}{\partial \bar{I}}=0 \tag{J-23}$$

$$\frac{\partial \hat{\dot{\theta}}}{\partial \bar{r}}+\frac{2\bar{\dot{\theta}}}{\bar{r}}\left(1-\frac{\bar{r}}{\hat{r}}\frac{\partial \hat{\dot{r}}}{\partial \bar{r}}\right) \tag{J-24}$$

$$\frac{\partial \hat{\dot{\theta}}}{\partial \bar{\theta}}=0 \tag{J-25}$$

$$\frac{\partial \hat{\dot{\theta}}}{\partial \bar{\dot{r}}}=-\frac{2\hat{\dot{\theta}}}{\hat{r}}\frac{\partial \hat{\dot{r}}}{\partial \bar{\dot{r}}} \tag{I-26}$$

$$\frac{\partial \hat{\dot{\theta}}}{\partial \bar{\dot{\theta}}}=\frac{\hat{\dot{\theta}}}{\bar{\dot{\theta}}}\left(1-\frac{2\bar{\dot{\theta}}}{\hat{r}}\frac{\partial \hat{\dot{r}}}{\partial \bar{\dot{\theta}}}\right) \tag{J-27}$$

$$\frac{\partial \hat{\dot{\theta}}}{\partial \hat{\Omega}}=0 \tag{J-28}$$

$$\frac{\partial \hat{\dot{\theta}}}{\partial \bar{I}}=0 \tag{J-29}$$

$$\frac{\partial \hat{\Omega}}{\partial \bar{r}}=\frac{\partial \hat{\Omega}}{\partial \bar{\theta}}=\frac{\partial \hat{\Omega}}{\partial \bar{\dot{r}}}=\frac{\partial \hat{\Omega}}{\partial \bar{\dot{\theta}}}=\frac{\partial \hat{\Omega}}{\partial \bar{I}}=0 \tag{J-30}$$

$$\frac{\partial \hat{\Omega}}{\partial \bar{\Omega}}=1 \tag{J-31}$$

$$\frac{\partial \hat{I}}{\partial \bar{r}}=\frac{\partial \hat{I}}{\partial \bar{\theta}}=\frac{\partial \hat{I}}{\partial \bar{\dot{r}}}=\frac{\partial \hat{I}}{\partial \bar{\dot{\theta}}}=\frac{\partial \hat{I}}{\partial \bar{\Omega}}=0 \tag{J-32}$$

$$\frac{\partial \hat{I}}{\partial \bar{I}}=1 \tag{J-33}$$

The prediction Equations 25a through 25f, from which the Jacobian elements given above were derived, are based upon the general equations of motion (18c) and (18d), which describe the motion of a satellite in a noncircular orbit. In the special case of a circular orbit, however, the prediction equations and the Jacobian elements are greatly simplified. Thus in a circular orbit, the radius is a constant R, hence both the best estimate $\bar{r}$ and the predicted estimate $\hat{r}$ are equal to the constant $\hat{R}$, $$\hat{r}=\bar{r}=R \tag{33a}$$

and both of the first derivatives, $\hat{\dot{r}}$ and $\bar{\dot{r}}$, are equal to zero, $$\hat{\dot{r}}=\bar{\dot{r}}=0 \tag{33b}$$

Further, since the second derivatives $\hat{\ddot{r}}$ and $\bar{\ddot{r}}$ are also zero, Equation 18c specifies that the derivatives $\hat{\dot{\theta}}$ and $\bar{\dot{\theta}}$ are equal, $$\hat{\dot{\theta}}=\bar{\dot{\theta}}=\frac{1}{R}\sqrt{\frac{k}{R}}$$

or $$\hat{\dot{\theta}}=\bar{\dot{\theta}}=\frac{V}{R} \tag{33c}$$

where $$V=\sqrt{\frac{k}{R}}$$

Substituting Equations 33a through 33c in Equations 25b, 25g through 25j, and in Equations J-8 through J-12, $$(t_1-t_0)\frac{V}{R}=\varphi \tag{33d}$$

$$A=RV \tag{33e}$$

$$\alpha=\hat{\alpha}=\beta=\hat{\beta}=0 \tag{33f}$$

$$N_\alpha=2\sin\varphi \tag{33g}$$

$$N_\beta=2(1-\cos\varphi) \tag{33h}$$

Equations 33a through 33d, together with Equations 25e and 25f, constitute the prediction equations for a satellite in a circular orbit of constant radius R, and the following equations, together with Equations J-30 through J-33, comprise the corresponding Jacobian elements obtained by substituting Equations 33a through 33h in Equations J–1 through J–29.

$$\frac{\partial \hat{r}}{\partial \overline{r}} = 4 - 3 \cos \varphi \quad (K\text{-}1)$$

$$\frac{\partial \hat{r}}{\partial \overline{\theta}} = 0 \quad (K\text{-}2)$$

$$\frac{\partial \hat{r}}{\partial \dot{\overline{r}}} = \frac{R}{V} \sin \varphi \quad (K\text{-}3)$$

$$\frac{\partial \hat{r}}{\partial \dot{\overline{\theta}}} = \frac{2R^2}{V}(1 - \cos \varphi) \quad (K\text{-}4)$$

$$\frac{\partial \hat{r}}{\partial \overline{\Omega}} = \frac{\partial \hat{r}}{\partial \overline{I}} = 0 \quad (K\text{-}5)$$

$$\frac{\partial \hat{\theta}}{\partial \overline{r}} = -\frac{6}{R}(\varphi - \sin \varphi) \quad (K\text{-}6)$$

$$\frac{\partial \hat{\theta}}{\partial \overline{\theta}} = 1 \quad (K\text{-}7)$$

$$\frac{\partial \hat{\theta}}{\partial \dot{\overline{r}}} = -\frac{2}{V}(1 - \cos \varphi) \quad (K\text{-}8)$$

$$\frac{\partial \hat{\theta}}{\partial \dot{\overline{\theta}}} = -\frac{R}{V}(3\varphi - 4 \sin \varphi) \quad (K\text{-}9)$$

$$\frac{\partial \hat{\theta}}{\partial \overline{\Omega}} = \frac{\partial \hat{\theta}}{\partial \overline{I}} = 0 \quad (K\text{-}10)$$

$$\frac{\partial \hat{\dot{r}}}{\partial \overline{r}} = \frac{3V}{R} \sin \varphi \quad (K\text{-}11)$$

$$\frac{\partial \hat{\dot{r}}}{\partial \overline{\theta}} = 0 \quad (K\text{-}12)$$

$$\frac{\partial \hat{\dot{r}}}{\partial \dot{\overline{r}}} = \cos \varphi \quad (K\text{-}13)$$

$$\frac{\partial \hat{\dot{r}}}{\partial \dot{\overline{\theta}}} = 2R \sin \varphi \quad (K\text{-}14)$$

$$\frac{\partial \hat{\dot{r}}}{\partial \overline{\Omega}} = \frac{\partial \hat{\dot{r}}}{\partial \overline{I}} = 0 \quad (K\text{-}15)$$

$$\frac{\partial \hat{\dot{\theta}}}{\partial \overline{r}} = -\frac{6V}{R^2}(1 - \cos \varphi) \quad (K\text{-}16)$$

$$\frac{\partial \hat{\dot{\theta}}}{\partial \overline{\theta}} = 0 \quad (K\text{-}17)$$

$$\frac{\partial \hat{\dot{\theta}}}{\partial \dot{\overline{r}}} = -\frac{2}{R} \sin \varphi \quad (K\text{-}18)$$

$$\frac{\partial \hat{\dot{\theta}}}{\partial \dot{\overline{\theta}}} = -3 + 4 \cos \varphi \quad (K\text{-}19)$$

$$\frac{\partial \hat{\dot{\theta}}}{\partial \overline{\Omega}} = \frac{\partial \hat{\dot{\theta}}}{\partial \overline{I}} = 0 \quad (K\text{-}20)$$

D. MINIMIZING OF VARIANCES TO DERIVE REFINED ESTIMATES

Two sets of best estimates from different passes, for example, $[\overline{q}_j]$ and $[\hat{q}_j]$, which have been referred to a common reference time, for example, by adjusting the earlier set of estimates to the reference time of the later set of estimates in the manner described above, may each be considered as elements of two different populations of sets of best estimates derived from samples of two different populations of observed data. If the first population of best estimates is represented in matrix form by a sequence of one-column matrices $$\{[\overline{q}]\} = \{[\overline{q}_1], [\overline{q}_2], \ldots, [\overline{q}_M]\}$$

then from Equation 26c the sample-mean variance-covariance matrix $[\overline{C}]$ of this population of best estimates may be expressed in terms of the one-column matrix of true values of the orbital parameters, $[\mu]$, $$[\overline{C}] = \text{ave} \{[\overline{q}_j - \mu] \cdot [\overline{q}_j - \mu]'\}, j = 1, 2, \ldots, M \quad (34a)$$

Further, if the second population of best estimates, which may be replaced by a population of predicted estimates derived from it, is represented in matrix form by a sequence of one-column matrices $$\{[\hat{q}]\} = \{[\hat{q}_1], [\hat{q}_2], \ldots, [\hat{q}_M]\}$$

then the sample-mean variance-covariance matrix $[\hat{C}]$ of this second population is also expressed in terms of the same matrix of true values $[\mu]$, because the estimates in both populations are approximations of the true values of the orbital parameters at the same reference time; hence, $$[\hat{C}] \text{ ave } \{[\hat{q}_j - \mu] \cdot [\hat{q}_j - \mu]'\}, j = 1, 2, \ldots, M \quad (34b)$$

In order to combine two sets of estimates from different passes to form a new set of so-called "refined" estimates which is more accurate than either of the individual "one-pass" sets of estimates, this invention forms a new population of estimates, $$\{[\tilde{q}]\} = \{[\tilde{q}_1], [\tilde{q}_2], \ldots, [\tilde{q}_M]\}$$

each element of which is a weighted average of estimates from two different passes, $$[\tilde{q}_j] = [\overline{w}_j][\overline{q}_j] + [\hat{w}_j][\hat{q}_j], j = 1, 2, \ldots, M \quad (35)$$

in which $[\overline{w}_j]$ and $[\hat{w}_j]$ are unknown square weighting matrices, and $[\tilde{q}_j]$ is the $j$th new set of estimates defined by the weighted average of $[\overline{q}_j]$ and $[\hat{q}_j]$. The weighting matrices are subject to the constraint that if $$[\overline{q}_j] = [\hat{q}_j]$$

then $$[\tilde{q}_j] = [\overline{q}_j] = [\hat{q}_j]$$

and therefore $$[\overline{w}_j] + [\hat{w}_j] = [1] \quad (36)$$

where [1] denotes the unit matrix.

In order to obtain a solution for the unknown weighting matrices in Equation 35 such that the resulting weighted average is more accurate than either of the individual one-pass estimates, the present invention proceeds on the basis that among several populations of estimates, the population with the smallest variance is the best approximation, in a probability sense, to the true values of the orbital parameters. In particular, this invention makes the variances of the weighted average defined by Equation 35 smaller than the variances of either of the individual populations of one-pass estimates by minimizing the variances of the weighted average. The equations for minimizing the variances of the weighted average, in conjunction with the constraint of Equation 36, provide a specific solution for Equation 35 through evaluation of the unknown weighting matrices in terms of the variances and covariances of the one-pass estimates, which are known through the estimates obtained from Equations 23f and 23i. The population of refined estimates obtained in this invention by minimizing variances is therefore a weighted average of two populations of individual one-pass estimates which is more accurate than either of the populations of one-pass estimates.

Since it is assumed that the elements of the two populations of one-pass estimates are approximations of the same set of true values of the orbital parameters $[\mu]$, the elements of the new population of estimates defined by the weighted averaging of Equation 35 are also approximations of the same set of true values. Accordingly, the variance-covariance matrix $[\tilde{C}]$ of the new population of weighted averages may be written $$[\tilde{C}] = \text{ave}\{[\tilde{q}_j - \mu]\cdot[\tilde{q}_j - \mu]'\} \quad (37)$$

By substituting in Equation 37 the definition given by Equation 35 for $[\tilde{q}_j]$, and by multiplying $[\mu]$ in 37 by $$[\overline{w}_j] + [\hat{w}_j] = [1]$$

from Equation 36, Equation 37 may be rewritten $$[\tilde{C}] = \text{ave}\{([\overline{w}_j][\overline{q}_j] + [\hat{w}_j][\hat{q}_j] - ([\overline{w}_j] + [\hat{w}_j])[\mu])\cdot$$
$$([\overline{w}_j][\overline{q}_j] + [\hat{w}_j][\hat{q}_j] - ([\overline{w}_j] + [\hat{w}_j])[\mu])'\}$$

$$= \text{ave}\{([\overline{w}_j][\overline{q}_j - \mu] + [\hat{w}_j][\hat{q}_j - \mu])\cdot([\overline{q}_j - \mu]'[\overline{w}_j]'$$
$$+ [\hat{q}_j - \mu]'[\hat{w}_j]')\} \quad (38a)$$

Perform the multiplication indicated on the right-hand side of Equation 38a and permit "ave" to act as an operator across the resulting sum of terms, $$[\tilde{C}] = ([\overline{w}_j] \text{ ave }\{[\overline{q}_j - \mu][\overline{q}_j - \mu]'\}[\overline{w}_j]')$$
$$+ ([\hat{w}_j] \text{ ave }\{[\hat{q}_j - \mu][\overline{q}_j - \mu]'\}[\overline{w}_j]')$$
$$+ ([\overline{w}_j] \text{ ave }\{[\overline{q}_j - \mu][\hat{q}_j - \mu]'\}[\hat{w}_j]')$$
$$+ ([\hat{w}_j] \text{ ave }\{[\hat{q}_j - \mu][\hat{q}_j - \mu]'\}[\hat{w}_j]') \quad (38b)$$

Since the estimates $[\overline{q}_j]$ and $[\hat{q}_j]$ are derived from observed data for different passes, these estimates are independent of each other, and therefore the second and third terms in Equation 38b vanish because the averages in these terms are zero; further, the second and fourth terms in Equation 38b each contain a variance-covariance matrix, as defined in Equations 34a and 34b. Thus the variance-covariance matrix $[\tilde{C}]$ becomes $$[\tilde{C}] = [\overline{w}_j][\overline{C}][\overline{w}_j]' + [\hat{w}_j][\hat{C}][\hat{w}_j]' \quad (38c)$$

As shown in the definition of a variance-covariance matrix given by Equation 26d, the variances lie in the principal diagonal, and therefore to minimize the variances of the weighted average, it is necessary to obtain expressions for the diagonal elements of the variance-covariance matrix $[\tilde{C}]$ of the population of weighted averages, set forth in Equation 38c. To obtain expressions for the variances of the population of weighted averages, let the elements of the square weighting matrices $[\overline{w}_j]$ and $[\hat{w}_j]$ will be denoted $$[\overline{w}_j] = \begin{bmatrix} a_{11} & \cdots & a_{16} \\ \vdots & & \vdots \\ a_{61} & \cdots & a_{66} \end{bmatrix} \quad (39a)$$

and $$[\hat{w}_j] = \begin{bmatrix} b_{11} & \cdots & b_{16} \\ \vdots & & \vdots \\ b_{61} & \cdots & b_{66} \end{bmatrix} \quad (39b)$$

Further, let the elements of the variance-covariance matrices $[\overline{C}]$ and $[\hat{C}]$ be denoted $$[\overline{C}] = \begin{bmatrix} \overline{c}_{11} & \cdots & \overline{c}_{16} \\ \vdots & & \vdots \\ \overline{c}_{61} & \cdots & \overline{c}_{66} \end{bmatrix} \quad (40a)$$

and $$[\hat{C}] = \begin{bmatrix} \hat{c}_{11} & \cdots & \hat{c}_{16} \\ \vdots & & \vdots \\ \hat{c}_{61} & \cdots & \hat{c}_{66} \end{bmatrix} \quad (40b)$$

where the diagonal elements $\overline{c}_{ii}$, $\hat{c}_{ii}$, $i = 1, 2, \ldots, 6$ of $[\overline{C}]$, $[\hat{C}]$, respectively, are the variances of the two populations of one-pass estimates. Next, perform the matrix multiplication indicated by Equation 38c in terms of the individual matrix elements defined by Equations 39a, 39b, 40a, and 40b.

$\overline{c}_{ii}$, $\hat{c}_{ii}$, $i = 1, 2, \ldots$, of $[\overline{C}]$, $[\hat{C}]$ $$[\tilde{C}] = \begin{bmatrix} a_{11} & \cdots & a_{16} \\ \vdots & & \vdots \\ a_{61} & \cdots & a_{66} \end{bmatrix} \begin{bmatrix} \overline{c}_{11} & \cdots & \overline{c}_{16} \\ \vdots & & \vdots \\ \overline{c}_{61} & \cdots & \overline{c}_{66} \end{bmatrix} \begin{bmatrix} a_{11} & \cdots & a_{61} \\ \vdots & & \vdots \\ a_{16} & \cdots & a_{66} \end{bmatrix}$$

$$+ \begin{bmatrix} b_{11} & \cdots & b_{16} \\ \vdots & & \vdots \\ b_{61} & \cdots & b_{66} \end{bmatrix} \begin{bmatrix} \hat{c}_{11} & \cdots & \hat{c}_{16} \\ \vdots & & \vdots \\ \hat{c}_{61} & \cdots & \hat{c}_{66} \end{bmatrix} \begin{bmatrix} b_{11} & \cdots & b_{61} \\ \vdots & & \vdots \\ b_{16} & \cdots & b_{66} \end{bmatrix}$$

$$= \begin{bmatrix} \sum_{j=1}^{6} a_{1j}\overline{c}_{j1} & \cdots & \sum_{j=1}^{6} a_{1j}\overline{c}_{j6} \\ \vdots & & \vdots \\ \sum_{j=1}^{6} a_{6j}\overline{c}_{j1} & \cdots & \sum_{j=1}^{6} a_{6j}\overline{c}_{j6} \end{bmatrix} \begin{bmatrix} a_{11} & \cdots & a_{61} \\ \vdots & & \vdots \\ a_{16} & \cdots & a_{66} \end{bmatrix}$$

$$+ \begin{bmatrix} \sum_{j=1}^{6} b_{1j}\hat{c}_{j1} & \cdots & \sum_{j=1}^{6} b_{1j}\hat{c}_{j6} \\ \vdots & & \vdots \\ \sum_{j=1}^{6} b_{6j}\hat{c}_{j1} & \cdots & \sum_{j=1}^{6} b_{6j}\hat{c}_{j6} \end{bmatrix} \begin{bmatrix} b_{11} & \cdots & b_{61} \\ \vdots & & \vdots \\ b_{16} & \cdots & b_{66} \end{bmatrix}$$

$$[\tilde{C}] = \begin{bmatrix} \sum_{k=1}^{6}\left(\sum_{j=1}^{6} a_{1j}\overline{c}_{jk}\right)a_{1k} & \cdots & \sum_{k=1}^{6}\left(\sum_{j=1}^{6} a_{1j}\overline{c}_{jk}\right)a_{6k} \\ \vdots & & \vdots \\ \sum_{k=1}^{6}\left(\sum_{j=1}^{6} a_{6j}\overline{c}_{jk}\right)a_{1k} & \cdots & \sum_{k=1}^{6}\left(\sum_{j=1}^{6} a_{6j}\overline{c}_{jk}\right)a_{6k} \end{bmatrix}$$

$$+ \begin{bmatrix} \sum_{k=1}^{6}\left(\sum_{j=1}^{6} b_{1j}\hat{c}_{jk}\right)b_{1k} & \cdots & \sum_{k=1}^{6}\left(\sum_{j=1}^{6} b_{1j}\hat{c}_{jk}\right)b_{6k} \\ \vdots & & \vdots \\ \sum_{k=1}^{6}\left(\sum_{j=1}^{6} b_{6j}\hat{c}_{jk}\right)b_{1k} & \cdots & \sum_{k=1}^{6}\left(\sum_{j=1}^{6} b_{6j}\hat{c}_{jk}\right)b_{6k} \end{bmatrix}$$

$$= \begin{bmatrix} \sum_{j,k}(a_{1j}\overline{c}_{jk}a_{1k} + b_{1j}\hat{c}_{jk}b_{1k}) & \cdots & \\ & \vdots & \sum_{j,k}(a_{1j}\overline{c}_{jk}a_{6k} + b_{1j}\hat{c}_{jk}b_{6k}) \\ \sum_{j,k}(a_{6j}\overline{c}_{jk}a_{1k} + b_{6j}\hat{c}_{jk}b_{1k}) & \cdots & \\ & & \sum_{j,k}(a_{6j}\overline{c}_{jk}a_{6k} + b_{6j}\hat{c}_{jk}b_{6k}) \end{bmatrix}$$

(41)

Thus the six variances of the population of weighted averages, as given by the diagonal elements of the matrix on the right-hand side of Equation 41, are of the form $$\tilde{c}_{ii} = \sum_{j,k}(a_{ij}\overline{c}_{jk}a_{ik} + b_{ij}\hat{c}_{jk}b_{ik}) \quad (42a)$$

or $$\tilde{c}_{ii} = \sum_k \left( \sum_j a_{ij} \bar{c}_{jk} \right) a_{ik} + \sum_k \left( \sum_j b_{ij} \hat{c}_{jk} \right) b_{ik}, \, i=1,2,\ldots,6 \quad (42b)$$

The variances $\tilde{c}_{ii}$ may be minimized by using Lagrange's method of undetermined multipliers in conjunction with the constraint defined by Equation 36. In applying this method, the variances $c_{ii}$, as given by Equation 42b, are considered to be functions of the two independent variables $a_{ik}$, $b_{ik}$, where, from Equation 36b, the two independent variables are related by the equation $$a_{ik} + b_{ik} = \delta_{ik} \quad (43)$$

$\delta_{ik}$ being the Kronecker delta whose value is unity for $i=k$, and zero for $i \neq k$. In order that the variances $\tilde{c}_{ii}$ may have minimum values, it is necessary that the following conditions be satisfied:

$$\frac{\partial \tilde{c}_{ii}}{\partial a_{ik}} - \lambda_{ik} \frac{\partial \varphi}{\partial a_{ik}} = 0 \quad (44a)$$

$$\frac{\partial c_{ii}}{\partial b_{ik}} - \lambda_{ik} \frac{\partial \varphi}{\partial b_{ik}} = 0 \quad (44b)$$

in which $$\varphi = a_{ik} + b_{ik} - \delta_{ik} = 0 \quad (44c)$$

and $\lambda_{ik}$ are constants of proportionality known as Lagrange's multipliers. By performing the partial differentiation indicated in Equations 44a and 44b, the resulting equations may be solved together with Equation 36 for the unknown weighting matrices $[\bar{w}_j]$ and $[\hat{w}_j]$, and the unknown multipliers $\lambda_{ik}$. Substitution in Equation 35 of the solutions thus obtained, provides the refined estimates of this invention. Differentiation of Equations 42b and 44c produces the following quantities for the partial derivatives in Equations 44a and 44b.

$$\frac{\partial c_{ii}}{\partial a_{ik}} = \sum_j a_{ij} \bar{c}_{jk} \quad (45a)$$

$$\frac{\partial c_{ii}}{\partial b_{ik}} = \sum_j b_{ij} \hat{c}_{jk} \quad (45b)$$

$$\frac{\partial \varphi}{\partial a_{ik}} = 1 \quad (45c)$$

$$\frac{\partial \varphi}{\partial b_{ik}} = 1 \quad (45d)$$

Substituting Equations 45a through 45d into Equations 44a and 44b, $$\sum_j a_{ij} \bar{c}_{jk} = \lambda_{ik} \quad (46a)$$

$$\sum_j b_{ij} \hat{c}_{jk} = \lambda_{ik} \quad (46b)$$

which may be rewritten in matrix form as $$[\bar{w}_j] \cdot [\bar{C}] = [\lambda_j] \quad (47a)$$

$$[\hat{w}_j] \cdot [\hat{C}] = [\lambda_j] \quad (47b)$$

the elements of the matrix $[\lambda_j]$ being Lagrange multipliers $\lambda_{ik}$, $i, k = 1, 2, \ldots, 6$. From Equations 47a and 47b, the weighting matrices may be expressed as $$[\bar{w}_j] = [\lambda_j][\bar{C}]^{-1} \quad (48a)$$

$$[\hat{w}_j] = [\lambda_j][\hat{C}]^{-1} \quad (48b)$$

and from Equation 36, $$[\bar{w}_j] + [\hat{w}_j] = [\lambda_j][\bar{C}]^{-1} + [\lambda_j][\hat{C}]^{-1} = [1]$$

hence $$[\lambda_j] = ([\bar{C}]^{-1} + [\hat{C}]^{-1})^{-1} \quad (49)$$

where the superscript $^{-1}$ denotes the reciprocal of the matrix to which it is affixed. Substitution in Equation 35 of the solutions provided by Equations 48a, 48b, and 49 under the criterion of minimum variance, produces a population of estimates in terms of a specific weighted average of the elements of two populations of one-pass estimates; thus $$[\tilde{q}_j] = [\bar{w}_j][\bar{q}_j] + [\hat{w}_j][\hat{q}_j]$$
$$= [\lambda_j][\bar{C}]^{-1}[\bar{q}_j] + [\lambda_j][\hat{C}]^{-1}[\hat{q}_j]$$
$$= [\lambda_j]([\bar{C}]^{-1}[\bar{q}_j] + [\hat{C}]^{-1}[\hat{q}_j])$$
$$= ([\bar{C}]^{-1} + [\hat{C}]^{-1})^{-1} \cdot ([\bar{C}]^{-1}[\bar{q}_j] + [\hat{C}]^{-1}[\hat{q}_j])$$
$$j = 1, 2, \ldots, n \quad (50a)$$

The relationship expressed by Equation 50a is equally applicable to a single set of estimates $[\bar{q}]$ derived from a single sample of observed data from one pass, and another single set of estimates $[\hat{q}]$ derived from a single sample of observed data from another pass, because the sample-mean variance-covariance matrices associated with these individual sets of estimates are approximations of the sample-mean variance-covariance matrices of the two populations of best estimates. Thus Equation 50a may be expressed in terms of single estimates $[\bar{q}]$ and $[\hat{q}]$ $$[\tilde{q}] = ([\bar{C}]^{-1} + [\hat{C}]^{-1})^{-1} \cdot ([\bar{C}]^{-1}[\bar{q}] + [\hat{C}]^{-1}[\hat{q}]) \quad (50b)$$

where $[\bar{C}]$ and $[\hat{C}]$ now represent estimates of the sample-mean variance-covariance matrices associated with the populations of estimates $\{[\bar{q}]\}$ and $\{[\hat{q}]\}$, respectively.

If desired, the set of refined estimates defined by Equation 50b may be combined with a set of best estimates from a later pass to form a new set of refined estimates at the reference time of the later pass. This may be accomplished in the manner described above for combining two sets of best estimates from different passes. It is first necessary to obtain an estimate of the sample-mean variance-covariance matrix $[\tilde{C}]$ of the set of refined estimates. From Equation 38c, an estimate of the sample-mean variance-covariance matrix $[\tilde{C}]$ is given by $$[\tilde{C}] = [\bar{w}][\bar{C}][\bar{w}]' + [\hat{w}][\hat{C}][\hat{w}]' \quad (51a)$$

Substituting the one-pass equivalents of Equations 48a and 48b into Equation 51a, and noting from Equation 49 that $[\lambda]$ is a symmetric matrix, $$[\tilde{C}] = [\lambda][\bar{C}]^{-1}[\bar{C}][\bar{C}]^{-1}[\lambda] + [\lambda][\hat{C}]^{-1}[\hat{C}][\hat{C}]^{-1}[\lambda]$$
$$= [\lambda]([\bar{C}]^{-1} + [\hat{C}]^{-1})[\lambda]$$
$$= [\lambda][\lambda]^{-1}[\lambda]$$
$$= [\lambda] \quad (51b)$$

Hence an estimate of the sample-mean variance-covariance $[\tilde{C}]$ is $$[\tilde{C}] = ([\bar{C}]^{-1} + [\hat{C}]^{-1})^{-1} \quad (51c)$$

or $$[\tilde{C}]^{-1} = [\bar{C}]^{-1} + [\hat{C}]^{-1} \quad (51d)$$

After having obtained an estimate of the sample-mean variance-covariance matrix $[\tilde{C}]$ associated with the set of refined estimates $[\tilde{q}]$, the appropriate prediction equations, together with either Equation 32b or 32c are used to adjust $[\tilde{C}]$ and $[\tilde{q}]$ to the reference time of the later set of best estimates. The two sets of estimates are then combined in accordance with Equation 50b to form a new set of refined estimates of the orbital parameters at the later reference time.

INTRODUCTION

As an aid to exposition and in accordance with well established usage in the electronic art, the preferred embodiment of the principles of this invention is shown in FIGS. 3 through 12 of the drawings in block schematic form, with single line paths indicating the flow of information-bearing signals between components of the various circuits. It is to be understood that in practice the blocks will be realized by specific apparatus whose precise characteristics are set forth in detail below, and each single line path will normally be realized by two electrical conductors.

Further, the terms used to describe various components of FIGS. 3 through 12 have the standard meanings found in the IRE Standards on Electronic Computers: Definitions of Terms, 1956. Specific embodiments of these components may be found in any recent text on digital computer components and circuits, and in this application, E. M. McCormick, Digital Computer Primer (1959), will be referred to from time to time for descriptions of specific apparatus.

FIG. 3

Referring now to FIG. 3, this drawing outlines in block form the major networks of the complete system for determining from radar signals a set of refined estimates of the orbital parameters of a terrestrial satellite. Drawings illustrating the detailed structure of these major networks are provided in FIGS. 4 through 12, as indicated by references in the appropriate blocks of FIG. 3. In addition, the lines connecting the blocks in FIG. 3 indicate only the most important routes for the flow of information between the major networks, and are not intended to represent either specific signals or specific connections between the networks.

During each pass of a satellite, a conventional radar tracker 300 follows the satellite's motion, and in so doing, generates three continuous electrical signals representative of the three observational quantities—slant range, elevation angle, and azimuth angle—which continuously describe the position of the satellite with respect to the tracker during a particular pass. Although the three continuous signals generated by tracker 300 contain sufficient information for the determination of orbital parameters, in continuous form these three signals are not suitable input signals for the preferred electronic apparatus embodying the principles of this invention. In particular, it is necessary to replace the three continuous tracker signals with three sequences of pulse trains in which each pulse train represents the numerical value of one of the three observational quantities at discrete instants of time during a pass. For convenience, the digits represented by the pulse trains in this invention are the "1" and "0" of the well-known binary number system, where the presence of a pulse signifies a "1" and the absence of a pulse signifies a "0." It is to be understood, however, that embodiments of the principles of this invention are not limited to electronic apparatus based upon the binary number system.

In the present invention, the three continuous radar signals are replaced by three sequences of pulse trains by applying the radar signals to binary signal generator 301, which is shown in detail in FIG. 4. Generator 301 is responsive to control signals from master control network 311, illustrated in detail in FIG. 12, and generates four sequences of binary pulse trains. Three of the sequences correspond to the sequence $\{D\}$, $\{E\}$, $\{A\}$, described in Part I above, and the fourth sequence corresponds to the sequence $\{t\}$, the sequence of discrete times of observation of the triplets of observed data $$(D_j, E_jA_j), j=1, 2, \ldots, n$$

Each of the four sequences contains $n$ groups of on-off pulses representing in binary digital form $n$ values of slant range, elevation angle, and azimuth angle at $n$ discrete times of observation.

The four sequences of discrete signals from generator 301, which for convenience shall be denoted $\{D\}$, $\{E\}$, $\{A\}$, $\{t\}$, are passed to first coordinate converter 302 to convert these signals to an inertial, geocentric, rectangular coordinate system. Converter 302 may be any one of a number of well-known general purpose digital computers, and it is programmed in accordance with Equations 1, 2a, 2b, 3a, 3b, 4a, 4b, 5a through 5c, 6a, and 6b given in Part I above, to produce four sequences of binary pulses corresponding to the sequences $\{x\}$, $\{y\}$, $\{z\}$, $\{t\}$.

From converter 302, the four sequences of binary signals, denoted $\{x\}$, $\{y\}$, $\{z\}$, $\{t\}$, are transmitted to storage network 303, where the information contained in these sequences is stored in static form for subsequent operations. The structural features of storage network 303 are illustrated in detail in FIG. 5, and network 303 is under the control of network 311 to supply the stored information to the proper point in the system at the proper time.

Figure 6:
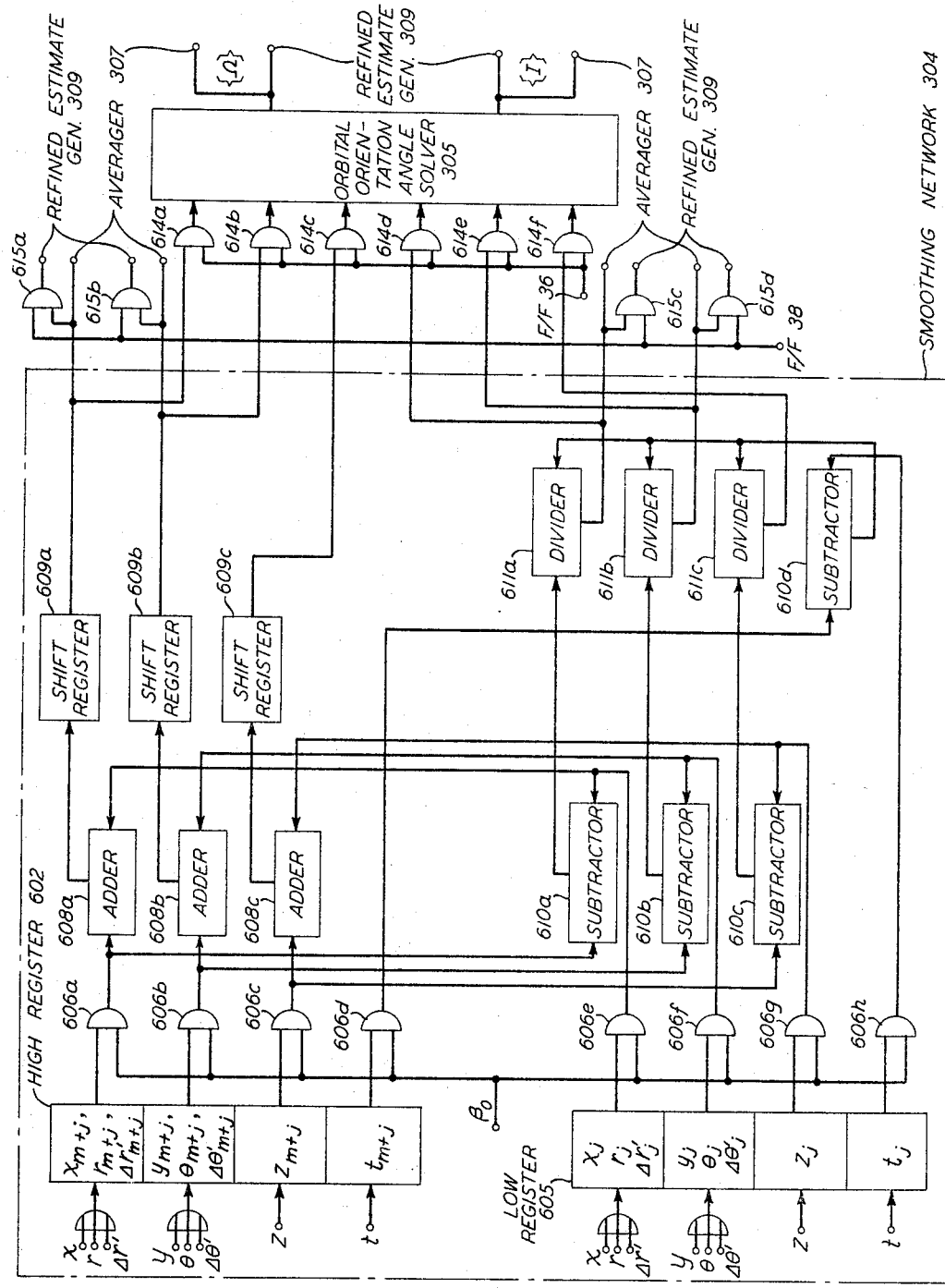
FIG. 6 is a schematic diagram showing apparatus for smoothing signals in accordance with the principles of this invention.

At the end of a given pass, generator 301 stops producing sequences of binary pulses, and the flow of information-bearing signals into storage network 303 comes to a halt. At this point, control network 311 directs the nondestructive transfer of the stored information from storage network 303 to smoothing network 304, the information being transferred in the form of sequences of binary signals. Smoothing network 304, which is further illustrated in FIG. 6, is designed upon the principles set forth in Equations 7a and 7b to generate from sequence of input signals $\{\xi\}$ together with the sequence $\{t\}$, two "smoothed" sequences of binary signals, $\{\bar{\xi}\}$ and $\{\dot{\bar{\xi}}\}$. Thus from the three sequences of input signals $\{x\}$, $\{y\}$, $\{z\}$, together with the sequence $\{t\}$, network 304 generates six new sequences of so-called "smoothed" signals denoted $\{\bar{x}\}$, $\{\bar{y}\}$, $\{\bar{z}\}$, $\{\dot{\bar{x}}\}$, $\{\dot{\bar{y}}\}$, $\{\dot{\bar{z}}\}$. Each of the six sequences of output signals of network 304 comprises $m$ groups of on-off pulses representing in binary digital form $m$ values of the smoothed quantities $\bar{x}_j, \bar{y}_j, \bar{z}_j, \dot{\bar{x}}_j, \dot{\bar{y}}_j, \dot{\bar{z}}_j$, as described in Part I above, where $n=2m$ if $n$ is even, and $n=2m+1$ if $n$ is odd.

From smoothing network 304, the six sequences of smoothed signals are applied to orbital orientation angle solver 305. Angle solver 305, like converter 302, is also a suitable digital computer, and is adapted in accordance with Equations 9c through 9e, 10a, 10b, and 11, to derive from the six sequences of smoothed input signals two sequences of orbital orientation angle signals, one of which is indicative of the sequence of $m$ discrete values of the nodal longitude $\{\Omega\}$, and the other is indicative of the angle of inclination $\{I\}$. The two sequences of signals derived by angle solver 305 are passed to refined estimate generator 309 and to averager 307. Averager 307, as described in detail below in connection with FIG. 7, operates as specified by Equation 8 to produce two binary signals signifying best estimates of the two orbital orientation angles $\Omega_c$, $I_c$, as defined by Equations 12a and 12b.

The two best estimate signals from averager 307, denoted $\Omega_c$, $I_c$ in conformity with the usage previously adopted, are sent to two different components of the system: to second coordinate converter 306; and to refined estimate generator 309. At second coordinate converter 306, which may also be any well-known digital computer, the two best estimate signals are utilized to convert the three sequences of signals $\{x\}$, $\{y\}$, $\{z\}$, transferred from storage network 303 by control network 311, to two sequences of polar coordinate signals $\{r\}$, $\{\theta\}$, in accordance with Equations 13a, 13b, 14a, 14b, 15a, and 15b. At refined estimate generator 309, shown in detail in FIGS. 9A, 9B, 10A, 10B, and 11, the two best estimate signals $\Omega_c$, $I_c$, together with the two sequences $\{\Omega\}$, $\{I\}$, from angle solver 305, are utilized to derive refined estimates of the orbital parameters.

The two sequences of polar coordinate signals, $\{r\}$, $\{\theta\}$, produced by converter 306 are transmitted to storage network 303, where they are stored for use in deriving signals representative of best estimates of the four remaining orbital parameters, $r_c$, $\theta_c$, $\dot{r}_c$, $\dot{\theta}_c$. From network 303, control circuit 311 directs the nondestructive transfer of the sequences $\{r\}$, $\{\theta\}$ to smoothing circuit 304, which derives four "smoothed" sequences of signals $\{\overline{r}\}$, $\{\overline{\dot{r}}\}$, $\{\overline{\theta}\}$, $\{\overline{\dot{\theta}}\}$. These four smoothed sequences are transmitted to averager 307, which produces four signals representative of the four first estimates $r_{c1}$, $\theta_{c1}$, $\dot{r}_{c1}$, $\dot{\theta}_{c1}$. The four first estimate signals are then applied to trend removal network 308, together with the three sequences $\{r\}$, $\{\theta\}$, $\{t\}$ from storage network 303, to obtain signals representing best estimates of the remaining four orbital parameters. Trend removal network 308, which is shown in detail in FIG. 8, embodies the principles set forth in Equations 17a, 17b, 19a through 19d, 20a, 20b, and 20k through 20n. Operating in conjunction with smoothing network 304 followed by averager 307, as shown by the line connecting network 308 with smoothing network 304, the trend removal network produces after $k$ cycles four best estimate signals denoted $r_c$, $\theta_c$, $\dot{r}_c$, $\dot{\theta}_c$. These four best estimate signals are sent to refined estimate generator 309, together with the $k$th or last of four sequences of so-called "deviation" signals $$\{\overline{\Delta r}\}^k, \{\overline{\Delta \theta}\}^k, \{\overline{\Delta \dot{r}}\}^k, \{\overline{\Delta \dot{\theta}}\}^k$$

from smoothing network 304, to be combined with a similar set of signals from another pass to form a set of so-called "refined estimate" signals.

The structure of generator 309 is based upon the principles expressed by Equations 23f, 23i, 25a through 25k, 32c, and 50b, to derive from two sets of best estimate signals from different passes, and their associated variances and covariances, a single set of refined estimate signals which is more accurate than either of the individual sets of best estimate signals. Highly accurate predictions of future satellite positions may then be obtained from the set of refined estimate signals by a suitable utilization system 310, and suitable prediction signals may be sent back to tracker 300 to orient both the radar tracker antenna and any associated communications antennas to point at a satellite during future passes over the tracker site. An example of a suitable utilization system is shown in FIG. 1 of the article by R. Klahn, J. A. Norton, and J. A. Githens, "Antenna Steering System," volume 40, Bell System Technical Journal, page 1207 (1961).

FIG. 4A

Figure 4A:
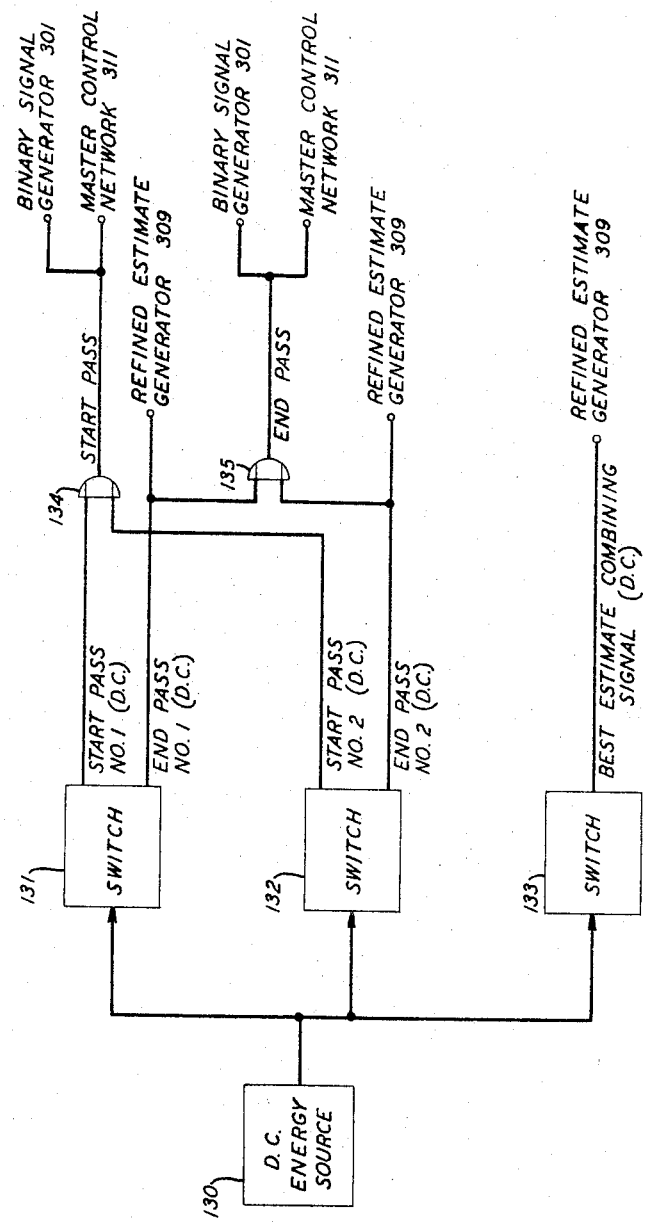
FIGS. 4A and 4B are schematic diagrams showing apparatus for obtaining binary pulse signals from radar tracking signals.

That portion of binary signal generator 301 in FIG. 4A represents one of many circuit configurations which may be used to supply signals signifying the beginning and the end of a pass, and a signal to initiate the combining of best estimates. Although the apparatus of FIG. 4A is designed for a two-pass situation, it is believed that the extension to more than two passes will be clear to those skilled in the art.

In essence, FIG. 4A shows apparatus which uses a direct-current energy source 130 connected through switches 131, 132, and 133 to supply various signals. Thus, at the beginning of a first pass, the operation of switch 131, which may be any one of a number of well-known switching circuits, connects energy source 130 through OR gate 134 to supply a "start pass" signal to appropriate points in binary signal generator 301 and master control network 311, while at the end of a first pass, the operation of switch 131 connects energy source 130 through OR gate 135 to supply an "end pass" signal to generator 301 and network 311, and an "end pass number one" signal to refined estimate generator 309. Similarly at the beginning and the end of a second pass, switch 132 operates in the same fashion as switch 131 to supply "start pass," "end pass," and "end pass number two" signals to the same components.

In addition, on obtaining a set of best estimate signals and associated variance and covariance signals for each of the two passes, operation of switch 133 connects energy source 130 to an appropriate point in refined estimate generator 309 to supply a signal that will initiate the combining of the two sets of best estimate signals to derive a set of refined estimate signals. Upon deriving a set of refined estimate signals, switch 133 may be operated to disconnect energy source 130 from generator 309, thereby halting the operation of generator 309.

FIG. 4B

Figure 4B:
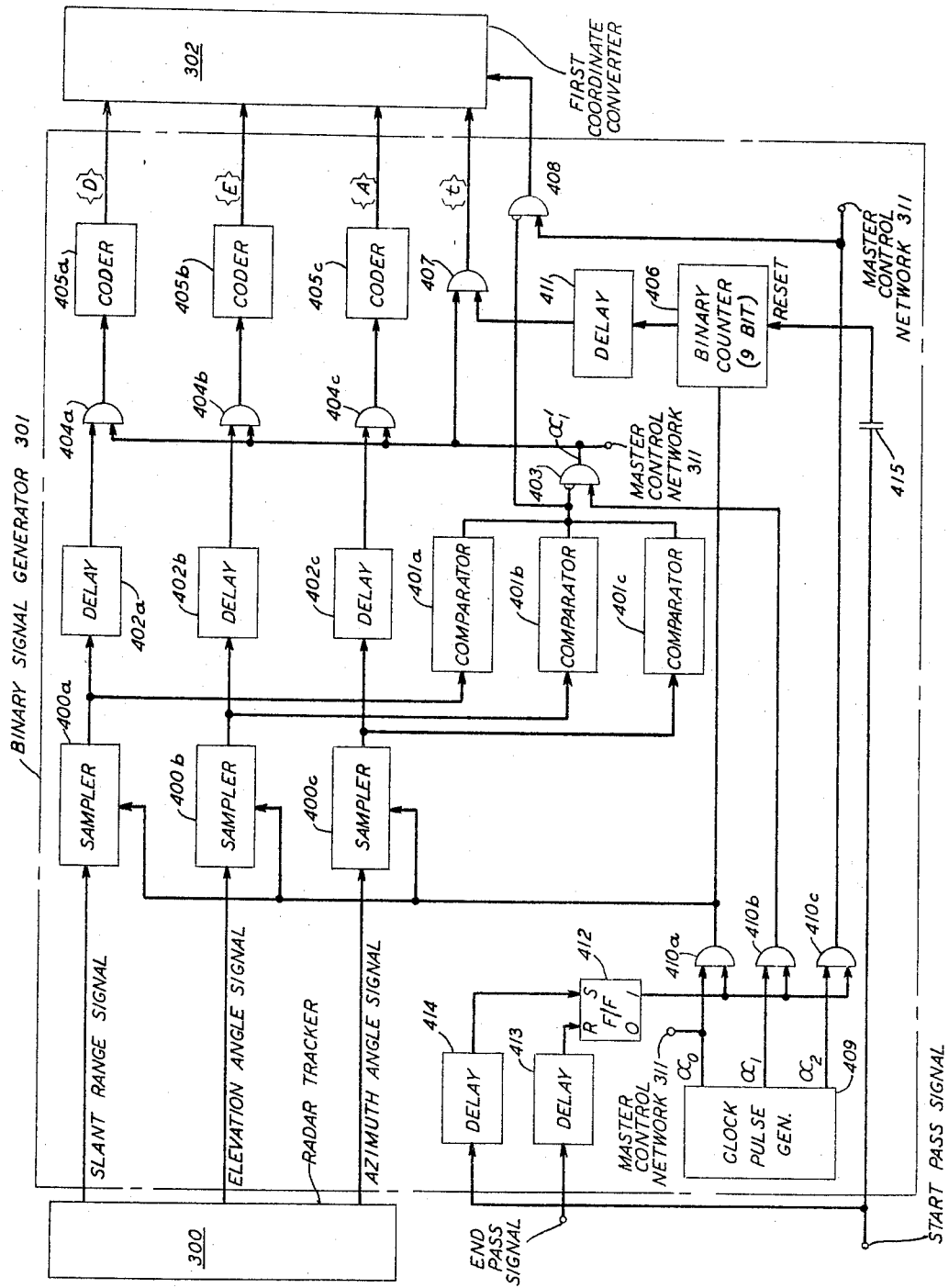

Turning now to that part of the apparatus of binary signal generator 301 shown in FIG. 4B, each of the three continuous signals, slant range, elevation angle, and azimuth angle, generated by tracker 300 during a pass is applied to a sampler, 400a through 400c, respectively, of any well-known construction. The samplers are simultaneously actuated by a train of clock pulses denoted $\alpha_0$ from a clock pulse generator 409, of any well-known design, to sample the amplitudes of the three tracker signals at regularly spaced instants of time. The $\alpha_0$ clock pulses are one of three trains of clock pulses generated by clock pulse generator 409. The three trains of pulses, denoted $\alpha_0$, $\alpha_1$, $\alpha_2$, all have the same repition rate, but differ from each other in phase or time of occurrence. Thus each of the $\alpha_1$ clock pulses is delayed with respect to one of the preceding $\alpha_0$ clock pulses, and each of the $\alpha_2$ clock pulses occurs between one of the $\alpha_1$ pulses and the next following $\alpha_0$ pulse. Since the $\alpha_0$, $\alpha_1$, and $\alpha_2$ clock pulses are used to initiate certain operations at specific times in the apparatus of this invention, each train of pulses is directed through gates 410a through 410c. Gates 410a through 410c, as described on page 62 of the above-mentioned McCormick reference, may be any one of a number of well-known electronic devices which performs a logical AND operation; that is, it produces a signal at its output terminal only if identical signals are present at all of its input terminals. Although these devices are often referred to as AND gates, for simplicity they will be referred to in this application as gates.

Gates 410a through 410c are simultaneously enabled at the start of a pass by having the "1" output terminal of flip-flop 412 connected in parallel to the control terminals of the gates. At the start of a pass, a direct-current "start" signal from the apparatus of FIG. 4A is passed through delay 414 to set flip-flop 412 to the "1" state, thereby enabling gates 410a through 410c; at the end of a pass, a direct-current "end" signal from the apparatus of FIG. 4A is passed through delay 413 to reset flip-flop 412 to the "0" condition, thereby disabling gates 410a through 410c. The delay time of element 414 is adjusted to permit binary counter 406 to be reset by the start pass signal to a count of zero before passing the clock pulses to various points in generator 301, and the delay time of element 413 is adjusted to permit the taking of a last set of samples from the radar signals before the end pass signal disables gates 410a through 410c.

Each of the three regularly spaced train of samples from samplers 400a through 400c is sent through a delay device 402a, 402b, 402c, followed by a gate 404a, 404b, 404c, to a conventional coder 405a, 405b, 405c, respectively. Coders 405a through 405c serve to encode the magnitude of each amplitude sample according to a preassigned code; for example, each amplitude sample may be encoded as a train of eighteen uniform "on-off" pulses equally spaced in time, representing an eighteen-digit binary number, and also referred to as an eighteen bit code.

In addition, the time of observation associaed with each triplet of amplitude samples is encoded by applying the train of $\alpha_0$ clock pulses to a binary counter 406, which is provided with sufficient stages to count the total number of samples obtained during a single pass of a satellite. For example, if not more than 512 samples are obtained during a single pass, then a nine-stage binary counter is sufficient, since $2^9 = 512$. Thus, at any time during a pass, the triplet of pulse trains appearing at the output terminals of coders 405a through 405c and the the state of binary counter 406 represent in binary digital form the values of the three observational quantities ($D_j$, $E_j$, $A_j$) at a time $t_j$ measured from the beginning of a pass. Counter 406 is reset to a count of zero by the transient portion of the direct-current "start" signal coupled by capacitor 415 to the reset terminal of counter 406.

If desired, however, obvious errors in the magnitudes of the three tracker signals may be eliminated by also applying the amplitude samples from samplers 400a through 400c to comparators 401a through 401c. Comparators 401a through 401c compare the amplitudes of adjacent samples in each sequence of samples, and whenever the amplitudes of adjacent samples differ by more than a predetermined amount, thereby indicating a possible error, an error signal is generated by the comparator. A suitable comparator is shown in FIG. 1 of B. Julesz Patent 2,974,195, issued March 7, 1961.

The output terminals of comparators 401a through 401c are connected to the control terminal of an inhibit gate 403, and $\alpha_1$ clock pulse from generator 409 are applied to the input terminal of inhibit gate 403. In the absence of one or more erroneous samples in a given triplet, no error signal is generated by any of the comparators, an $\alpha_1$ clock pulse passes through inhibit gate 403 to enable gates 404a through 404c, thereby allowing the triplet of samples associated with the $\alpha_0$ clock pulse preceding the $\alpha_1$ clock pulse to pass to coders 405a through 405c. However, the presence of one or more erroneous samples in a triplet of samples applied to comparators 401a through 401c causes one or more of the corresponding comparators to generate an error signal that disables gate 403 and thus also disables gates 404a through 404c by blocking the passage of an $\alpha_1$ clock pulse through gate 403. Disablement of gates 404a through 404c prevents the encoding of an entire triplet of samples containing one or more erroneous samples, and therefore a source of error is eliminated from the encoded signals used in the determination of a set of best estimate signals. The $\alpha_1$ clock pulses which do pass through gate 403 are referred to as $\alpha_1'$ pulses, as shown in FIG. 4. It is noted that the number of $\alpha_1'$ pulses corresponds to the number of samples, $n$, passed by gates 404a through 404c and encoded by coders 405a through 405c during a pass.

Elimination of triplets of samples in the fashion described above results in nonuniform spacing in time of the triplets of samples encoded by coders 405a through 405c. To maintain the correspondence between the encoded samples and the state of binary counter 406, the output terminal of counter 406 is connected to one of the input terminals of gate 407 through delay element 411, and the output terminal of inhibit gate 403 is connected to the other input terminal of gate 407. The binary signals passed by gate 407 thus indicate the times of observation of any those samples encoded by coders 405a through 405c.

As each successive triplet of samples is encoded, the resulting triplet of binary signals and its associated binary time signal from gate 407 are passed to first coordinate converter 302. Converter 302 is a programmed digital computer, for example, an International Business Machine (IBM) computer such as the IBM 1620 or IBM 7090, which is successively enabled by a train of $\alpha_2$ clock pulses from clock pulse generator 409 to convert each triplet of binary signals ($D_j$, $E_j$, $A_j$) to a corresponding triplet of signals ($x_j$, $y_j$, $z_j$) in an inertial, geocentric, rectangular coordinate system in accordance with equations (1) through (6b) as described above. Details of a suitable electronic digital computer are not shown in the drawings or described herein, since it is believed to be obvious to those skilled in the art of programming general purpose computers that certain input and output devices and other peripheral equipment are necessary for operating such computers in accordance with the equations set forth herein. Complete instructions for setting up and operating general purpose digital computers of the type referred to above may be found in any one of a number of well known texts; examples of suitable texts are R. S. Ledley, Digital Computer and Control Engineering (1960), Mathematical Methods for Digital Computers (A. Ralston and H. S. Wilf Eds.) (1960), and J. Jeenel, Programming for Digital Computers (1959). Further, it is to be understood that computers other than those mentioned above may be employed if desired. The $\alpha_2$ clock pulses are delayed with respect to both the $\alpha_0$ clock pulses and the $\alpha_1$ clock pulses in order to compensate for the time delay incurred in encoding the amplitude samples in coders 405a through 405c. To ensure operation of converter 302 only at those instants following the encoding of error-free triplets of samples, the $\alpha_2$ clock pulses are passed through inhibit gate 408 before being applied to converter 302, the output terminals of comparators 401a through 401c being connected to the control terminal of inhibit gate 408 to block the passage of $\alpha_2$ clock pulses whenever an erroneous sample is detected.

FIG. 5

Referring now to FIG. 5, as each group or "word" of binary signals ($D_j$, $E_j$, $A_j$, $t_j$) is converted to an inertial, geocentric, rectangular coordinate system, the resulting new word, denoted ($x_j$, $y_j$, $z_j$, $t_j$), is transmitted to storage network 303. Within network 303, the signals from converter 302 are applied to register 502, which may be of the type described on page 80 of the above-mentioned McCormick reference. The $x_j$ and $y_j$ binary signals in each word are applied to register 502 through OR gates 500a and 500b, respectively, since polar coordinate signals $r_j$ and $\theta_j$, which are subsequently developed, are also applied to these portions of register 502 at a later time.

Register 502 is provided with sufficient capacity to store an entire word ($x_j$, $y_j$, $z_j$, $t_j$). For example, if the $x_j$, $y_j$, $z_j$ signals are each eighteen bits in length, and the $t_j$ signal is nine bits in length, then register 502 must have at least a 63-bit capacity. In addition, register 502 is provided with storage capacity for an additional 1-bit signal. This additional one-bit capacity is used to store a single pulse which will identify the last word, ($x_n$, $y_n$, $z_n$, $t_n$) encoded during a pass. This single pulse is obtained from master control network 311 at the end of a pass, and becomes a part of the last word, ($x_n$, $y_n$, $z_n$, $t_n$). This one additional bit also appears in the last word of each sequence of words generated during various operations and it is used to achieve asynchronous operation of the apparatus of this invention; that is, the appearance of an additional bit during an operation signifies the last word to be operated upon, and therefore the last bit may be utilized as a signal to terminate the current operation and to initiate the next operation.

From register 502, each word is passed through gates 503a through 503e to be recorded in memory unit 504, which may be any one of a number of devices suitable for recording signals in binary digital form; for example, memory 504 may be a rotating magnetic drum of the type described on pages 109 through 112 of the above-mentioned McCormick reference. However, to describe the mechanism by which signals are recorded in memory 504 from register 502, it is necessary to refer at the same time to FIG. 12, which shows the detailed structure of master control network 311, and to FIG. 4B, which shows the detailed structure of binary signal generator 301.

FIG. 12

Figure 12:
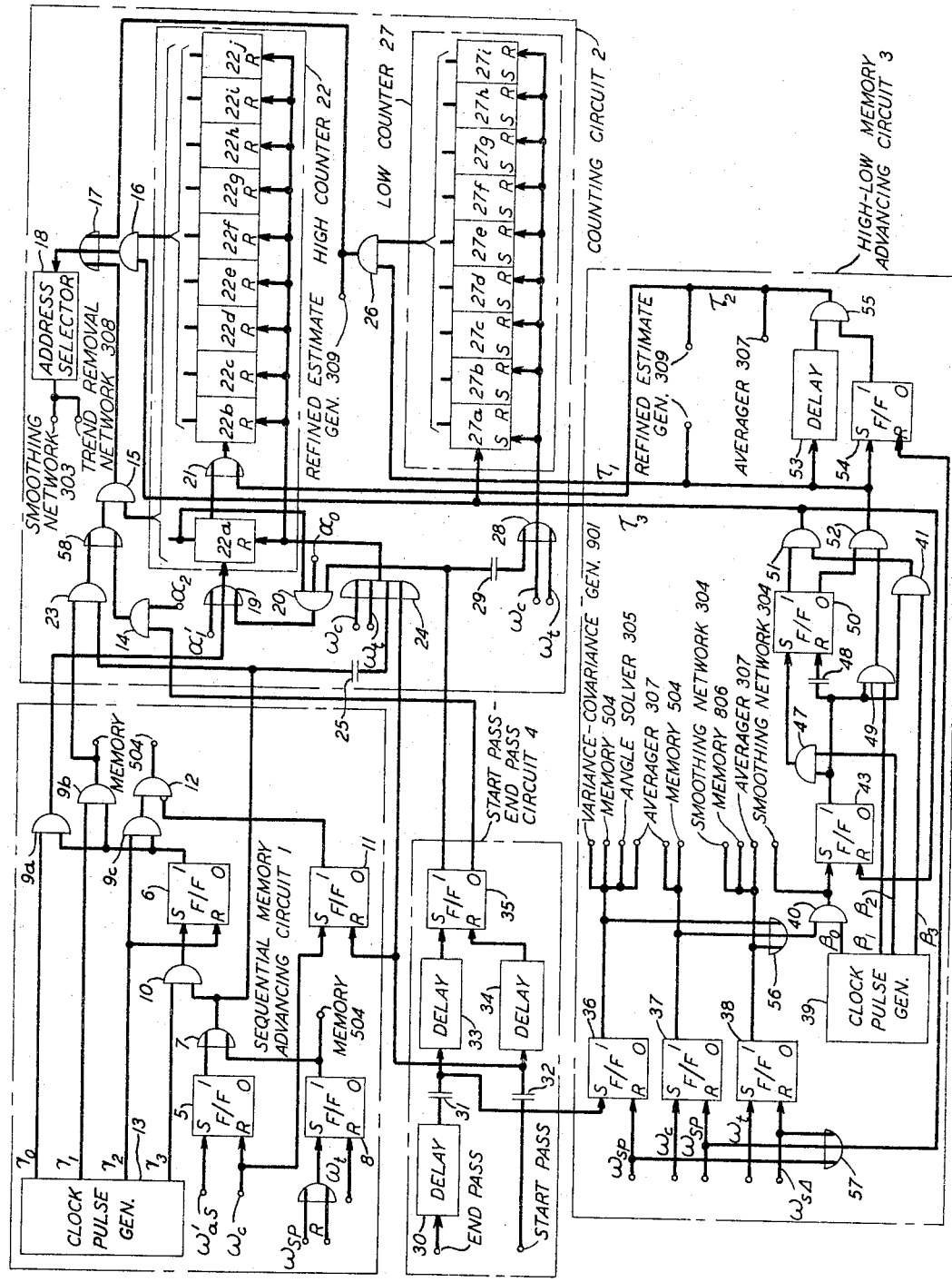
FIG. 12 is a schematic diagram showing apparatus for controlling the operations of other components of this invention.

At the start of a pass, the direct-current "start" signal from the apparatus of FIG. 4A is applied to start pass-end pass circuit 4 of FIG. 12. The transient portion of this "start" signal is coupled through capacitor 32 and OR gate 24 to reset high counter 22 of counting circuit 2 to the count of zero, and is passed through delay element 34 to reset flip-flop 35 to the "0" state. The "0" output terminal of flip-flop 35 is connected to gate 14 of counting circuit 2 in order to enable the count registered by all $j$ stages, 22$a$ through 22$j$, of counter 22 to be transferred to address selector 18.

The first group of signals ($x_1$, $y_1$, $z_1$, $t_1$) passed from coordinate converter 302 to register 502 after the start of a pass is accompanied by a first $\alpha_1'$ pulse from gate 403 of FIG. 4B. This first $\alpha_1'$ pulse is applied through OR gate 19 to high counter 22 in circuit 2 of FIG. 12, thereby advancing counter 22 to the count of one. The next $\alpha_2$ clock pulse from generator 409 following the first $\alpha_1'$ pulse is delivered to gate 14 which, having been enabled by flip-flop 35 at the start of a pass, enables gate 15 to transfer a count of one signal from counter 22 to address selector 18 through OR gate 17.

Address selector 18, which may be of any well known design as described in Chapter 8 of the McCormick reference, has its output terminal connected to memory unit 504, and operates to locate the address position of memory 504 corresponding to the number represented by the count signal applied to its input terminal. Thus when the count of one signal is applied to the input terminal of selector 18, the number one address position of memory 504 is located and this is where the first word ($x_1$, $y_1$, $z_1$, $t_1$) is recorded or "written." The first word is written into memory 504 from register 502 by the $\alpha_1'$ pulse enabling gates 503$a$ through 503$d$ of FIG. 5 and the "write" terminal of memory 504, after being delayed by element 509$b$ for a time sufficient to permit location of the appropriate address position of memory 504.

The above process is repeated for each group of signals ($x_j$, $y_j$, $z_j$, $t_j$) stored in register 502 during a pass. Thus, the $j$th $\alpha_1'$ pulse is applied to counter 22, advancing it to the count of $j$, and a count of $j$ signal is transferred to address selector 18 by the next $\alpha_2$ clock pulse following the $j$th $\alpha_1'$ pulse. Address selector 18 locates the $j$th address position of memory 504, and by this time the $j$th $\alpha_1'$ pulse has passed through delay element 509$b$ to enable gates 503$a$ through 503$e$ and the write terminal of memory 504, thereby writing the $j$th word stored in register 502 in the $j$th address position of memory 504.

At the end of a pass, the "end" direct-current signal generated by the apparatus of FIG. 4A is delivered to start pass-end pass circuit 4 of FIG. 12. This "end" signal is delayed by passing it through delay element 30 in order to permit the recording in memory 504 of the last set of binary signals ($x_n$, $y_n$, $z_n$, $t_n$) obtained during obtained during a pass. The output terminal of delay element 30 is connected through capacitor 31 to high-low memory advancing circuit 3 to set flip-flop 36 to the "1" state, and through capacitor 31 followed by delay 33 to set flip-flop 35 of circuit 4 to the "1" state. Setting flip-flop 36 to the "1" state starts the operation of circuit 3, while setting flip-flop 35 to the "1" state stops the recording of binary signals in memory 504 by disabling gate 14, in conjunction with the disabling of gates 410$a$ through 410$c$ in FIG. 4B.

In addition, the "1" output terminal of flip-flop 35 is connected to one of the input terminals of OR gates 505 and 518$a$ in storage network 303, as shown in FIG. 5. This connection serves to enable simultaneously the read terminal of memory 504 and gates 511$a$ through 511$e$ in order to "read out" or transfer the words located by selector 18.

The next operation performed by the apparatus of this invention is the so-called "smoothing" in network 304, shown in FIG. 6, of the ($x$, $y$, $z$) signals recorded in memory 504. As previously described in Part I, the principles of smoothing defined by Equations 7$a$ and 7$b$ require that the $n$ signals stored in memory 504 be paired in a particular order, depending upon whether $n$ is even or odd. For $n$ even, say $n=2m$, the $n$ words stored in memory 504 are grouped into $m$ pairs by pairing the first word ($x_1$, $y_1$, $z_1$, $t_1$), with the ($m+1$)th word ($x_{m+1}$, $y_{m+1}$, $z_{m+1}$, $t_{m+1}$); the second word, ($x_2$, $y_2$, $z_2$, $t_2$) with the ($m+2$)th word ($x_{m+2}$, $y_{m+2}$, $z_{m+2}$, $t_{m+2}$); and so on. However, for $n$ odd, say $n=2m+1$, the $n$ words stored in memory 504 are grouped into $m$ pairs by omitting the middle word ($x_{m+1}$, $y_{m+1}$, $z_{m+1}$, $t_{m+1}$), and by pairing the first word ($x_1$, $y_1$, $z_1$, $t_1$), with the ($m+2$)th word ($x_{m+2}$, $y_{m+2}$, $z_{m+2}$, $t_{m+2}$); the second word ($x_2$, $y_2$, $z_2$, $t_2$), with the ($m+3$)th word ($x_{m+3}$, $y_{m+3}$, $z_{m+3}$, $t_{m+3}$); and so on. The apparatus of control network 311 shown in FIG. 12 achieves this pairing, for $n$ either odd or even, in the following manner.

In counting circuit 2 of FIG. 12, the output terminal of the first stage, 22$a$, of counter 22 is connected to one of the three input terminals of gate 20, the "1" terminal of flip-flop 35 is connected to another input terminal of gate 20, and the $\alpha_0$ clock pulse output terminal of clock pulse generator 409 of FIG. 4B is connected to the third input terminal of gate 20. At the end of a pass, after the last or $n$th word has been recorded in memory 504, high counter 22 shows a count of $n$ and flip-flop 35 of circuit 4 is set to the "1" condition. If the count $n$ is even, the first stage 22$a$ is in the "0" state and gate 20 thus remains disabled. However, if $n$ is odd, then the first stage 22$a$ is in the "1" state, thereby enabling gate 20 to pass an $\alpha_0$ clock pulse to stage 22$a$ of counter 22 through OR gate 19. This $\alpha_0$ clock pulse advances counter 22 to an $n+1$ count and changes stage 22$a$ to the "0" state, which disables gate 20 to prevent more than one $\alpha_0$ clock pulse from passing to counter 22. Therefore, one $\alpha_0$ clock pulse interval after flip-flop 35 is set to "1" at the end of a pass, stages counter 22$b$ through 22$j$ of high counter 22 register either the count $m$ or the count $m+1$, depending upon whether $n$ is even or odd.

In addition, the "1" terminal of flip-flop 35 is connected through capacitor 29 and OR gate 28 to the set terminal of the first stage, 27$a$, of low counter 27 and to the reset terminals of all the other stages, 27$b$ through 27$i$. Therefore, at the same time that stages 22$b$ through 22$j$ of high counter show a count of either $m$ or ($m+1$), lower counter 27 shows a count of 1.

The first word of the first pair of words "read" out of memory 504 to smoothing network 304 is ($x_1$, $y_1$, $z_1$, $t_1$), and this word is selected by connecting the output terminals of stages 27$a$ through 21$i$ of counter 27 to memory 504 through gate 26, OR gate 17, and address selector 18. A one count signal from counter 27 is passed to address selector 18 to find the first address position and transfer the first word upon the arrival of a first timing signal, $\tau_1$, from circuit 3 which enables gate 26. The second word of the first pair of words is read out of memory 504 by having a second timing signal, $\tau_2$, from circuit 3 applied after the first $\tau_1$ signal through OR gate 21 to advance stages 22$b$ through 22$j$ of counter 22 to either the $m+1$ or $m+2$ count, depending upon whether $n$ is even or odd. Stages 22$b$ through 22$j$ are connected to gate 16, which is enabled by a third timing signal, $\tau_3$, from circuit 3. This third timing signal, which follows timing $\tau_2$ and precedes the next $\tau_1$, enables gate 16 to pass a count signal indicative of the count registered by stages 22$b$ through 22$j$ through OR gate 17 to address selector 18. Address selector 18 locates either the ($m+1$)th or the ($m+2$)th address position of memory 504, depending upon whether $n$ is even or odd, and reads out the word in that position as the second word in the first pair of smoothing network 304. The third timing signal from circuit 3 also advances counter 27 to the count of 2, and the succeeding sequences of timing signals from circuit 3 repeat the above operations to transfer successive pairs of words from memory 504 to smoothing network 304, in accordance with the principles of this invention.

Figure 13:
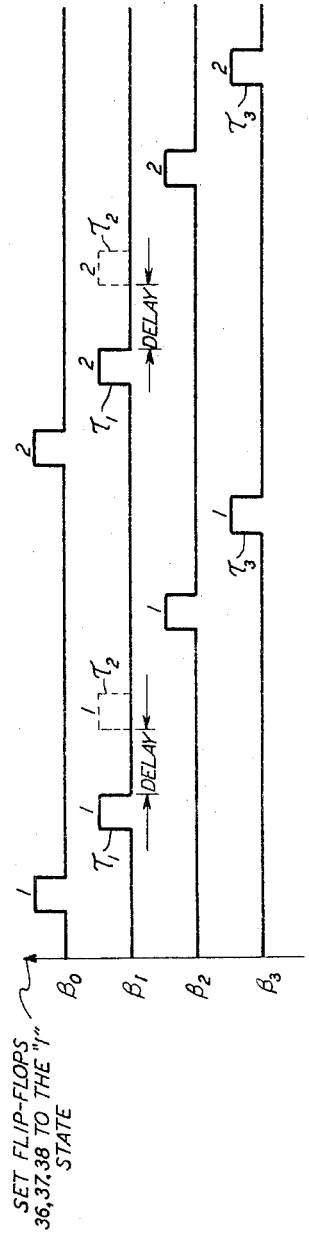
FIG. 13 is a pulse diagram showing the relationships between the times of occurrence of the clock pulses produced by clock pulse generator 39.

The three timing signals supplied to counting circuit 2 from circuit 3 are obtained in the following fashion. Upon the setting of flip-flop 36 to the "1" state by the delayed "end pass" signal from circuit 4, gate 40 is enabled through OR gate 56, thereby permitting a first $\beta_0$ clock pulse from clock pulse generator 39 to set flip-flop 43 to the "1" state. Clock pulse generator 39, which may be of a construction similar to that of clock pulse generator 409 of FIG. 4B, produces four trains of clock pulses, denoted $\beta_0$, $\beta_1$, $\beta_2$, $\beta_3$, each of which has the same repetition rate but a different time of occurrence. Thus, as illustrated in FIG. 13, each of the $\beta_1$ clock pulse follows a $\beta_0$ clock pulse, each of the $\beta_2$ clock pulses follow a $\beta_1$ clock pulse, and each of the $\beta_3$ clock pulses both follows a $\beta_2$ clock pulse and precedes the next $\beta_0$ clock pulse. If desired, the operations controlled by the clock pulses from generator 39 may be performed either more or less rapidly than those controlled by the $\alpha_0$, $\alpha_1$, $\alpha_2$ clock pulses from generator 409, with a corresponding adjustment of the repetition rate of the $\beta_0$, $\beta_1$, $\beta_2$, and $\beta_3$ clock pulses.

The "1" output terminal of flip-flop 43 is connected in parallel to gates 47, 49, and 41. In addition the "1" output terminal of flip-flop 43 is coupled through capacitor 48 to flip-flop 50 in order to reset flip-flop 50 to the "0" state when flip-flop 43 is set to the "1" state. The "0" output terminal of flip-flop 50 is connected to gate 52, and the enabling of gate 49 by flip-flop 43 and of gate 52 by flip-flop 50 permits a first $\beta_1$ clock pulse to pass to counting circuit 2 as the first timing signal $\tau_1$.

The first timing signal $\tau_1$ from gate 52 is also applied in parallel to delay element 53 and to flip-flop 54 in order to set it to the "1" state. The "1" output terminal of flip-flop 54 is connected to gate 55, thereby enabling gate 55 to pass the delayed first $\tau_1$ timing signal to counting circuit 2 as the first $\tau_2$ timing signal.

The first $\beta_2$ clock pulse following the first $\beta_1$ clock pulse passes through enabled gate 47 to set flip-flop 50 to the "1" state, thereby blocking further $\beta_1$ clock pulses from passing through gate 52. The "1" output terminal of flip-flop 50 is connected to gate 51, thereby enabling the first $\beta_3$ clock pulse following the first $\beta_2$ clock pulse to pass through gates 41 and 51 to counting circuit 2 as the first $\tau_3$ timing signal.

The relationships between the times of occurrence of clock pulses $\beta_0$, $\beta_1$, $\beta_2$, and $\beta_3$ are illustrated in FIG. 13. The first $\beta_0$ clock pulse generated after flip-flop 36 is set to the "1" state and gate 40 is enabled serves to set flip-flop 43 to the "1" state, which resets flip-flop 50 to the "0" state and enables gates 49 and 52 to pass the first $\beta_1$ clock pulse to counting circuit 2 as the first $\tau_1$ timing signal. The first $\beta_1$ clock pulse also becomes the first $\tau_2$ timing signal after setting flip-flop 54 to the "1" state and passing through delay element 53 and gate 55. The first $\beta_2$ clock pulse, which follows the first $\beta_1$ clock pulse by a time interval sufficient to allow both the $\tau_1$ and the $\tau_2$ timing signals to be applied to counting circuit 2, passes through gate 47 to set flip-flop 50 to the "1" state, thereby simultaneously disabling gate 52 and enabling gate 51 to permit the first $\beta_3$ clock pulse to pass to counting circuit 2 as the first $\tau_3$ timing signal.

The first $\beta_3$ clock pulse passed by gate 51 is also used to reset flip-flop 43 to the "0" state, in order to disable gates 47, 49, and 41 and thus prevent spurious pulses from passing to counting circuit 2. The second $\beta_0$ clock pulse following the first $\beta_3$ clock pulse sets flip-flop 43 to the "1" state and starts the generation of a second set of timing signals. The interval between successive $\beta_0$ clock pulses is made sufficiently long to permit the completion of the operations performed by smoothing network 304 on each pair of words transferred from memory unit 504.

FIG. 6

Referring now to both FIG. 5 and FIG. 6, the words read out of memory 504 are applied to smoothing network 304 in the following manner. Each word is made up of four groups of binary pulses, representing the four quantities $x_j$, $y_j$, $z_j$, $t_j$, which are passed by the four gates 511a through 511d, and the last word ($x_n$, $y_n$, $z_n$, $t_n$) carries an additional binary pulse, denoted $\omega$, which is passed by gate 511e. Gates 511a through 511e are enabled at the end of a pass by the "0" state of flip-flop 36 in circuit 3 of FIG. 12, and while enabled, gates 511a through 511d pass each of the four groups of binary pulses $x_j$, $y_j$, $z_j$, $t_j$ to the four pairs of gates 514h and 514l, 515h and 515l, 516h and 516l, and 517h and 517l, respectively. When the last word appears, gate 511e delivers the $\omega$ pulse through delay element 520 to flip-flop 36 as an "end-of-smoothing" pulse, $\omega_{Sp}$, to reset it to the "0" state and terminate the operation of circuit 3 in transferring ($x_j$, $y_j$, $z_j$, $t_j$) words from memory 504 to smoothing network 304. Gates 514h through 517h are connected to high register 602 in smoothing network 304, and gates 514l through 517l are connected to low register 605, respectively. Registers 602 and 605 are conventional storage devices of any desired construction, the designations "high" and "low" referring to the division of the sequence of words into two subsequences according to the explanation presented above under Section C. Smoothing and Averaging. An example of a register device for storing words is shown in J. Millman and H. Taub, Pulse and Digital Circuits, page 412 (1956).

Following the end of a pass, gates 514l through 517l are enabled by a first $\tau_1$ timing pulse from circuit 3 in network 311 to pass to low register 605 the four groups of pulses ($x_1$, $y_1$, $z_1$, $t_1$) located at address position one by selector 18 in response to one count signal from low counter 27; next, for $n$ even, for example, gates 514h through 517h are enabled by a first $\tau_3$ timing pulse to pass to high register 602 the four groups of pulses ($x_{m+1}$, $y_{m+1}$, $z_{m+1}$, $t_{m+1}$) located at address position ($m+1$) by selector 18 in response to an ($m+1$) count signal from stages 22b through 22j of high counter 22. After the group of binary pulses ($x_{m+1}$, $y_{m+1}$, $z_{m+1}$, $t_{m+1}$) is stored in register 602, the second $\beta_0$ clock pulse following the first $\tau_3$ timing pulse, as shown in FIG. 6, enables gates 606a through 606h. Thus, enabled, gates 606a through 606c pass the $x_{m+1}$, $y_{m+1}$, $z_{m+1}$ pulse signals simultaneously to adders 608a through 608c and to the minuend terminals of subtractors 610a through 610c; gates 606e through 606g pass the $x_1$, $y_1$, $z_1$ pulses simultaneously to adders 608a through 608c and to the subtrahend terminals of subtractors 610a through 610c; and gate 606d passes the $t_{m+1}$ pulse signal to the minuend terminal of subtractor 610d while gate 606h passes the $t_1$ pulses to the subtrahend terminal of subtractor 610d.

Shift registers 609a through 609c following adders 608a through 608c, respectively, operate to divide the sum signals developed by the adders by a factor of two, to produce at their quotient terminals three groups of pulses indicative of the three smoothed quantities $\bar{x}_1$, $\bar{y}_1$, $\bar{z}_1$, where $$\bar{x}_1 = \frac{x_1 + x_{m+1}}{2}$$

and so on. Subtractors 610a through 610d operate to subtract each of the four groups of pulses $x_1$, $y_1$, $z_1$, $t_1$ from the corresponding groups of pulses $x_{m+1}$, $y_{m+1}$, $z_{m+1}$, $t_{m+1}$ to form at their output terminals the four difference signals $x_{m+1}-x_1$, $y_{m+1}-y_1$, $z_{m+1}-z_1$, and $t_{m+1}-t_1$. The first three of these four difference signals are applied to the dividend terminals of dividers 611a through 611c, respectively, while the fourth difference signal, $t_{m+1}-t_1$, is applied in parallel to the divisor terminals of dividers 611a through 611c. Dividers 611a through 611c form at their quotient terminals three groups of output pulses representative of the three components $\dot{\bar{x}}_1$, $\dot{\bar{y}}_1$, $\dot{\bar{z}}_1$, of the first smoothed velocity vector, $\dot{\bar{p}}_1$. The individual adders, subtractors, dividers, and shift registers utilized in a smoothing network are of well-known design, and detailed descriptions of them may be found in Chapter 7 of the McCormick reference.

The sequence of operations described above for the first pair of binary signals transferred from memory 504 in storage network 303 to smoothing network 304 is performed successively for each of the remaining $m-1$ pairs of signals from memory 504, until the $\omega_{S_p}$ pulse in the last word resets flip-flop 36 in circuit 3 of network 311 to terminate the transfer of signals. Each set of six "smoothed" signals, $\bar{x}_j, \bar{y}_j, \bar{z}_j, \bar{\dot{x}}_j, \bar{\dot{y}}_j, \bar{\dot{z}}_j$ generated by smoothing network 304 is sent to orbital orientation angle solver 305 through gates 614a through 614f, which are enabled during the smoothing of $x, y, z$ signals by a common connection between their input terminals and the "1" output terminal of flip-flop 36. Angle solver 305 is a digital computer of suitable design, for example, an IBM 1620 computer, which is adapted or programmed in accordance with Equations 9c through 9e and 10a and 10b to derive from each set of six smoothed signals from network 304 a pair of signals indicative of values of the two orbital orientation angles $\Omega_j$ and $I_j$. The two sequences of angle signals $\{\Omega\}, \{I\}$, generated by angle solver 305 are transmitted in parallel to averager 307 and to refined estimate generator 309. Refined estimate generator 309, which is described later on, serves to derive estimates of the sample-mean variances and covariances from the sequence of angle signals, while averager 307, which is described next in connection with FIG. 7, operates to derive two best estimate signals, $\Omega_c$ and $I_c$, from the two sequences of angle signals.

FIG. 7

Figure 7:
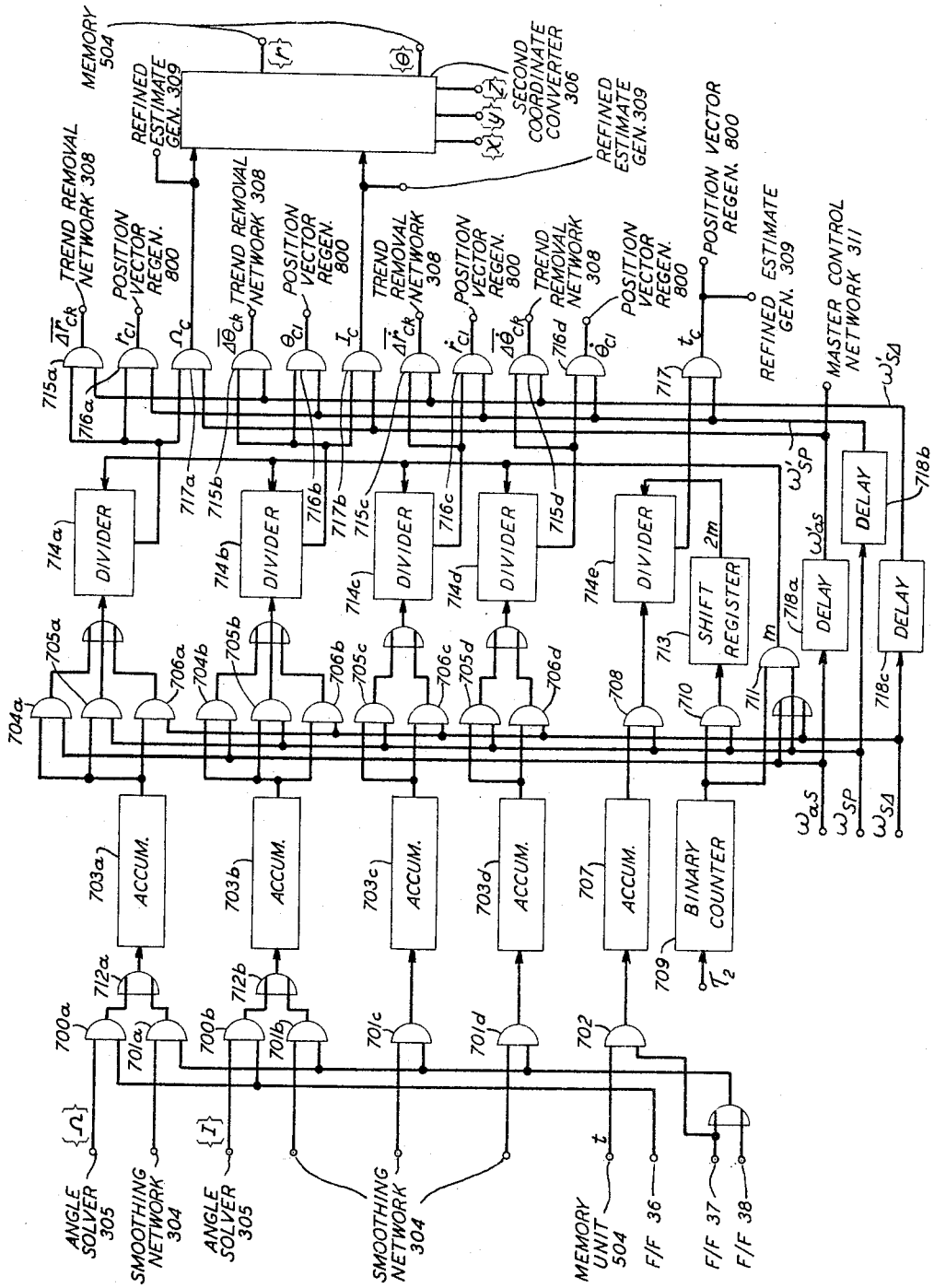
FIG. 7 is a schematic diagram showing apparatus for averaging signals in accordance with the principles of this invention.

With reference to the apparatus of averager 307 illustrated in FIG. 7, the two sequences of angle signals, $\{\Omega\}$ and $\{I\}$, from angle solver 305 are applied to the input terminals of gates 700a and 700b, respectively. These gates are enabled during the operation of angle solver 305 through having their other input terminal connected to the "1" output terminal of flip-flop 36 in control network 311. This arrangement passes the sequences $\{\Omega\}$ and $\{I\}$, as they are generated, through OR gates 712a and 712b to accumulators 703a and 703b, respectively. Accumulators 703a and 703b, as described on page 92 of the McCormick reference, store the cumulative sum of the binary numbers represented by the sequences of binary pulses applied to them. Thus, after the last angle signals, $\Omega_m$ and $I_m$, produced by angle solver 305 have been applied to accumulators 703a and 703b, there is stored in accumulator 703a a binary word representative of the sum $$\sum_{j=1}^{m} \Omega_j$$

and in accumulator 703b a binary word representative of the sum $$\sum_{j=1}^{m} I_j$$

The end of angle solving is signaled by the $\omega$ pulse associated with the last word $(x_n, y_n, z_n, t_n)$ from memory 504, which is delayed by passage through delay element 521 of network 305 to become $\omega_{aS}$, the delay permitting completion of the angle solving operation. The $\omega_{aS}$ pulse is applied to gates 704a and 704b to enable the sum signals in accumulators 703a and 703b to be transferred to the dividend terminals of dividers 714a and 714b, respectively. While cumulative signals are being formed in accumulators 703a and 703b, the number $m$ of angle signals in each sequence $\{\Omega\}, \{I\}$ is being counted by binary counter 709 through the application of the $m$ $\tau_2$ timing pulses generated by circuit 3 of network 311 during the smoothing of the $x, y, z$ signals. The $\omega_{aS}$ signal also enables gate 711 at the end of angle solving, thereby transferring an $m$ count signal from counter 709 to the divisor terminals of dividers 714a and 714b.

Dividers 714a and 714b develop at their output terminals quotient signals indicative of best estimates of the orbital orientation angles, $\Omega_c$ and $I_c$, in accordance with Equations 12a and 12b in Part I. These two best estimate signals are then transmitted through gates 717a and 717b, respectively, to refined estimate generator 309 and to second coordinate converter 306. Gates 717a and 717b are enabled by the $\omega_{aS}$ pulse after passage through delay element 718a to become the $\omega_{aS}'$ pulse. Coordinate converter 306, which may be a general purpose digital computer such as the IBM 1620 computer, is also supplied with the $x, y, z$ signals stored in memory 504, and operating under a suitable program specified by the Equations 13a through 15b in Part I above, converts the $x, y, z$ signals into $r, \theta$ signals.

Converter 306 is supplied with $x, y, z$ signals in the proper sequential order by the following arrangement. Referring back to FIG. 12, the $\omega_{aS}'$ signal from delay element 718a of averager 307 is applied through OR gate 7 to set flip-flop 5 of sequential memory advancing circuit 1 to the "1" state. The "1" output terminal of flip-flop 5 is connected through OR gate 7 to an input terminal of gate 10, and in counting circuit 2, to an input terminal of gate 23, and through capacitor 25 and OR gate 24 to the reset terminals of high counter 22. When flip-flop 5 is set to the "1" state, counter 22 is reset to a count of zero, and gates 10 and 23 are enabled. From clock pulse generator 13, the $\gamma_3$ clock pulse next following the setting of flip-flop 5 to the "1" state is passed by gate 10 to set flip-flop 6 to the "1" state. Since the "1" output terminal of flip-flop 6 is connected in parallel to the input terminals of gates 9a, 9b, and 9c, these gates are enabled following the setting of flip-flop 6 to the '1' state by a $\gamma_3$ clock pulse.

Clock pulse generator 13 may be of conventional design and generates four trains of clock pulses, denoted $\gamma_0, \gamma_1, \gamma_2, \gamma_3$, which have the same repetition rate but different times of occurrence. That is, $\gamma_0$ precedes $\gamma_1$, $\gamma_1$ follows $\gamma_0$ and precedes $\gamma_2$, $\gamma_2$ follows $\gamma_1$ and precedes $\gamma_3$, and $\gamma_3$ follows $\gamma_2$ and precedes $\gamma_0$. When gates 9a through 9c are simultaneously enabled by a $\gamma_3$ clock pulse setting flip-flop 6 to the "1" state, the next following $\gamma_0$ clock pulse passes through gate 9a to advance counter 22 from zero to the count of one. The $\gamma_1$ clock pulse following the first $\gamma_0$ clock pulse passes through gate 9b and OR gate 58 to enable gate 15 and thereby transfer a count of one signal from counter 22 to address selector 18. The $\gamma_1$ clock pulse is also transmitted to storage network 305, where it enables the read terminal of memory 504 and gates 512a through 512c and 518. This serves to transfer the three groups of binary pulses $x_1, y_1, z_1$, recorded in the first address position of memory 504 and located by selector 18, to second coordinate converter 306.

Converter 306 converts the $x_1, y_1, z_1$ binary pulses to two groups of binary pulses indicative of polar coordinates, $r_1, \theta_1$, in the orbital plane of the satellite. The $r_1$ and $\theta_1$ signals produced by converter 306 are applied to gates 501a and 501b, respectively, in network 305, which are enabled by the first $\gamma_2$ clock pulse from clock pulse generator 13 in network 311 to pass the $r_1, \theta_1$ signals through OR gates 500a and 500b to register 502. From register 502, the $r_1, \theta_1$ signals are recorded in memory 504 in place of the $x_1, y_1$ signals already recorded in address position number one, by having the $\gamma_2$ clock pulse pass through delay element 509a and OR gate 510 to enable gates 503a and 503b and the write terminal of memory 504. The first $\gamma_2$ clock pulse also resets flip-flop 6 in network 311 to disable gates 9a through 9c until the next $\gamma_3$ clock pulse, which is the second $\gamma_3$ pulse generated by clock pulse generator 13 after the $\omega_{aS}'$ pulse sets flip-flop 6 to the "1" state and starts the transferring of the second set of binary signals, $x_2, y_2, z_2$, from memory 504 to coordinate converter 306, and the second set of converted signals, $r_2$, $\theta_2$, back to memory 504.

When the last three groups of pulses, $x_n$, $y_n$, $z_n$, are read out of memory 504, the last word bit $\omega$ associated with them is also read out by the enabling of gate 518. This last word bit is passed through delay element 523, after which it is denoted $\omega_c$ to signify the end of the coordinate conversion operation performed by converter 306. The delay time of element 523 is adjusted to allow sufficient time for the conversion of $x_n$, $y_n$, $z_n$, to $r_n$, $\theta_n$ signals, so that the $\omega_c$ signal is applied to the reset terminal of flip-flop 5 immediately after the $\gamma_2$ clock pulse that enables memory 504 to record $r_n$, $\theta_n$. The resetting of flip-flop 5 disables gates 10 and 23 to stop the transfer of further signals to converter 306. The $\omega_c$ signal is also used to set flip-flop 11 to the "1" state in order to disable inhibit gate 12 and block $\gamma_2$ pulses for the subsequent operations to be performed by circuit 1 of network 311 upon the signals obtained from a given pass. At the start of the next pass, however, flip-flop 11 is reset to the "0" state by the "start" signal from circuit 4, thereby enabling inhibit gate 12 to permit the recording of $r$, $\theta$ signals in memory 504 at the proper time.

The next operations to be performed in this invention are smoothing and averaging of the $r$, $\theta$ signals stored in memory unit 504, to obtain four signals representative of first estimates of the four remaining orbital parameters, $r$, $\theta$, $\dot{r}$, $\dot{\theta}$. These four first estimate signals, which shall be denoted, $r_{c1}$, $\theta_{c1}$, $\dot{r}_{c1}$, $\dot{\theta}_{c1}$, are obtained by utilizing the $\omega_c$ signal to initiate the operation of circuit 3 in network 311, which controls the transfer of pairs of $r$, $\theta$, $t$ signals from memory 504 to smoothing network 304 in the proper order.

The $\omega_c$ signal is delivered to the set terminal of flip-flop 37 in circuit 3 of network 311, which sets flip-flop 37 to the "1" state, and through a connection between the "1" output terminal of flip-flop 37 and gate 40, actuates circuit 3 to transfer the proper pairs of signals from memory 504 to smoothing network 304. In addition, the "1" output terminal of flip-flop 37 is connected to the read terminal of memory 504 through OR gate 505, and to gates 511$a$, 511$b$, 511$d$, and 512$d$. This arrangement serves to transfer pairs of $r$, $\theta$, $t$ signals to smoothing network 304, in exactly the same fashion as pairs of $x$, $y$, $z$, $t$ signals were previously transferred.

Referring now to FIGS. 6 and 7, as each pair of $r_j$, $\theta_j$ signals is smoothed in network 304, the four resulting smoothed signals, denoted $\bar{r}_j$, $\bar{\theta}_j$, $\bar{\dot{r}}_j$, $\bar{\dot{\theta}}_j$, are transmitted to averager 307. At averager 307, each group of four smoothed signals is passed through gates 701$a$ through 701$d$, which are enabled by the "1" state of flip-flop 37, to accumulators 703$a$ through 707$d$. Each of the accumulators develops a signal representative of the cumulative sum of all the binary pulses applied to it, so that by the end of the smoothing operation performed by smoothing network 304, accumulators 703$a$ through 703$d$ have developed at their output terminals four signals representing the four sums $$\sum_{j=1}^{m}\bar{r}_j, \quad \sum_{j=1}^{m}\bar{\theta}_j, \quad \sum_{j=1}^{m}\bar{\dot{r}}_j, \quad \sum_{j=1}^{m}\bar{\dot{\theta}}_j$$

In order to derive four first estimate signals from these four sum signals, it is necessary to divide each sum signal by a signal indicative of the number $m$. Such a signal is obtained by counting in binary counter 709 the $m$ $\tau_2$ timing pulses generated in circuit 3 during the smoothing of the $r$, $\theta$ signals, and by applying the total count in counter 709 in parallel to the divisor terminals of dividers 714$a$ through 714$d$ at the same time that the four sum signals are applied to the dividend terminals. The $\omega$ pulse associated with the last word ($r_n$, $\theta_n$, $t_n$), after passage through delay element 522 in network 305, becomes an "end-of-smoothing $r$, $\theta$" signal, denoted $\omega_{SP}$, and is used to enable gates 705$a$ through 705$d$ and 711 in averager 307, in order to apply the four sum signals and the $m$ count signal to the dividers at the same instant. The $\omega_{SP}$ signal also terminates the operation of circuit 3 in network 311 by being delivered to the reset terminal of flip-flop 37, and simultaneously initiates the next operation performed by the apparatus of this invention, trend removal, by setting flip-flop 8 in circuit 1 of network 311 to the "1" state.

Figure 8:
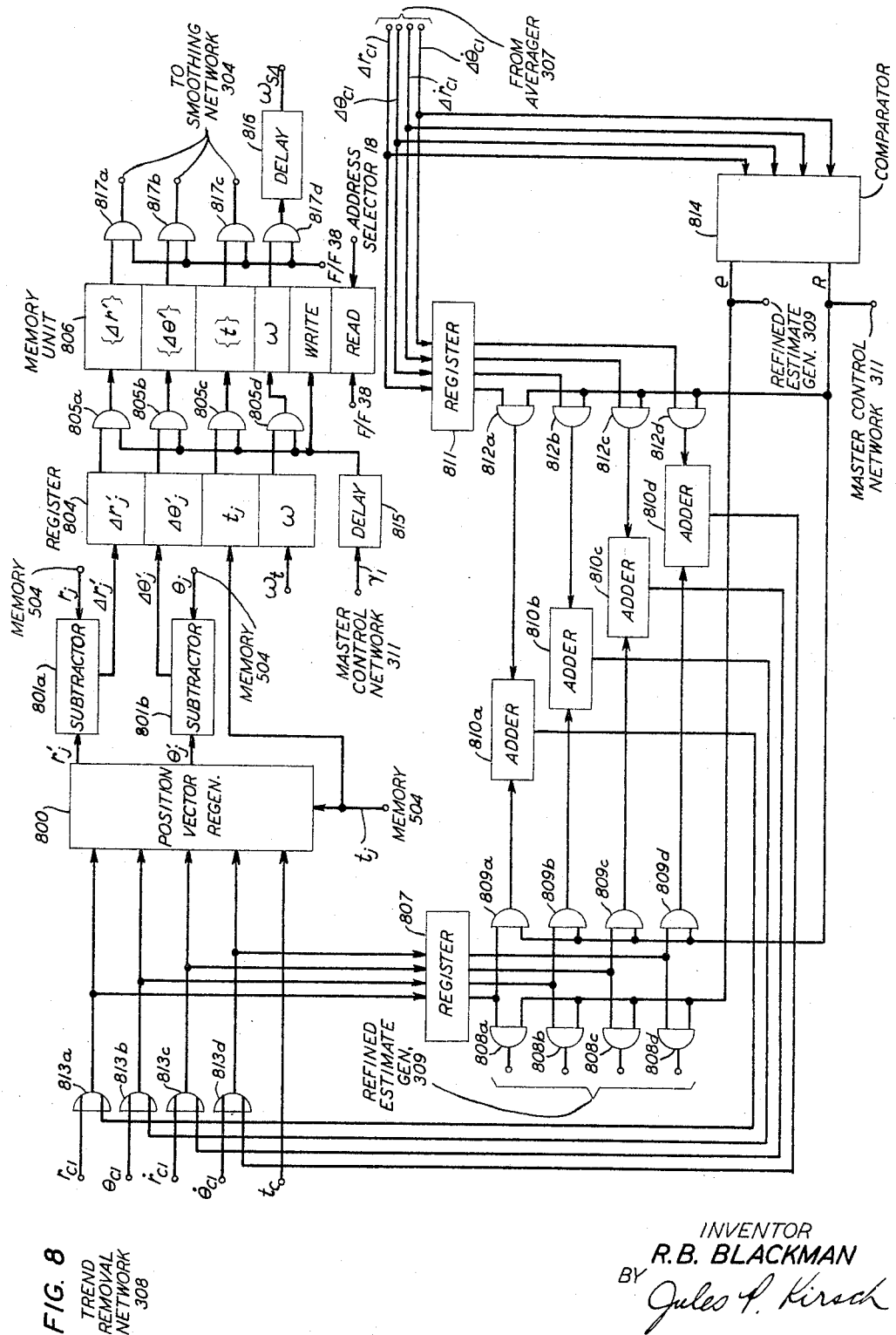
FIG. 8 is a schematic diagram showing apparatus for performing the trend removal operations of this invention.

Dividers 714$a$ through 714$d$ of averager 307 form at their respective quotient terminals four first estimate signals $r_{c1}$, $\theta_{c1}$, $\dot{r}_{c1}$, $\dot{\theta}_{c1}$, from which four best estimate signals are derived in trend removal network 308, the apparatus of which is illustrated in FIG. 8. The four first estimate signals are passed to position vector regenerator 800 of network 308 through gates 716$a$ through 716$d$, respectively, the gates being enabled simultaneously by the end-of-smoothing signal, after a time delay sufficient to allow for completion of the division operation. The proper time delay is effected by passing the $\omega_{SP}$ signal through delay element 718$b$, after which the $\omega_{SP}$ signal is denoted $\omega_{SP}'$.

Before proceeding to a description of the trend removal operation performed by the apparatus of network 308 shown in FIG. 8, it is necessary to note that both the trend removal operation and the combination of best estimates operation require a signal representing the reference time, $t_c$, of each set of best estimate signals. As defined in Equation 12$c$, the reference time of a set of best estimates is $$t_c = \frac{1}{n}\sum_{j=1}^{n}t_j$$

where $t_j$ is the time of observation of the $j$th set of observed data. Since in this invention the number $n$ is always equal to $2m$, either because $n$ is even or because the $(m+1)$th or middle set of data is not utilized when $n$ is odd, a signal representative of the number $n=2m$ may be obtained by multiplying the number of $\tau_2$ timing pulses, $m$ by a constant factor of 2. Thus, as illustrated in FIG. 7, the $\omega_{SP}$ signal also enables gate 710 to pass the count of $m$ from counter 709 to shift register 713, which is designed to develop at its output terminal a binary signal representing a number equal to twice the number represented by the binary signal applied to its input terminal. The $2m$ signal developed by shift register 713 is applied to the divisor terminal of divider 714$e$ and a signal indicative of the sum $$\sum_{j=1}^{n}t_j$$

is obtained from accumulator 707 through gate 708.

The input signals to accumulator 707 comprise the sequence of time signals associated with the sequence of $r$, $\theta$ signals transferred from memory 504 to smoothing network 304 during the smoothing of the $r$, $\theta$ signals. Thus, as illustrated in FIGS. 5 and 7, the time signal $t_j$ associated with each pair of $r_j$, $\theta_j$ signals is passed from gates 517$h$ and 517$l$ through OR gates 525 to gate 702 and thence to accumulator 707. Gate 702 is enabled only by the "1" state of flip-flop 37, so that accumulator 707 forms a sum signal only during the smoothing and averaging of the $r$, $\theta$ signals. The reference time signal $t_c$ developed by divider 714$e$ from the sum signal $$\sum_{j=1}^{n}t_j$$

from accumulator 707 and the count of $2m$ signal from shift register 713 is transmitted through gate 717 to both position vector regenerator 800 of trend removal network 308 and refined estimate generator 309.

FIG. 8

With reference to FIG. 8, the four first estimate signals $r_{c1}$, $\theta_{c1}$, $\dot{r}_{c1}$, $\dot{\theta}_{c1}$, and the reference time signals, $t_c$, from averager 307 are applied through OR gates 813$a$ through 813d to position vector regenerator 800. In addition, the four first estimate signals are stored in register 807 for future use. Position vector regenerator 800 is a general purpose digital computer for example an IBM 1620 computer, adapted in accordance with Equations 17a, 17b, 19a, 19b, 19c and 19d to derive from the four first estimate signals two new sequences of digitals signals representative of the components $\{r\}^1$, $\{\theta\}^1$, of a first sequence of regenerated $n$ position vectors $\{P\}^1$. To obtain these regenerated component signals, it is necessary to supply regenerator 800 with the sequence of time of observation signals $\{t\}$, associated with the sequences of observed component signal $\{r\}$, $\{\theta\}$, since each pair of regenerated signals, $r_j^1$, $\theta_j^1$, is compared with a corresponding pair of observed signals, $r_j$, $\theta_j$, in subtractors 801a and 801b.

From memory 504 in network 303, the time of observation signals $\{t\}$ are applied to position vector regenerator 800, and the $\{r\}$, $\{\theta\}$ signals are applied to the minuend terminals of subtractors 801a, 801b, respectively, by utilizing the end-of-smoothing signal, $\omega_{SP}$, from delay element 522 to set flip-flop 8 in circuit 1 of network 311 to the "1" state, as previously mentioned. In circuit 1 of network 311, the "1" state of flip-flop 8 enables gate 10 to pass the first $\gamma_3$ clock pulse following the $\omega_{SP}$ signal, thereby setting flip-flop 6 to the "1" state and enabling gates 9a and 9b. In addition, the "1" state of flip-flop 8 enables the read terminal of memory 504 and gates 513a, 513b, 513c, and 519. This arrangement serves to pass, in sequential order, the $r$, $\theta$ signals from memory 504 in network 303 to subtractors 801a and 801b, respectively, and the $t$ signals to position vector regenerator 800, all in trend removal network 308.

As each pair of signals, $r_j^1$, $\theta_j^1$, is produced by regenerator 800, they are applied to the subtrahend terminals of subtractors 801a and 801b, respectively, which form at their output terminals signals proportional to the differences $\Delta r_j^1 = r_j - r_j^1$, $\Delta\theta_j^1 = \theta_j - \theta_j^1$, respectively. The difference signals $\Delta r_j^1$, $\Delta\theta_j^1$ are sent to register 804, together with the corresponding time signals, $t_j$. In control network 311, the $j$th $\gamma_1$ clock pulse, which enables gate 15 to pass a count of $j$ signal from counter 22 to address selector 18, also enables gates 805a through 805c of network 308 to pass the $j$th signal $\Delta r_j^1$, $\Delta\theta_j^1$, $t_j$ from register 804 to memory unit 806, and enables the write terminal of memory 806 to record these signals. However, in network 308 the $\gamma_1$ clock pulses are first passed through delay element 815, which suitably delays the $\gamma_1$ clock pulses to permit completion of the operations performed by regenerator 800 and subtractors 801a and 801b. To memory unit 806 is also connected the output terminal of address selector 18 of network 311, so that the $j$th address position is located at the same time in both memory 504 and memory 806, thereby obtaining correspondence in address position between the $\Delta r_j^1$, $\Delta\theta_j^1$ signals, and the $r_j$, $\theta_j$ signals having the same time signal, $t_j$.

When the last signals $r_n$, $\theta_n$, $t_n$ are read out of memory 504, the associated last word pulse $\omega$ is passed through delay element 524 to become an end-of-subtraction signal, $\omega_t$. Delay element 524 delays the $\omega$ pulse to allow for the completion of the subtraction operation by subtractors 801a and 801b, and the $\omega_t$ pulse is then applied to the reset terminal of flip-flop 8 in circuit 1 of network 311 to stop the reading of signals out of memory 504, and the writing of signals in memory 806. The $\omega_t$ pulse is also applied to register 804 in network 308 to become a last word pulse $\omega$ associated with the signals $\Delta r_n^1$, $\Delta\theta_n^1$ in memory unit 806. Since the regeneration and subtraction operations may be repeated a number of times, in the trend removal process, the end of subtraction pulse may appear a number of times, one for each cycle of the trend removal process.

In the next part of the trend removal process, the $\Delta r_j^1$, $\Delta\theta_j^1$ signals are smoothed and averaged in smoothing network 304 followed by averager 307 to obtain four signals representative of the four increments, $\Delta r_{c1}$, $\Delta\theta_{c1}$, $\Delta\dot{r}_{c1}$, $\Delta\dot{\theta}_{c1}$. These four increment signals are then applied to a comparator 814, which may be of a construction similar to that of comparators 401a through 401c in FIG. 4B. Comparator 814 compares each of the four increment signals against a preassigned standard, and depending upon the outcome of this comparison, one or the other of two signals, denoted $e$ and $R$, is produced by comparator 814. If one or more of the increment signals is larger than the preassigned standard, a repeat signal, denoted R, is produced to start the second trend removal cycle. If all of the increment signals are smaller than the preassigned standard, then an end of trend removal signal, denoted $e$, is produced to permit the first estimate signals, which are by definition the best estimate signals, to be passed to refined estimate generator 309, or alternatively, directly to a utilization device 310.

Smoothing and averaging of the $\Delta r_j^1$, $\Delta\theta_j^1$ signals is achieved by using the end of subtraction signal, $\omega_t$, to initiate the operation of circuit 3 in master control network 311. The $\omega_t$ signal resets high counter 22 to a count of zero, sets low counter 27 to a count of one, and sets flip-flop 38 to the "1" state to start the transfer of pairs of signals from memory 806 in network 308 to smoothing network 304. In the "1" state flip-flop 38 also enables gates 817a through 817d in trend removal network 308 and gates 701a through 701d in averager 307.

When the last signals $\Delta r_n^1$, $\Delta\theta_n^1$ are read out of memory 806 to smoothing network 304, the associated last word signal $\omega$ is passed through delay element 816 to become an "end of smoothing" signal, denoted $\omega_{SA}$. This end of smoothing signal is delivered to the reset terminal of flip-flop 38 in circuit 3 of network 311 to stop the reading of memory 806, and to gates 706a through 706d and gate 710 in averager 307 to complete the averaging operation. In averager 307, the $\omega_{SA}$ signal, after passage through delay element 718c to become $\omega_{SA}'$, enables gates 715a through 715d to pass the four increment signals developed by dividers 714a through 714d to register 811 and comparator 814 in trend removal network 308.

In trend removal network 308, the output terminals of register 811, corresponding to the four increment signals, are connected in parallel to gates 812a through 812d, which are enabled by the repeat trend removal signal, R, from comparator 814. The output terminals of register 807, corresponding to the four first estimate signals previously stored, are connected to two sets of gates, 808a through 808d and 809a through 809d, where gates 808a through 808d are enabled by an end of trend removal signal, $e$, from comparator 814, and gates 809a through 809d are enabled by an R signal.

In the event that the set of first estimate signals is not sufficiently accurate, as determined by comparator 814 from the set of first increment signals, an R signal is generated by comparator 814 to enable gates 809a through 809d and gates 812a through 812d. The output terminals of these two sets of gates are connected to the input terminals of adders 810a through 810d, which develop at their output terminals a set of second estimate signals, $r_{c2}$, $\theta_{c2}$, $\dot{r}_{c2}$, $\dot{\theta}_{c2}$, in accordance with Equations 20k through 20n in Part I above. On the other hand, if the first estimate signals are sufficiently accurate to be best estimate signals, comparator 814 produces an $e$ signal which enables gates 808a through 808d to pass the four first estimate signals from register 807 to refined estimate generator 309 as the best estimate signals, $r_c$, $\theta_c$, $\dot{r}_c$, $\dot{\theta}_c$.

If the trend removal process is to be repeated, the second estimate signals from adders 810a through 810d are stored in register 807 in place of the first estimate signals, and are also applied through OR gates 813a through 813d to position vector regenerator 800 for the regeneration of a second pair of sequences of regenerated component signals, denoted $\{r\}^2$, $\{\theta\}^2$. The R signal from comparator 814 is utilized to initiate the second trend removal cycle by applying it to the set terminal of flip-flop 8 in network 311, which starts a second reading of $r, \theta, t$ signals from memory 504 to regenerator 800, subtractors 801a and 801b, and register 804, as in the first trend removal cycle. And, exactly as in the first trend removal cycle, the last word signal $\omega$ from memory 504 is passed through delay element 524 to become an end of subtraction signal, which is delivered to the reset terminal of flip-flop 8 to end the second reading of memory 504, and simultaneously to flip-flop 38, counter 22, and counter 27, all in network 311, to start the smoothing of $\Delta r_j{}^2$, $\Delta \theta_j{}^2$ signals recorded in memory 806.

The operations performed by trend removal network 308 are repeated for as many cycles as are necessary to obtain a set of signals in register 807 of sufficient accuracy to be utilized as best estimates of the four orbital parameters, $r, \theta, \dot{r}, \dot{\theta}$, as indicated by the increment signals stored in register 811. As mentioned previously, the best estimate signals may be employed directly in a suitable utilization system 310, but if greater accuracy is desired, they may be transmitted to refined estimate generator 309, to be combined with best estimate signals from another pass in the manner described below.

FIGS. 9A AND 9B

Figure 9A:
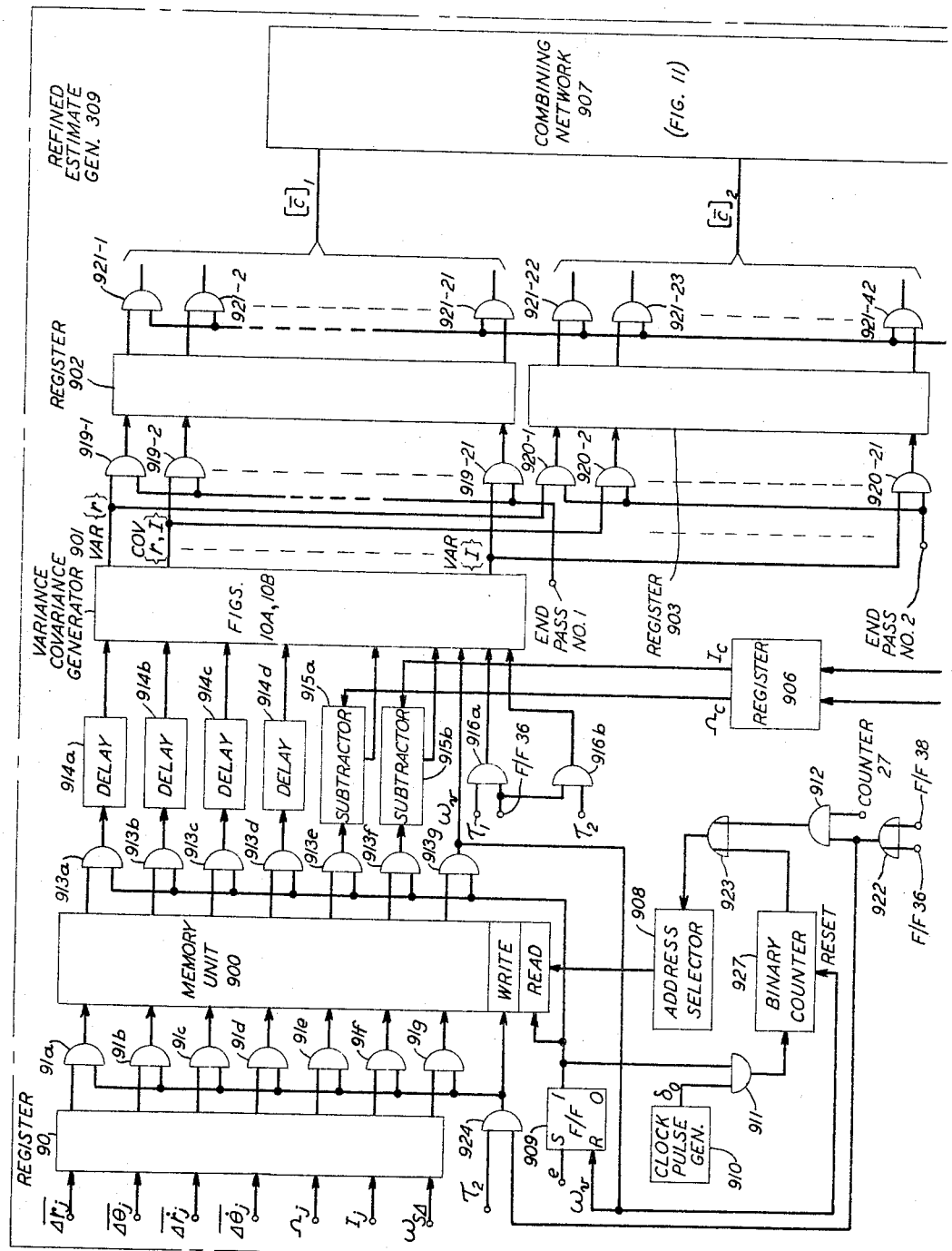
FIGS. 9A and 9B are schematic diagrams showing apparatus for obtaining a set of refined estimate signals from two sets of best estimate signals.
Figure 9B:
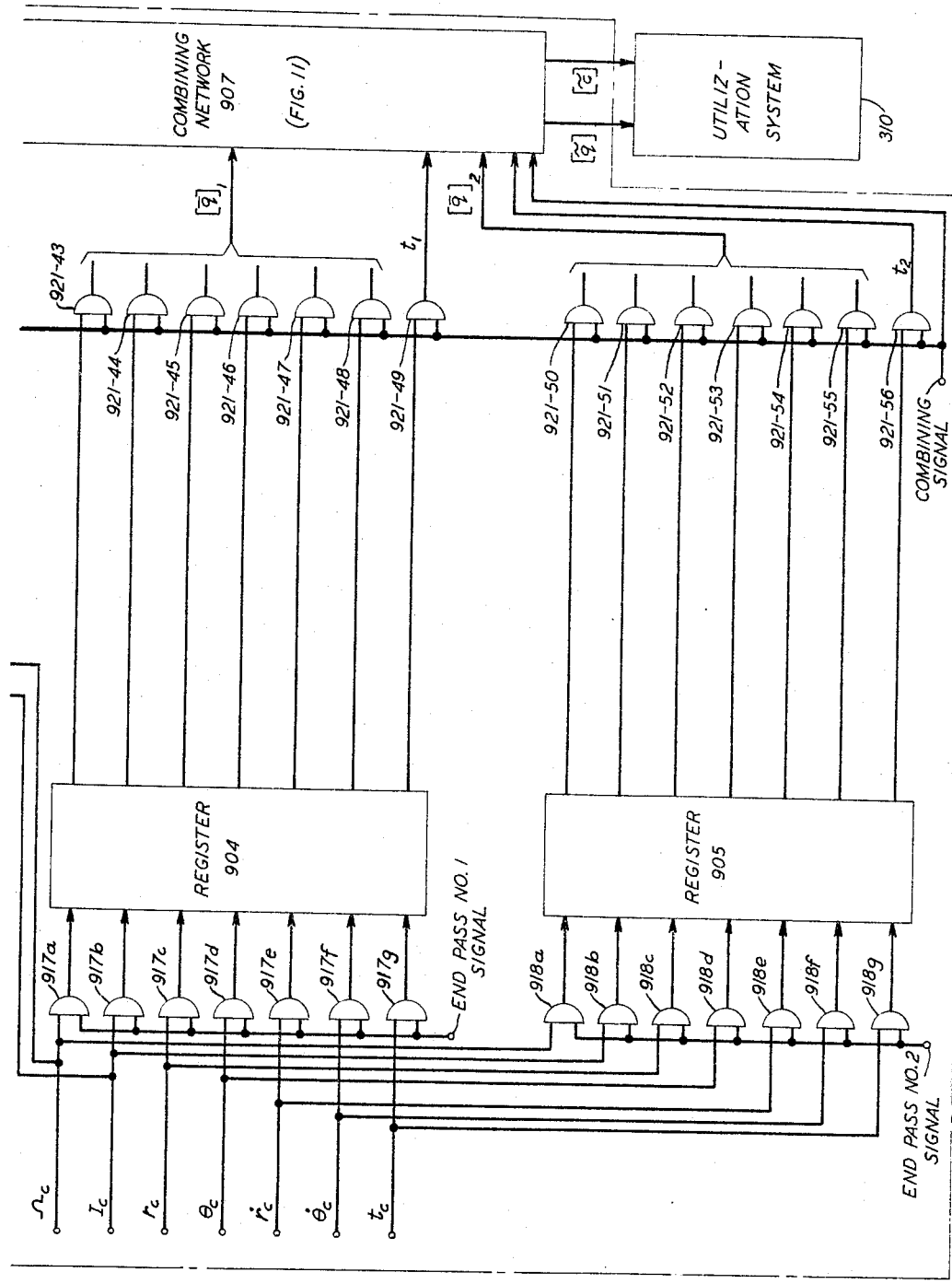
Figure 11:
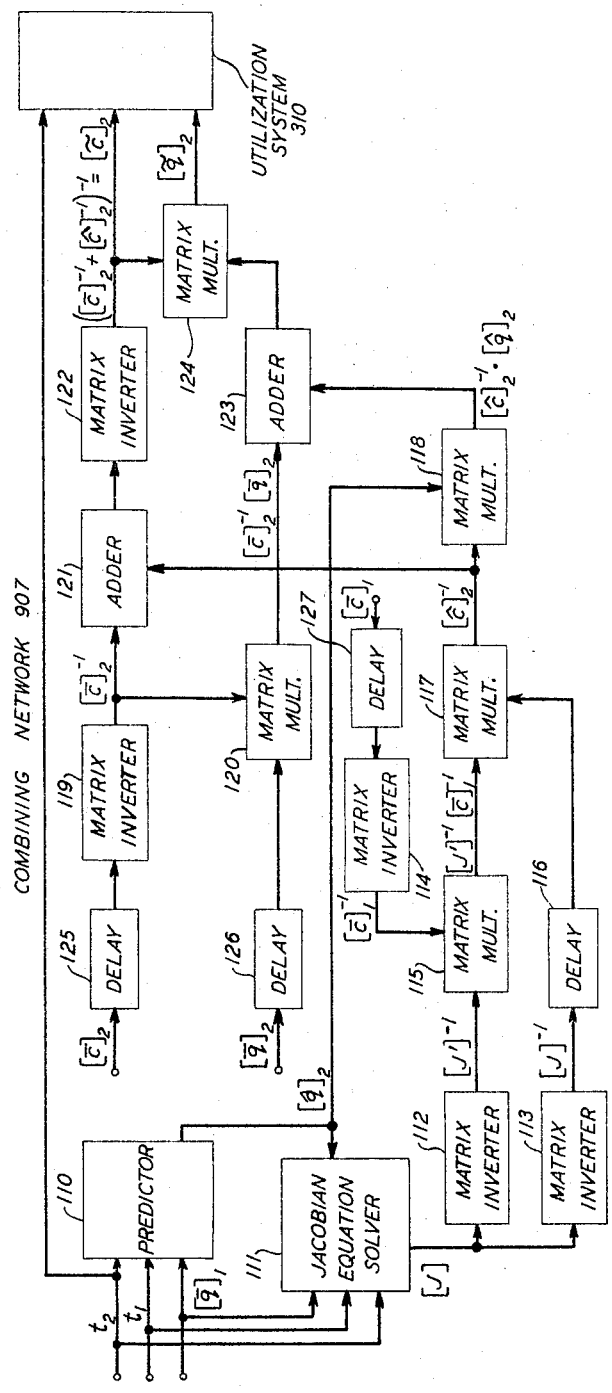
FIG. 11 is a schematic block diagram showing apparatus for combining two sets of best estimate signals and their associated variance and covariance signals to form a set of refined estimate signals and an associated set of variance and covariance signals.

The detailed structure of refined estimate generator 309 is illustrated principally in FIGS. 9A and 9B with details of the two components labeled variance-covariance generator 901 and combining network 907 being shown separately in FIGS. 10A and 10B, and FIG. 11, respectively. Turning first to FIG. 9A, it is recalled from Part I above that in order to combine two sets of best estimates from different passes, it is necessary to have the six sample-mean variances and fifteen sample-mean convariances associated with each set of estimates. The present invention obtains signals representative of estimates of these variances and covariances from certain signals generated during the derivation of the six best estimate signals from the radar signals for a given pass. Specifically, the signals from which the variance and covariance signals are obtained comprise the two sequences of orbital orientation angle signals $\{\Omega\}$ and $\{I\}$, from angle solver 305, and four sequences of so-called smoothed difference signals, $\{\overline{\Delta r}\}^k$, $\{\overline{\Delta \theta}\}^k$, $\{\overline{\Delta \dot{r}}\}^k$, $\{\overline{\Delta \dot{\theta}}\}^k$, from smoothing network 304.

The two sequences of orbital orientation angle signals from angle solver 305 are stored in register 90 a pair at a time as they are produced, and then written into memory unit 900. The proper address position for each of the $m$ pairs of angle signals is located in memory 900 by address selector 908, to whose input terminal is delivered a count signal from counter 27 in circuit 2 of network 311 through gate 912 and OR gate 923. Counter 27 is advanced from a count of one to a count of $m$ as as each of the $m$ pairs of $x, y, z$ signals is transferred from storage network 303 to smoothing network 304, and since the $j$th pair of angle signals, $\Omega_j, I_j$, is obtained after smoothing the $j$th pair of $x, y, z$ signals, address selector 908 locates the $j$th address position of memory 900 in response to the count of $j$ from counter 27. Each pair of angle signals in register 90 is passed to the appropriate address position of memory 900 by a $\tau_2$ timing pulse from network 311 which enables gates 91e and 91f and the write terminal of memory 900. To ensure that the count of counter 27 and the $\tau_2$ timing pulses are applied to the proper time, gate 912 is enabled to pass the count by flip-flop 36 connected through OR gate 922, and the $\tau_2$ timing pulses are passed through gate 924, which is also enabled by flip-flop 36 connected through OR gate 922.

At the end of the angle solving operation and the subsequent recording in memory 900 of the $m$ pairs of angle signals, flip-flop 36 is reset to the "0" state and no further signals are recorded in memory 900 until flip-flop 38 is set to the "1" state at the beginning of the trend removal operation, thereby again enabling gates 912 and 924. It is recalled from the prior description of trend removal network 308 that the $j$th sequences of difference signals, $\{\Delta r\}^j$, $\{\Delta \theta\}^j$, recorded in memory 806 of network 308 in the $j$th trend removal cycle, are transferred in pairs to smoothing network 304 in exactly the same fashion that the $x, y, z$ signals are transferred to network 304. From smoothing network 304, each of the four sequences of smoothed difference signals, denoted $\{\overline{\Delta r}\}^j$, $\{\overline{\Delta \theta}\}^j$, $\{\overline{\Delta \dot{r}}\}^j$, $\{\overline{\Delta \dot{\theta}}\}^j$, which are derived from the two $j$th sequences of difference signals, are passed to register 90 of refined estimate generator 309 through gates 615a through 615d, which are enabled by flip-flop 38. At refined estimate generator 309, the proper address positions in memory 900 are located by address selector 908 in response to the successive count signals, $1, 2, \ldots, m$, from counter 27, and the $\tau_2$ timing pulses enable gates 91a through 91d as well as the write terminal of memory 900. In addition, the end of smoothing signal, $\omega_{SA}$, from delay 816 in trend removal network 308, is applied to register 90 together with the last set of four smoothed difference signals, $\overline{\Delta r}_m{}^j$, $\overline{\Delta \theta}_m{}^j$, $\overline{\Delta \dot{r}}_m{}^j$, $\overline{\Delta \dot{\theta}}_m{}^j$, and is passed through gate 91g to memory 900 to indicate the last or $m$th set of signals stored in memory 900.

In general, it is necessary to perform $k$ cycles of trend removal in order to obtain a set of best estimate signals, and, correspondingly, it is the $k$th set of sequences of smoothed difference signals, which represents the deviations of the four best estimate signals, $r_c, \theta_c, \dot{r}_c, \dot{\theta}_c$, from which variance and covariance signals may be derived. Accordingly, each time that flip-flop 38 is set to the "1" state at the beginning of a trend removal cycle, the four sequences of smoothed difference signals produced by smoothing network 304 in that cycle are sent to refined estimate generator 309, where they are recorded in memory 900 in place of the four sequences of smoothed difference signals recorded during the previous trend removal cycle. At the end of the $k$th or last trend removal cycle, the four recorded sequences $\{\overline{\Delta r}\}^k$, $\{\overline{\Delta \theta}\}^k$, $\{\overline{\Delta \dot{r}}\}^k$, $\{\overline{\Delta \dot{\theta}}\}$, represent the deviations of the four best estimate signals, $r_c, \theta_c, \dot{r}_c, \dot{\theta}_c$.

In addition to the signals stored in memory 900, the six best estimate signals, $r_c, \theta_c, \dot{r}_c, \dot{\theta}_c, \Omega_c, I_c$, together with the reference time signal, $t_c$, for a given pass are stored, for example, in a register, in refined estimate generator 309, as they are produced. As shown in FIG. 9B, there are two registers, 904 and 905, for storing these seven signals, register 904 being used to store the seven signals obtained from the radar signals for one pass, and register 905 being used to store the seven signals obtained from the radar signals for another pass. To route the seven signals from each pass to the proper register, gates 917a through 917g are enabled by an appropriate signal during the derivation of one set of seven signals for one pass, and gates 918a through 918g are enabled by an appropriate signal during the derivation of a second set of seven signals for another pass. These enabling signals are obtained from the apparatus of FIG. 4A, as indicated by operation of the appropriate switches.

At the end of the $k$th or last trend removal cycle after the end of the first pass, for example, the four best estimate signals $r_c, \theta_c, \dot{r}_c, \dot{\theta}_c$, are passed from register 807 through gates 808a through 808d in trend removal network 308 to register 904 in refined estimate generator 309, where they join the previously stored best estimate signals $\Omega_c$ and $I_c$, and the reference time signal $t_c$. The end of trend removal signal $e$, which enables gates 808a through 808d in network 308, also sets flip-flop 909 in generator 309 to the "1" state, as shown in FIG. 9A. The "1" output terminal of flip-flop 909 is connected to the read terminal of memory 900, to the control terminal of gate 911, and to the control terminals of gates 913a through 913g. By this arrangement, δ₀ clock pulses from clock pulse generator 910 are passed to binary counter 927 to advance it from a count of zero to a count of m until the one-bit signal, denoted $\omega_v$, associated with the mth or last set of signals in memory 900 passes through gate 913g to reset flip-flop 909 to the "0" state and binary counter 927 to the count of zero. The output terminal of binary counter 927 is connected through OR gate 923 to the input terminal of address selector 908, so that as counter 927 is advanced by successive δ₀ clock pulses, address selector 908 successively locates the corresponding address positions in memory 900, and the signals recorded in each address position are read out through gates 913a through 913g.

Although the four smoothed difference signals, $\overline{\Delta r_j}$, $\overline{\Delta \theta_j}$, $\overline{\Delta \dot{r}_j}$, $\overline{\Delta \dot{\theta}_j}$, recorded in each of the m address positions of memory 900 are representative of deviations of the four corresponding best estimates, it is necessary to subtract the best estimate signals $\Omega_c$, $I_c$ from the two angle signals $\Omega_j$, $I_j$, in each of the m address positions of memory 900 in order to form signals corresponding to deviations of $\Omega_c$ and $I_c$. This is accomplished by connecting the output terminals of gates 913e and 913f to the minuend terminals of subtractors 915a and 915b, respectively, and by connecting the $\Omega_c$ and $I_c$ output terminals of register 906 to the subtrahend terminals subtractors 915a and 915b, respectively. The output terminals of gates 913a through 913d are connected to delay elements 914a through 914d, respectively, in order to delay the four deviation signals $\overline{\Delta r_j}$, $\overline{\Delta \theta_j}$, $\overline{\Delta \dot{r}_j}$, $\overline{\Delta \dot{\theta}_j}$, from each address position for a sufficient time while the subtraction operation is being performed on each pair of $\Omega_j$, $I_j$ signals. Each pair of deviation signals $(\Omega_j - \Omega_c)$, $(I_j - I_c)$, developed by subtractors 915a and 915b is transmitted together with the four deviation signals $\overline{\Delta r_j}$, $\overline{\Delta \theta_j}$, $\overline{\Delta \dot{r}_j}$, $\overline{\Delta \dot{\theta}_j}$ to variance-covariance generator 901, where signals indicative of estimates of the six sample-mean variances and fifteen sample-mean covariances are developed from the applied deviation signals.

Register 906 also receives the incoming $\Omega_c$ and $I_c$ signals from each pass, and the two output terminals of register 906 are connected directly to subtractors 915a and 915b in order to supply continuously the stored $\Omega_c$ and $I_c$ signals at the subtrahend terminals of the subtractors. This arrangement also provides for forming the deviation signals $(\Omega_j - \Omega_c)$, $(I_j - I_c)$, for each pass, because when the $\Omega_c$, $I_c$ signals for a given pass are received by register 906 they replace any $\Omega_c$, $I_c$ signals which may have been stored from a previous pass.

In addition to the six sequences of deviation signals, variance-covariance generator 901 has previously received the $m\tau_2$ and the $(m-1)\tau_1$ timing pulses during the smoothing of the x, y, z signals. These two trains of timing pulses are applied to generator 901 through gates 916a and 916b, which are enabled during the smoothing of the x, y, z signals by flip-flop 36.

FIGS. 10A and 10B

Referring now to the detailed structure of the variance-covariance generator shown in FIGS. 10A and 10B, each set of incoming deviation signals, for example, the jth set comprising the six signals $\overline{\Delta r_j}$, $\overline{\Delta \theta_j}$, $\overline{\Delta \dot{r}_j}$, $\overline{\Delta \dot{\theta}_j}$, $(\Omega_j - \Omega_c)$, $(I_j - I_c)$ is applied to an array of 21 multipliers arranged in six rows and six columns. The first row comprises six multipliers 917a through 917f, the second row comprises five multipliers 918b through 918f, the third row comprises four multipliers 919c through 919f, the fourth row comprises three multipliers 920d through 920f, the fifth row comprises two multipliers 921e and 921f, and the sixth row comprises a single multipler 922f. Each of the incoming deviation signals is applied to all of the multipliers in a preassigned row, and all except the first deviation signal, $\overline{\Delta r_j}$, are also applied to all of the multipliers in a selected column.

It is recalled from Equation 23f in Part I that an estimate of the sample-mean variance associated with a best estimate is formed by squaring all of the m deviations, adding the m squared deviations, and dividing the sum of the m squared deviations by the factor $m(m-1)$. In the apparatus of FIGS. 10A and 10B signals indicative of each of the squared deviations of each best estimate are formed by applying the incoming deviation signal for each row to both input terminals of multipliers in the sixth or last column, 917f through 922f. Thus the $\overline{\Delta r_j}$ deviation signal is applied to both input terminals of multiplier 917f, which develops a product signal signifying the squared deviation, $(\overline{\Delta r_j})^2$. To form the sum of the squared deviations, the output terminal of each multiplier 917f through 922f is connected to an accumulator 923f through 928f, respectively. The accumulators, which may be of a construction similar to those shown in averager 307, serve to add together all of the signals applied to their input terminals, so that on receiving the mth or last squared deviation signal from multipliers 917f through 922f, accumulators 923a through 928a develop at their output terminals signals proportional to the six sums, $$\sum_{j=1}^{m}(\overline{\Delta r_j})^2, \sum_{j=1}^{m}(\overline{\Delta \theta_j})^2$$

$$\sum_{j=1}^{m}(\overline{\Delta \dot{r}_j})^2, \sum_{j=1}^{m}(\overline{\Delta \dot{\theta}_j})^2, \sum_{j=1}^{m}(\Omega_j - \Omega_c)^2, \text{ and } \sum_{j=1}^{m}(I_j - I_c)^2$$

respectively.

It is further recalled from Equation 23i that an estimate of the sample-mean covariance associated with two best estimates is formed by multiplying together the m deviations of each quantity, adding the m resulting products, and dividing the sum of the m products by the factor $m(m-1)$. In the apparatus of FIGS. 10A and 10B, the fifteen possible combinations of product signals associated with each set of six deviation signals, taken two at a time, are developed by the fifteen multipliers 917a through 917e, 918b through 918e, 919c through 919e, 920d and 920e, and 921e, in the first five columns of the array. Each incoming deviation signal is applied to one input terminal of all the multipliers in one of the six rows, and all but one of the deviation signals are applied to one input terminal of all the multipliers in one of the five columns, so that each deviation signal is applied to one input terminal of a total of five different multipliers, in addition to the last column of multipliers, in which each deviation signal is delivered to both input terminals of a single multiplier. Since there are six deviation signals, this requires fifteen multipliers each having two input terminals, as shown in FIGS. 10A and 10B.

As an example, consider the deviation signal $\overline{\Delta \dot{r}_j}$ in the jth set of six incoming deviation signals. $\overline{\Delta \dot{r}_j}$ is applied to one input terminal of the three multipliers 919c through 919e in the third row, in addition to both input terminals of multiplier 919f, and to one input terminal of the two multipliers 917b and 918b in the second column, thereby making a total of five multipliers having $\overline{\Delta \dot{r}_j}$ applied to one input terminal.

To form the sum of the succession of m product signals developed by each multiplier, the output terminal of each multiplier is connected to the input terminal of an accumulator. Thus the output terminals of multipliers 917a through 917e, 918b through 918e, 919c through 919e in the third row, in addition to both input terminals terminals of accumulators 923a through 923e, 924b through 924e, 925c through 925e, 926d and 926e, and 927e, respectively. On receiving the mth product signal from each multiplier, the output signals developed by these fifteen accumulators indicate the fifteen sums $$\sum_{j=1}^{m}(\overline{\Delta r_j})(\overline{\Delta \theta_j}), \sum_{j=1}^{m}(\overline{\Delta r_j})(\overline{\Delta \dot{r}_j}), \ldots, \sum_{j=1}^{m}(\Omega_j - \Omega_c)(I_j - I_c)$$

When the $m$th set of deviation signals is passed to variance-covariance generator 901, the $\omega_V$ signal associated with this last set is also passed to generator 901, where after passing through delay 935, it is used to enable gates 929a through 929u, thereby permitting the sum signals of the twenty-one accumulators to be applied to the dividend terminals of dividers 930a through 930u. The $m(m-1)$ divisor signal by which each of the twenty-one sum signals must be divided in order to form estimates of the sample-mean variance and sample-mean covariance signals is obtained from binary counters 931 and 932. Counter 931 is supplied with $\tau_1$ timing pulses passed by gate 916a during the smoothing of the $x$, $y$, $z$ signals, and counter 932 is supplied with $\tau_2$ timing pulses passed by gate 916b. Since there are $(m-1)\tau_1$ timing pulses and $m\tau_2$ timing pulses generated during the smoothing operation, counter 931 is advanced to a count of $(m-1)$ and counter 932 is advanced to a count of $m$ by the time that the $\omega_V$ pulse enables gates 933a and 933b and thus passes the $(m-1)$ and $m$ count signals to multiplier 934, where the product $m \cdot (m-1)$ is formed. This product signal is passed through gate 929v to all of the divisor terminals of dividers 930a through 930u, and the quotient signals developed by the dividers constitute the estimated sample-mean variance and covariance signals associated with the best estimate signals for a given pass.

Referring back to FIG. 9A, the variance and covariance signals from generator 901 are stored in either register 902 or register 903, depending upon the pass to which the signals correspond. If the signals correspond to pass number one, then gates 919-1 through 919-21 are enabled by the end pass number one signal to direct the variance and covariance signals to storage in register 902, whereas for pass number two, gates 920-1 through 920-21 are enabled by the pass number two signal to direct the variance and covariance signals to register 903.

Upon obtaining the best estimate, variance and covariance signals for two passes, together with two reference time signals, making a total of fifty-six signals in all, these signals are passed from registers 902, 903, 904, and 905 through gates 921-1 through 921-56 to combining network 907, the gates being simultaneously enabled by a suitable "combining" signal from the apparatus of FIG. 4A. In accordance with the matrix notation employed in Part I above, the set of best estimate signals from pass number one is denoted $[\overline{q}]_1$, from pass number two, $[\overline{q}]_2$, while the set of variance and covariance signals from pass number one is denoted $[\overline{C}]_1$, and from pass number two, $[\overline{C}]_2$. Similarly, the set of refined estimate signals and the set of associated variance and covariance signals derived from the two sets of incoming signals by combining network 907 are denoted $[\tilde{q}]$ and $[\tilde{C}]$, respectively.

FIG. 11

With reference to FIG. 11, the structure of combining network 907 is shown in outline form by means of blocks that indicate the various operations to be performed upon the incoming sets of best estimate, variance and covariance, and reference time signals. Since the exact nature of the various operations is prescribed by the equations set forth in Part I above, the specific components of each of these blocks may be readily determined by persons skilled in the art from these equations and from a reference to the prior art given below. Specifically, the blocks in FIG. 11 labeled predictor 110, Jacobian equation solver 111, matrix inverters 112, 113, 114, 119 and 122, and matrix multipliers 115, 117, 118, 120 and 124, may each be realized by any one of a variety of well-known computing devices. For example, each of these blocks may be realized by a separate general purpose digital computer programmed to process the incoming signals applied to it according to the description given below, a suitable computer being an IBM 1620 computer.

The $[\overline{q}]_1$ or earlier set of best estimate signals and the two reference time signals are applied to predictor 110, which may be a general purpose digital computer of well-known construction as described above. Predictor 110 is adapted in accordance with a set of prediction equations of the form shown in Equations 24a through 24f to produce from the incoming signals a set of predicted estimate signals, denoted $[\hat{q}]_2$, at the later reference time $t_2$. The predicted estimate signals are sent to Jacobian equation solver 111, together with the first set of best estimate signals $[\overline{q}]_1$ and the two reference time signals, $t_1$ and $t_2$, in order to obtain a group of signals representative of the elements of the Jacobian matrix defined by Equation 32a. Jacobian equation solver 111 may also be a general purpose digital computer of any well-known variety such as the IBM 1620, programmed according to either Equations J-1 through J-33 or Equations K-1 through K-20, depending upon whether the satellite's orbit is circular or noncircular.

The group of signals produced by Jacobian equation solver 111, denoted in matrix form [J], is delivered in parallel to matrix inverters 112 and 113, each of which may be an IBM 1620 computer programmed to obtain from the signals produced by Jacobian equation solver 111 two new groups of signals, one representative of $[J^1]^{-1}$ and the other representative of $[J]^{-1}$. The design or programming of these inverters may be based upon any of the well-known methods for obtaining the inverse of a matrix; for example, see the iterative method described by G. N. Lance, Numerical Methods for High Speed Computers (1960, page 94, and the program given at pages 43-55 of the previously mentioned text, Mathematical Methods for Digital Computers. However, inverter 112 is designed to produce a group of signals representing the inverse of the transposed Jacobian, denoted $[J']^{-1}$, whereas inverter 113 is designed to produce a group of signals representing the inverse of the Jacobian, denoted $[J]^{-1}$, as required by Equation 32c.

From inverters 112 and 113, the two groups of signals, $[J']^{-1}$ and $[J]^{-1}$, are passed to matrix multiplier 115 and delay element 116, respectively. In matrix multiplier 115, which may be an IBM 1620 computer, the $[J']^{-1}$ signals are combined in matrix multiplication fashion, as specified in Equation 32c, with the signals representing the inverse of the variance-covariance matrix associated with the first set of best estimates and denoted $[\overline{C}]_1^{-1}$. The $[\overline{C}]_1^{-1}$ signals were obtained by passing the first set of variance and covariance signals through delay element 127 to matrix inverter 114, which may also be an IBM 1620 computer programmed in a manner similar to the programming of matrix inverter 113 to obtain a set of signals representative of the inverse variance-covariance matrix $[\overline{C}]_1^{-1}$ from the signals representative of $[\overline{C}]_1$. The output signals of matrix multiplier 115 are combined in multiplier 117, for example, an IBM 1620 computer, with the delayed inverse Jacobian signals $[C]^{-1}$ in matrix multiplication fashion to form a group of signals indicative of the estimated sample-mean variances and covariances associated with the predicted estimate signals at reference time $t_2$. This group of output signals from multiplier 117, which may be denoted $[\hat{C}]_2^{-1}$, is combined with the predicted estimate signals, $[\hat{q}]_2$, in multiplier 118, which may be an IBM 1620 computer programmed in the manner specified by Equation 50b.

In addition, the $[\hat{C}]_2^{-1}$ signals are added in adder 121 to the signals representing the inverse of the matrix of estimated sample-mean variance and covariance signals, $[\bar{C}]_2^{-1}$, associated with the best estimate signals at the later reference time $t_2$. These $[\bar{C}]_2^{-1}$ signals are obtained by applying the incoming $[\bar{C}]_2$ signals through delay element 125 to matrix inverter 119, which may be an IBM 1620 computer that is programmed in a fashion similar to inverters 113 and 114. The sum of the two groups of inverted matrix signals from adder 121 is then applied to matrix inverter 122, which may also be an IBM 1620 computer programmed in the same manner as inverters 112, 113, 114, and 119, in order to derive a set of signals representing the estimated sample-mean variances and covariances, denoted $[\tilde{C}]$, which are associated with the set of refined estimate signals, $[\tilde{q}]$. From inverter 122, the $[\tilde{C}]$ signals are delivered to multiplier 124, which may be an IBM 1620 computer, where they are used to develop the refined estimate signals, and to utilization device 310, which may include an antenna pointing system of the type previously referred to in the detailed description of FIG. 3 and more fully described in the previously mentioned article by Klahn, Norton and Githens, where they may be used in combining the refined estimate signals with another set of estimate signals.

Returning to multiplier 118, the other group of input signals, in addition to the $[\hat{C}]_2^{-1}$ signals, is the set of predicted estimate signals, $[\hat{q}]_2$, from predictor 110. The product signals from multiplier 118 are passed to adder 123, where they are added to the product signals $[\bar{C}]_2^{-1}$ $[\bar{q}]_2$ from multiplier 120, where multiplier 120 may be any one of a number of digital computers such as the IBM 1620. The input signals to multiplier 120 are the second set of best estimate signals $[\bar{q}]_2$, which have been delayed by passage through delay element 126, and the group of inverted matrix signals $[\bar{C}]_2^{-1}$ from inverter 119. The sum of the two groups of product signals developed by adder 123 is transmitted to multiplier 124, which is a digital computer programmed to produce from the sum of the product signals from adder 123 and the $[\tilde{C}]$ signals from inverter 122 a set of so-called refined estimate signals, $[\tilde{q}]$. The refined estimate signals are passed to utilization device 310, where together with the reference time signal $t_2$ and the variance and covariance signals, they may be suitably employed, for example, in the generation of antenna orientation orders for tracking a communications satellite. It is to be understood that the above-described arrangements are illustrative of the applications of the principles of this invention. Numerous other arrangements may be devised by those skilled in the art without departing from the spirit and scope of the invention.

What is claimed is:

1. A system for rapidly determining from a large number of measurements at different observation times the orbital parameters of a terrestrial satellite at a single predetermined reference time which comprises
    a source of a first chronological sequence of signals indicative of the observed positions of a terrestrial satellite at different instants of time during a pass relative to a predetermined point on the surface of the earth,
    means for determining from said first sequence of observed position signals a pair of signals indicative of the orbital orientation angles of said satellite at a single predetermined reference time during said pass,
    means supplied with said first sequence of observed position signals and said pair of orbital orientation angle signals for obtaining a second chronological sequence of observed position signals indicative of said observed positions of said satellite relative to an inertial coordinate system at the center of the earth,
    means responsive to said second sequence of observed position signals for obtaining a group of signals which approximate the position and velocity of said satellite at said reference time, and
    means actuated by said second sequence of observed position signals and said group of position and velocity signals for reducing the magnitude of errors in said group of position and velocity signals.

2. A system for rapidly determining from a large number of position measurements at different observation times the orbital parameters of a terrestrial satellite at a single predetermined reference time which comprises
    a source of a first plurality of chronological sequences of signals indicative of the observed positions of a terrestrial satellite at various instants of time during a first pass and a second plurality of chronological sequences of signals indicative of the observed positions of said satellite at various instants of time during a second pass,
    means supplied with said first and second pluralities of sequences of observed position signals for obtaining first and second sets of orbital parameter signals closely approximating the orbital parameters of said satellite at first and second reference times during said first and second passes, respectively,
    means responsive to said first and second pluralities of sequences of observed position signals and said first and second sets of orbital parameter signals for deriving first and second groups of variance and covariance signals respectively representing estimates of the sample-mean variances and sample-mean covariances associated with said first and second sets of orbital parameter signals, respectively, and
    means for combining said first and second sets of orbital parameter signals and said first and second groups of variance and covariance signals to obtain a third set of orbital parameter signals and a third group of variance and covariance signals at said second reference time.

3. A system for determining the orbital parameters of a terrestrial satellite which comprises
    tracking means for generating a plurality of continuous input signals during a pass of a terrestrial satellite,
    sampling and coding means responsive to said input signals for generating a first plurality of chronological sequences of signals indicative of the observed positions of said satellite at a corresponding chronological sequence of times of observation, said observed positions being referred to a coordinate system whose origin is at said tracking means,
    first computing means supplied with said first plurality of observed position signals for generating a second plurality of chronological sequences of signals indicative of the observed positions of said satellite referred to an inertial, rectangular coordinate system whose origin is at the center of the earth,
    first storage means for recording said second plurality of observed position signals generated by said first computing means,
    first control means for causing selected pairs of said second plurality of observed position signals to be transmitted from said first storage means to a first smoothing means,
    said first smoothing means operating to generate from said selected pairs of observed position signals a first plurality of sequences of signals representing smoothed positions and smoothed velocities of said satellite during said pass,
    second computing means supplied with said first plurality of smoothed position and smoothed velocity signals for obtaining two sequences of angle signals indicative of the nodal longitude and angle of inclination, respectively, of said satellite during said pass,
    first averaging means responsive to said two sequences of angle signals for deriving from each of said sequences a single angle signal representing, respectively, an estimate of the nodal longitude and an estimate of the angle of inclination of said satellite at a single reference time during said pass, second control means for causing said second plurality of observed position signals to be transmitted in chronological order from said first storage means to a third computing means, said third computing means being responsive to said angle estimate signals and said second plurality of observed position signals for generating a third plurality of chronological sequences of signals indicative of the observed positions of said satellite referred to an inertial, polar coordinate system which lies in the orbital plane of said satellite and whose origin is at the center of the earth, second storage means for recording said third plurality of observed positions generated by said third computing means, third control means for causing selected pairs of said third plurality of observed position signals to be transmitted from said second storage means to a second smoothing means, said second smoothing means operating to produce from said selected pairs of said third plurality of observed position signals a second plurality of sequences of signals representing smoothed positions and smoothed velocities of said satellite during said pass, second averaging means actuated by said second plurality of smoothed position and smoothed velocity signals to obtain a first group of signals representing estimates of the position and velocity of said satellite at said reference time during said pass, and fourth control means for causing said third plurality of observed position signals to be transmitted in chronological order from said second storage means to a trend removal means, wherein said trend removal means operates upon said first group of position and velocity estimate signals and said chronological sequence of third plurality of observed position signals to reduce the dynamic errors in each of said position and velocity estimate signals, said trend removal means comprising means for obtaining from said first group of position and velocity estimate signals a first plurality of sequences of regenerated position signals referred to said inertial, polar coordinate system, means for subtracting said first plurality of regenerated position signals from said third plurality of observed position signals to derive a sequence of difference signals, smoothing and averaging means supplied with said sequence of difference signals for obtaining a group of increment signals indicative of the errors in said position and velocity estimate signals, means for comparing said group of increment signals with a corresponding group of preassigned small quantities, means for utilizing said first group of position and velocity estimate signals to represent the true values of the position and velocity of said satellite at said reference time when each of said increment signals is smaller than its corresponding preassigned small quantity, means for adding each of said increment signals to the corresponding one of said first group of position and velocity estimate signals to obtain a second group of position and velocity estimate signals when one or more of said increment signals is larger than its corresponding preassigned small quantity, and means for substituting said second group of position and velocity estimate signals for said first group of position and velocity estimate signals as input signals for said trend removal means.

4. Apparatus as defined in claim 3 wherein said first control means comprises a first counting means responsive to the last of said second plurality of observed position signals for registering the count of one upon completion of the recording of said second plurality of observed position signals in said first storage means, a second counting means responsive to the last of said second plurality of observed position signals for registering the count of $m+1$ upon completion of the recording of said second plurality of observed position signals in said first storage means when the number, $n$, of observed position signals in said second plurality is equal to an even number $2m$, and registering the count of $m+2$ upon the completion of the recording of said second plurality of observed position signals when the number, $n$, of observed position signals in said second plurality is equal to an odd number, $2m+1$, means responsive to the last of said second plurality of observed position signals recorded in said first storage means for alternately advancing said first and second counting means in steps of one, and means connected to said first and second counting means for utilizing each pair of successive counts in said first and second counting means to select a corresponding pair of observed position signals recorded in said first storage means.

5. Apparatus for determining the position and velocity of a terrestrial satellite which comprises a first input means for supplying a plurality of signal trains each of which has an equal number of components which represent observed positions of a terrestrial satellite at a chronological sequence of times of observation during a pass, and a single signal train whose components represent said chronological sequence of times of observation, a second input means for deriving from said observed position signal trains and said time of observation signal train a group of signals representing estimates of the position and velocity of said satellite at a reference time during said pass, and trend removal means coacting with said first and second input means for iteratively reducing the error in said group of estimate signals, said trend removal means including, in combination, means responsive to said group of estimate signals and said train of time of observation signals for obtaining a plurality of signal trains whose components represent regenerated positions of said satellite at said times of observation during said pass, means for subtracting the components of said regenerated position signal train from the corresponding components of said observed position signal train to form a plurality of trains of difference signals, storage means actuated by a control means for recording said pluralities of trains of difference signals and said single train of corresponding time of observation signals, wherein said control means responds to the last of said difference signals recorded in said storage means to cause a succession of pluralities of selected pairs of said difference signals, one pair from each said trains of difference signals, and a corresponding succession of selected pairs of said time of observation signals to be transmitted to a smoothing means followed by an averaging means, said smoothing means operating to derive from said succession of pluralities of selected pairs of difference signals and said succession of corresponding pairs of time of observation signals a plurality of trains of smoothed difference signals, each of which trains contains an equal number of components, and said averaging means operating to derive from said plurality of trains of smoothed difference signals a plurality of increment signals representing the errors in said group of estimate signals, means for comparing said plurality of increment signals with a corresponding plurality of predetermined small quantities, means for utilizing said group of estimate signals as close approximations of the position and velocity of said satellite at said reference time when each of said increment signals is smaller than its corresponding predetermined small quantity, and means for adding each of said increment signals to its corresponding estimate signal to develop a group of corrected estimate signals when one or more of said increment signals is larger than its corresponding predetermined small quantity, said group of corrected estimate signals being substituted for said group of estimate signals as input signals for said trend removal means.

6. Apparatus as defined in claim 5 wherein said smoothing means comprises a plurality of adding means, one for each pair of difference signals in each of said pluralities of selected pairs of difference signals, a plurality of subtracting means, one for each pair of difference signals in each of said pluralities of selected pairs of difference signals and one for said corresponding pair of time of observation signals, means for simultaneously applying each of said pairs of difference signals to one of said adding means and to one of said subtracting means to develop, respectively, a sum signal from each of said pairs of difference signals and a remainder signal from each of said pairs of difference signals, a first plurality of dividing means connected to the output terminals of said plurality of adding means for dividing each of said sum signals by a factor of two to form a first plurality of quotient signals, means for applying said pair of time of observation signals to one of said subtracting means to develop a time difference signal, and a second plurality of dividing means, to each of whose dividend terminals is applied one of said remainder signals and to each of whose divisor terminals is applied said time difference signal, for dividing each of said remainder signals by said time difference signal to form a second plurality of quotient signals, wherein the succession of said first and second pluralities of quotient signals developed from said succession of pluralities of selected pairs of difference signals and said succession of corresponding pairs of time of observation signals comprises said plurality of trains of smoothed difference signals.

7. Apparatus as defined in claim 5 wherein said averaging means comprises a plurality of cumulative adding means, one for each of said trains of smoothed difference signals, for developing from the components of each train of smoothed difference signals a sum signal representative of the total sum of all of the components in each of said trains, a plurality of dividing means, one for each of said cumulative adding means, wherein each of said dividing means has a dividend terminal, a divisor terminal, and a quotient terminal, counting means responsive to said control means for registering the number of components in each of said trains of smoothed difference signals, and means responsive to the last components of said trains of difference signals for connecting each of said plurality of cumulative adding means to the dividend terminal of said corresponding dividing means and said counting means in parallel to the divisor terminals of all of said dividing means, whereby the signals developed at the quotient terminals of said dividing means comprise said plurality of increment signals.

8. Apparatus for combining two sets of estimates of the orbital parameters of a terrestrial satellite to derive a third set of estimates which is more accurate than either of the two sets of estimates from which it is derived, which comprises a first input means for supplying a first set of signals representing estimates of the elements of a first matrix of orbital parameters of a terrestrial satellite at a first reference time, a second input means for supplying a second set of signals representing estimates of the elements of a second matrix of orbital parameters of said satellite at a second reference time, a third input means for supplying first and second groups of variance-covariance signals representing estimates of the elements of the sample-mean variance-covariance matrices associated, respectively, with said first and second sets of orbital parameter signals, means coacting with said first and second input means for adjusting said first set of orbital parameter signals to the reference time of said second set of orbital parameter signals, means responsive to said adjusted first set of orbital parameter signals, said second set of orbital parameter signals, and said first group of variance-covariance signals for adjusting said first group of variance-covariance signals to said second reference time, means supplied with said adjusted first group of variance-covariance signals for obtaining a first group of signals representing estimates of the elements of the inverse sample-mean variance-covariance matrix associated with said adjusted first set of orbital parameter signals, means supplied with said second group of variance-covariance signals for obtaining a second group of signals representing estimates of the elements of the inverse sample-mean variance-covariance matrix associated with said second set of orbital parameter signals, means responsive to said adjusted first set of orbital parameter signals and said first group of inverse variance-covariance matrix signals for post-multiplying, in matrix multiplication fashion, said first group of inverse variance-covariance matrix signals by said adjusted first set of orbital parameter signals to obtain a first set of weighted orbital parameter signals, means responsive to said second set of orbital parameter signals and said second group of inverse variance-covariance matrix signals for post-multiplying, in matrix multiplication fashion, said second group of inverse variance-covariance matrix signals by said second set of orbital parameter signals to obtain a second set of weighted orbital parameter signals, first adding means responsive to said first and second groups of inverse variance-covariance matrix signals for obtaining a group of signals representing the elements of a first sum matrix each of whose elements is the sum of corresponding elements of said first and second inverse variance-covariance matrices, means connected to said first adding means for obtaining from said group of first sum matrix signals a group of signals representing the elements of the inverse of said first sum matrix, second adding means supplied with said first and second sets of weighted orbital parameter signals for deriving a second group of sum matrix signals representing the elements of a second sum matrix each of whose elements is the sum of corresponding pairs of weighted orbital parameters, and means responsive to said group of inverse first sum matrix signals and said second group of sum matrix signals for post-multiplying, in matrix multiplication fashion, said group of inverse first sum matrix signals by said second group of sum matrix signals to obtain a third set of signals representing elements of a second matrix of orbital parameters of said satellite at said second reference time, whereby said third set of orbital parameter signals is more accurate than either said first set or said second set of orbital parameter signals.

9. Apparatus for determining from a single sample of a population of observed positions of a terrestrial satellite a group of estimates of the sample-mean variances and sample-mean covariances of the sample-mean population comprising groups of mean values, each group of mean values being derived from a single sample of said population of observed positions of said satellite, which comprises an input means for supplying a sample of the population of observed positions of a terrestrial satellite, said sample comprising a plurality of observed positions of said satellite, means responsive to said sample of observed positions for obtaining a set of $n$ mean values representing unbiased estimates of $n$ orbital parameters of said satellite, means responsive to said sample of observed positions and said set of mean values for deriving $n$ sequences of deviations, the $m$ components of each of said sequences representing the differences between one of said mean values and each of said observed positions in said sample from which said mean values are derived, an array of $$\left[n + \frac{n!}{(n-2)!\, 2!}\right]$$

multipliers arranged in $i=1,2,\ldots,n$ rows and $j=1,2,\ldots,n$ columns, wherein said $i$th row contains $(n+1-i)$ multipliers, said $j$th column contains $j$ multipliers, and each multiplier is provided with two input terminals and an output terminal, means for applying each component of each of said sequences of deviations in parallel to one of said rows of multipliers and to one of said columns of multipliers, wherein the $i$th sequence is applied to both input terminals of the last multiplier in the $i$th row and to one of the input terminals of each of the remaining multipliers in the $i$th row, and wherein the $i$th sequence of deviations is applied to one of the input terminals of all of the multipliers in the $j=(i-1)$th column, a plurality of $$\left[n + \frac{n!}{(n-2)!\, 2!}\right]$$

cumulative adding means for developing from the sequence of product signals formed by each of said multipliers a sum signal representative of the total sum of all the components in each of said sequences of product signals, means for connecting the output terminal of each of said multipliers to one of said cumulative adding means, first counting means for determining the number of components, $m$, in each of said $n$ sequences of deviations, second counting means for determining the number of components minus one, $m-1$, in each of said $n$ sequences of deviations, multiplying means provided with two input terminals and an output terminal, means responsive to the last component in each of said sequences of deviations for connecting said first counting means to one of the input terminals of said multiplying means and said second counting means to the other input terminal of said multiplying means, a plurality of dividers in one-to-one correspondence with said plurality of cumulative adding means, each of said dividers being provided with a dividend terminal, a divisor terminal, and a quotient terminal, means responsive to the delayed last component in each of said sequences of deviations for connecting the output terminal of each of said cumulative adding means to the dividend terminal of its corresponding divider and for connecting the output terminal of said multiplying means in parallel to all of the divisor terminals of said dividers, whereby the signals developed at the quotient terminals of said dividers represent estimates of said sample-mean variances and sample-mean covariances.

10. Apparatus for determining estimates of the position and velocity of a terrestrial satellite from a plurality of observed position signals, characterized in that smoothing means obtain from selected pairs of said observed position signals a plurality of sequences of smoothed position signals and a plurality of sequences of smoothed velocity signals, averaging means to which said plurality of sequences of smoothed position signals and said plurality of sequences of smoothed velocity signals are applied obtain a plurality of mean value signals, one from each of said sequences, and trend removal means iteratively reduce the error in each of said mean value signals to obtain estimates of the position and velocity of said satellite.

11. Apparatus for combining two sets of signals representing estimates of the orbital parameters of a terrestrial satellite at the same reference time and two groups of signals representing estimates of the sample-mean variance-covariance matrices associated with each of said sets of orbital parameter signals to form a set of weighted average orbital parameter signals which is more accurate than either of said sets of original orbital parameter signals, characterized in that means premultiply in matrix fashion each of said sets of orbital parameter signals by the inverse matrix of its group of variance-covariance signals to form a pair of sets of weighted orbital parameter signals, means add together the inverse variance-covariance matrix signals to form a first group of sum signals, means add together said pairs of sets of weighted orbital parameter signals to form a second group of sum signals, and means premultiply in matrix fashion said second group of sum signals by the inverse matrix of said first group of sum signals to develop a set of weighted average matrix signals.

12. Apparatus for determining from a large number of position measurements at different observation times the orbital parameters of a terrestrial satellite at a single predetermined reference time which comprises tracking means for deriving during a single pass of a terrestrial satellite first, second, and third sequences of observed position signals respectively representative of $n$ slant ranges $\{D\}=\{D_1, D_2, \ldots, D_n\}$, elevation angles $\{E\}=\{E_1, E_2, \ldots, E_n\}$, and azimuth angles $\{A\}=\{A_1, A_2, \ldots, A_n\}$, of said satellite with respect to a reference point on the earth at a sequence of $n$ corresponding time of observation $\{t\}=\{t_1, t_2, \ldots, t_n\}$, during said pass, means for converting said first, second, and third sequences of observed position signals $\{D\}$, $\{E\}$, $\{A\}$ to fourth, fifth, and sixth sequences of observed position signals respectively representative of the components $\{x\}=\{x_1, x_2, \ldots, x_n\}$, $$\{y\}=\{y_1, y_2, \ldots, y_n\},$$

$\{z\}=\{z_1, z_2, \ldots, z_n\}$, of a first sequence of $n$ observed position vectors $\{p\}=\{p_1, p_2, \ldots, p_n\}$ referred to an inertial, geocentric, rectangular coordinate system $(x, y, z)$, where the components of the vector $p_j$ at the time of observation $t_j$ are $(x_j, y_j, z_j)$, $j=1, 2, \ldots, n$, smoothing means for deriving from each of said fourth, fifth, and sixth sequences of observed position signals first, second, and third sequences of smoothed position signals respectively representative of the components $\{\bar{x}\}$, $\{\bar{y}\}$, $\{\bar{z}\}$ of a first sequence of $m$ smoothed position vectors $\{\bar{p}\}$ and first, second and third sequences of smoothed velocity signals respectively representative of the components $\{\bar{\dot{x}}\}$, $\{\bar{\dot{y}}\}$, $\{\bar{\dot{z}}\}$, of a first sequence of $m$ smoothed velocity vectors $\{\bar{\dot{p}}\}$, where for $n$ even, $n=2m$, and the components of $\bar{p}_j$ and $\bar{\dot{p}}_j$ are respectively $$[\bar{x}_j, \bar{y}_j, \bar{z}_j] = \left[\frac{1}{2}(x_j+x_{m+j}), \frac{1}{2}(y_j+y_{m+j}), \frac{1}{2}(z_j+z_{m+j})\right]$$

$$[\bar{\dot{x}}_j, \bar{\dot{y}}_j, \bar{\dot{z}}_j] = \left[\frac{x_{m+j}-x_j}{t_{m+j}-t_j}, \frac{y_{m+j}-y_j}{t_{m+j}-t_j}, \frac{z_{m+j}-z_j}{t_{m+j}-t_j}\right]$$

$j=1, 2, \ldots, m$, and where for $n$ odd, $n=2m+1$, and the components of $\bar{p}_j$ and $\bar{\dot{p}}_j$ are respectively, $$[\bar{x}_j, \bar{y}_j, \bar{z}_j] = \left[\frac{1}{2}(x_j+x_{m+1+j}), \frac{1}{2}(y_j+y_{m+1+j}), \frac{1}{2}(z_j+z_{m+1+j})\right]$$

$$[\bar{\dot{x}}_j, \bar{\dot{y}}_j, \bar{\dot{z}}_j] = \left[\frac{x_{m+1+j}-x_j}{t_{m+1+j}-t_j}, \frac{y_{m+1+j}-y_j}{t_{m+1+j}-t_j}, \frac{z_{m+1+j}-z_j}{t_{m+1+j}-t_j}\right]$$

$j=1, 2, \ldots, m$, means for determining from each pair of $m$ smoothed position and $m$ smoothed velocity signals $\bar{p}_j$, $\bar{\dot{p}}_j$, a nodal longitude signal, $\Omega_j$, and an angle of inclination signal, $I_j$, $j=1, 2, \ldots, m$, means for averaging said $m$ nodal longitude signals and said $m$ angle of inclination signals to obtain a pair of orbital orientation angle signals respectively representative of best estimates $\Omega_c$, $I_c$, of the nodal longitude orbital parameter and the angle of inclination orbital parameter of said satellite, at a reference time $t_c$ during said pass, where $$\Omega_c = \frac{1}{m}\sum_{j=1}^{m}\Omega_j$$

$$I_c = \frac{1}{m}\sum_{j=1}^{m}I_j$$

and for $n$ even, $n=2m$, $$t_c = \frac{1}{n}\sum_{j=1}^{n}t_j$$

and for $n$ odd, $n=2m+1$, $$t_c = \frac{1}{2m}\left(\sum_{j=1}^{m}t_j + \sum_{j=m+2}^{n}t_j\right)$$

means for determining from said pair of best estimate orbital orientation angle signals $\Omega_c$ and $I_c$ seventh and eighth sequences of observed position signals respectively representative of components $\{r\}$, $\{\theta\}$, of a second sequence of $n$ observed position vectors, $\{P\}=\{P_1, P_2, \ldots, P_n\}$, referred to an inertial, geocentric, polar coordinate system $(r, \theta)$ in the orbital plane of said satellite, where the components of $P_j$ are $(r_j, \theta_j)$, $j=1, 2, \ldots, n$, second smoothing means for deriving from each of said seventh and eighth sequences of observed position signals fourth and fifth sequences of smoothed position signals respectively representative of the components $\{\bar{r}\}$, $\{\bar{\theta}\}$, of a second sequence of $m$ smoothed position vectors $\{\bar{P}\}$ and fourth and fifth sequences of smoothed velocity signals respectively representative of the components $\{\bar{\dot{r}}\}$, $\{\bar{\dot{\theta}}\}$, of a second sequence of $m$ smoothed velocity vectors $\{\bar{\dot{P}}\}$, where for $n$ even, $n=2m$, and the components of $\bar{P}_j$ and $\bar{\dot{P}}_j$ are respectively, $$[\bar{r}_j, \bar{\theta}_j] = \left[\frac{1}{2}(r_j+r_{m+j}), \frac{1}{2}(\theta_j+\theta_{m+j})\right]$$

$$[\bar{\dot{r}}_j, \bar{\dot{\theta}}_j] = \left[\frac{r_{m+j}-r_j}{t_{m+j}-t_j}, \frac{\theta_{m+j}-\theta_j}{t_{m+j}-t_j}\right]$$

and for $n$ odd, $n=2m+1$, and the components of $\bar{P}_j$ and $\bar{\dot{P}}_j$ are respectively, $$[\bar{r}_j, \bar{\theta}'_j] = \left[\frac{1}{2}(r_j+r_{m+1+j}), \frac{1}{2}(\theta_j+\theta_{m+1+j})\right]$$

$$[\bar{\dot{r}}_j, \bar{\dot{\theta}}_j] = \left[\frac{r_{m+1+j}-r_j}{t_{m+1+j}-t_j}, \frac{\theta_{m+1+j}-\theta_j}{t_{m+1+j}-t_j}\right]$$

means for averaging each of said fourth and fifth sequences of smoothed position signals and each of said fourth and fifth sequences of smoothed velocity signals to obtain a group of first estimate signals respectively representative of first estimates $r_{c1}$, $\theta_{c1}$, $\dot{r}_{c1}$, $\dot{\theta}_{c1}$, of the orbital parameters $r$, $\theta$, $\dot{r}$, $\dot{\theta}$ of said satellite at said reference time, $t_c$, during said pass, where $$r_{c1} = \frac{1}{m}\sum_{j=1}^{m}\bar{r}_j$$

$$\theta_{c1} = \frac{1}{m}\sum_{j=1}^{m}\bar{\theta}_j$$

$$\dot{r}_{c1} = \frac{1}{m}\sum_{j=1}^{m}\bar{\dot{r}}_j$$

$$\dot{\theta}_{c1} = \frac{1}{m}\sum_{j=1}^{m}\bar{\dot{\theta}}_j$$

trend removal means for deriving from said group of first estimate signals a set of first increment signals $\Delta r_{c1}$, $\Delta\theta_{c1}$, $\Delta\dot{r}_{c1}$, $\Delta\dot{\theta}_{c1}$, respectively indicative of the error in each of said first estimate signals, said trend removal means including means for regenerating from said first estimate signals first and second sequences of regenerated position signals respectively representative of the components $\{r\}^1$, $\{\theta\}^1$, of a first sequence of $n$ regenerated position vectors $\{P\}^1 = \{P_1^1, P_2^1, \ldots, P_n^1\}$, means for subtracting each signal in each of said first and second sequences of regenerated position signals from the corresponding signal in each of said seventh and eighth sequences of observed position signals to obtain first and second sequences of difference signals respectively representative of the components $\{\Delta r\}^1$, $\{\Delta\theta\}^1$, of a first sequence of $n$ difference vectors $\{\Delta P\}^1 = \{\Delta P_1^1, \Delta P_2^1, \ldots, \Delta P_n^1\}$, where the components of $\Delta P_{1j}^1$ are $\Delta r_j^1 = r_j - r_j^1$
$\Delta\theta_j^1 = \theta_j - \theta_j^1$, $j=1, 2, \ldots, n$ smoothing means for deriving from each of said first and second sequences of difference signals a first set of sequences of smoothed difference signals, $\{\overline{\Delta r}\}^1$, $\{\overline{\Delta\theta}\}^1$, $\{\overline{\Delta\dot{r}}\}^1$, $\{\overline{\Delta\dot{\theta}}\}^1$, means for averaging said first set of sequences of smoothed difference signals to obtain said set of first increment signals, $\Delta r_{c1}$, $\Delta\theta_{c1}$, $\Delta\dot{r}_{c1}$, $\Delta\dot{\theta}_{c1}$, and means for comparing each of said increment signals with a corresponding preassigned small quantity $\epsilon_r, \epsilon_\theta, \epsilon_{\dot{r}}, \epsilon_{\dot{\theta}}$, respectively, so that said group of first estimate signals is utilized as best estimates $r_c$, $\theta_c$, $\dot{r}_c$, $\dot{\theta}_c$, of the orbital parameters $r$, $\theta$, $\dot{r}$, $\dot{\theta}$ when each of said set of first increment signals is smaller than its corresponding preassigned small quantity, and said group of first estimate signals is applied to said trend removal means when one or more of said set of first increment signals is greater than its corresponding preassigned small quantity to derive successive sets of estimate signals and increment signals; until there is obtained a set of $k$th estimate signals $r_{ck}$, $\theta_{ck}$, $\dot{r}_{ck}$, $\dot{\theta}_{ck}$, $k=2, 3, \ldots$, and a corresponding set of $k$th increment signals $\Delta r_{ck}$, $\Delta\theta_{ck}$, $\Delta\dot{r}_{ck}$, $\Delta\dot{\theta}_{ck}$, $k=2, 3, \ldots$, in which each of said $k$th increments is less than its corresponding preassigned small quantity, where said set of $k$th estimate signals is obtained by adding each of said $(k-1)$th increment signals to the corresponding $(k-1)$th estimate signal from which it was derived, $$r_{ck} = r_{c(k-1)} + \Delta r_{c(k-1)}$$
$$\theta_{ck} = \theta_{c(k-1)} + \Delta\theta_{c(k-1)}$$
$$\dot{r}_{ck} = \dot{r}_{c(k-1)} + \Delta\dot{r}_{c(k-1)}$$

and $$\dot{\theta}_{ck} = \dot{\theta}_{c(k-1)} + \Delta\dot{\theta}_{c(k-1)}$$

13. Apparatus for determining from a large number of position measurements at different observation times the orbital parameters of a terrestrial satellite at a single predetermined reference time which comprises means for obtaining during each of a plurality of passes of a terrestrial satellite a corresponding group of sequences of observed position signals respectively representative of the positions of said satellite at various times of observation during each of said passes, means for determining from each group of sequences of observed position signals and times obtained during each pass a set of orbital parameter signals indicative of estimates of the orbital parameters of said satellite at a single predetermined reference time during each pass, where the set of estimates at the reference time $t_i$ during the $i$th pass is denoted by the one-column matrix, $[q]_i$, means determining from each group of sequences of observed position signals and the corresponding set of orbital signals for each pass a set of variance-covariance signals representative of estimates of the sample-means variances and sample-means covariances of the population of sets of estimates of the orbital parameters for each pass, where the set of estimates of the sample-mean variances and sample-mean covariances associated with the set of estimates of the orbital parameters for the $i$th pass is denoted by the symmetrical variance-covariance matrix $[\overline{C}]_i$, and means for combining two of said sets of orbital parameters signals, an $i$th set, $[\overline{q}]_i$ and an $(i+1)$th set, $[\overline{q}]_{i+1}$ at reference times $t_i$ and $t_{i+1}$, $t_{i+1} > t_i$, to form a third set of orbital parameters signals indicative of orbital parameter estimates $$[\tilde{q}]_{i+1}$$

at reference time $t_{i+1}$, said means for combining comprising means for adjusting said $i$th set of orbital parameter signal, $[\overline{q}]_i$, to the reference time $t_{i+1}$, of said $(i+1)$th set of orbital perimeter signals, $[\overline{q}]_{i+1}$, to obtain a set of predicted orbital parameter signals, $$[\hat{q}]_{i+1}$$

at the reference time $t_{i+1}$, means for adjusting the reference time $t_i$ of the set of variance-covariance signals associated with the earlier pass, $[\overline{C}]_i$, to the reference time, $t_{i+1}$, of the later pass, to obtain a set of predicted variance-covariance signals representative of the sample-mean variances and sample-mean covariances, $$[\hat{C}]_{i+1}$$

associated with said set of predicted orbital parameter signals, $$[\hat{q}]_{i+1}$$

and means for forming a weighted average of said $i$th and predicted sets of orbital parameter signals $$[\overline{q}]_{i+1} \text{ and } [\hat{q}]_{i+1}$$

and their associated sets of variance-covariance signals, $$[\overline{C}]_{i+1} \text{ and } [\hat{C}]_{i+1}$$

in order to obtain a refined set of orbital parameter signals representative of refined estimates of the orbital parameters of satellite, $$[\tilde{q}]_{i+1}$$

at the reference time $t_{i+1}$, said weighted average being formed in accordance with the following equation, $$[\tilde{q}]_{i+1} = ([\overline{C}]_{i+1}^{-1} + [\hat{C}]_{i+1}^{-1}) \cdot ([\overline{C}]_{i+1}^{-1}[\overline{q}]_{i+1} + [\hat{C}]_{i+1}^{-1}[\hat{q}]_{i+1}))$$

where $$([\overline{C}]_{i+1}^{-1} + [\hat{C}]_{i+1}^{-1})^{-1}$$

is the inverse of the variance-covariance matrix, $$[\tilde{C}]_{i+1}$$

associated with the set of estimates $$[\tilde{q}]_{i+1}, \text{ and } [\overline{C}]_{i+1}^{-1} \text{ and } [\hat{C}]_{i+1}^{-1}$$

are the inverses of the variance-covariance matrices $$[\overline{C}]_{i+1} \text{ and } [\hat{C}]_{i+1}$$

References Cited by the Examiner

UNITED STATES PATENTS 3,015,457   1/1962   Dixson _____ 244—14

ROBERT C. BAILEY, *Primary Examiner.*

MALCOLM A. MORRISON, *Examiner.*